United States Patent
Watanabe

(10) Patent No.: US 10,176,127 B2
(45) Date of Patent: *Jan. 8, 2019

(54) NETWORK UNIT OF ELECTRONIC APPLIANCES, NETWORK OF ELECTRONIC APPLIANCES, AND METHOD OF USING CHIP IDENTIFICATION DEVICE

(71) Applicant: Hiroshi Watanabe, Kanagawa-ken (JP)

(72) Inventor: Hiroshi Watanabe, Kanagawa-ken (JP)

(*) Notice: Subject to any disclaimer, the term of this patent is extended or adjusted under 35 U.S.C. 154(b) by 319 days.

This patent is subject to a terminal disclaimer.

(21) Appl. No.: 15/210,928

(22) Filed: Jul. 15, 2016

(65) Prior Publication Data
US 2017/0024339 A1    Jan. 26, 2017

(30) Foreign Application Priority Data
Jul. 16, 2015  (JP) ................. 2015-141721

(51) Int. Cl.
*H04L 9/32* (2006.01)
*G06F 13/20* (2006.01)
(Continued)

(52) U.S. Cl.
CPC .......... *G06F 13/20* (2013.01); *G06F 13/1673* (2013.01); *G06F 13/4068* (2013.01); *G06F 21/44* (2013.01); *G06F 21/73* (2013.01); *H01L 23/528* (2013.01); *H01L 23/5226* (2013.01); *H01L 23/5256* (2013.01); *H01L 27/0629* (2013.01); *H01L 27/11286* (2013.01); *H01L 28/60* (2013.01); *H01L 29/78* (2013.01); *H01L 29/7883* (2013.01); *H01L 29/861* (2013.01); *H04L 9/0662* (2013.01); *H04L 9/3278* (2013.01); *H04L 63/083* (2013.01); *H04L 63/0876* (2013.01)

(58) Field of Classification Search
CPC .......... H04L 9/32; H04L 9/3278; G06F 21/44
See application file for complete search history.

(56) References Cited

U.S. PATENT DOCUMENTS 8,659,969 B2    2/2014  Fujiwara et al.
2010/0127822 A1*  5/2010  Devadas .............. H04L 9/3278
                                                                340/5.8
(Continued)

FOREIGN PATENT DOCUMENTS

WO    WO2008015603 A1    2/2008

OTHER PUBLICATIONS

Ellen Nakashima, Stuxnet Malware is Blueprint for Computer Attacks on U.S., The Washington Post (online), Oct. 2, 2010, 6 pages, www.washingtonpost.com.
(Continued)

*Primary Examiner* — Izunna Okeke
(74) *Attorney, Agent, or Firm* — Alan D. Kamrath; Kamrath IP Lawfirm, P.A.

(57) ABSTRACT

A technology precluding attacks through peripheral devices thefts to a network of electronic appliances, by utilizing physical chip identification devices, is disclosed. The electronic appliances in the network are divided into the peripheral devices and the stem servers managing the registration information of the peripheral devices. The stem servers are under the central control with software, and the peripheral devices are controlled at device-level with the physical chip identification devices implemented in the chip. Thus, the security of the whole network is efficiently enhanced.

41 Claims, 71 Drawing Sheets

(51) Int. Cl.
*H04L 29/06* (2006.01)
*H04L 9/06* (2006.01)
*H01L 27/112* (2006.01)
*H01L 23/522* (2006.01)
*H01L 23/528* (2006.01)
*H01L 49/02* (2006.01)
*H01L 29/861* (2006.01)
*H01L 29/78* (2006.01)
*H01L 27/06* (2006.01)
*H01L 29/788* (2006.01)
*H01L 23/525* (2006.01)
*G06F 13/16* (2006.01)
*G06F 13/40* (2006.01)
*G06F 21/73* (2013.01)
*G06F 21/44* (2013.01)

(56) References Cited

U.S. PATENT DOCUMENTS

2010/0257357 A1* 10/2010 McClain ................ G06F 21/43
713/155
2015/0101037 A1* 4/2015 Yang ....................... G06F 21/44
726/16

OTHER PUBLICATIONS

Josh Valcarcel, Why the Security of USB is Fundamentally Broken, Wired (online), Jul. 31, 2014 (3.00 am), 5 pages, www.wired.com.
(Author unknown), Sad Fate of Discarded Consumer Electronics, NHK online.

* cited by examiner

| input code | registration code |
|---|---|
| RTSDEDDTAG!$&D(() | oq&\|QX5'Xj*LS]e{ICY |
| 0D$zD)X=Fpgd[_&x.*n | C(Y6;sHWLnp!L+5P[+@ |
| LJ/z5J@e$q9mhd0/9Mx | p;A18;6Nd[ic8a"+.SO |
| _pJQ\|9ecbe{2Ieq=!?E | wG;x'5@/O(GM";ODS+K |
| u+x~53cvmJfyvZ"GzI# | Tw[F\sk8!a"hKIgFIN~ |

FIG. 20

Input code: $(a(i), b(j))$

Output code: $c(i,j) = mod(a(i) + b(j) + d(i,j), 2)$ random number ⟹

| $a(i)$ | $b(j)$ | $d(i,j)$ | $c(i,j)$ |
|---|---|---|---|
| 0 | 0 | 0 | 0 |
| 0 | 1 | 0 | 1 |
| 1 | 0 | 0 | 1 |
| 1 | 1 | 0 | 0 |
| 0 | 0 | 1 | 1 |
| 0 | 1 | 1 | 0 |
| 1 | 0 | 1 | 0 |
| 1 | 1 | 1 | 1 |

FIG. 26

NETWORK UNIT OF ELECTRONIC APPLIANCES, NETWORK OF ELECTRONIC APPLIANCES, AND METHOD OF USING CHIP IDENTIFICATION DEVICE

CROSS REFERENCE TO RELATED APPLICATIONS

The application claims the benefit of Japan application serial No. 2015-141721, filed on Jul. 16, 2015, and the subject matter of which is incorporated herein by reference.

BACKGROUND OF THE INVENTION

1. Field of the Invention

The present disclosure generally relates to a method of physical chip identification and, more particularly, to a method of physical chip identification for communications among electronic appliances and networks thereof.

2. Description of the Related Art

The industry of information and communication technology has leaped forward after entered the 21st century, and has created even larger market in recent years. Not only informational terminal devices, all things such as household appliances, houses, automobiles, are connected to "Internet of Things (IoT)". The IoT does not belong to any existing market. The even wider "Internet of Everything (IoE)" may even have the hidden possibility of changing the basis of the society lying inside.

Technically, it can be viewed as a semiconductor chip-to-chip communication technology within a smallest unit (node) connected to the network. It is different from the current network technology that the amount of the nodes may be up to trillions to tens of trillions (Trillion Nodes). For example, if the world population is seven billion, each person is surrounded by nodes at the amount of thousands in the average. Those chips contain not only personal information, but also those systems controlling machines surrounding each person. Practically, it is impossible that everyone carefully and frequently manages those chips. Even under central control by well-trained experts, it is also impossible to handle trillions of nodes simultaneously because of the limitation of the computing resource. No matter how much it has been developed, who should be in charge of the management system? It is inappropriate to have a single private enterprise to implement. Based on the current situation, it is also inappropriate and impractical to have an artificial intelligence which is superior to a human being to handle it.

What may happen if we are unable to handle it? Imagine an auto-driving vehicle having high-volume Lithium-ion batteries to be hacked, which may enable us to easily understand. There could be a lot of auto-driving vehicles to be remote controlled to move to the attacking targets (a shopping center, a giant underground garage, a terminal station). A huge amount of Lithium-ion batteries are stocked in a closed place and the power system is invaded. A big explosion of the batteries may happen if the power system is intentionally inappropriately controlled. Similarly, imagine how dangerous it would be if someday an explosion happened in the garage of shopping center by remote-controlling those vehicles, if two high-speed trains or bullet trains collided by manipulating the train control system, or if a nuclear facility having atomic reactor or an air traffic control system was hacked.

It is too hasty to say that we will have no problem because the networks of such important facilities are insulated with strong firewall from the common internet, or are physically isolated. In fact, a nuclear facility in Iran has been attacked and suffered a severe damage by a malware called "Stuxnet." (For example, Non-Patent Literature 1: http://www.washingtonpost.com/wp-dyn/content/article/2010/10/01/AR2010100106981.html).

There were several different versions of the attacking method of Stuxnet. The most plausible one is the attack via mobile devices or USB storage devices. Once Stuxnet has been released in the internet, he spends several months to wait for the opportunity to invade the system of the target. Even the target is protected by a strong firewall, Stuxnet still can invade the USB storage devices or the mobile devices and wait until those devices are carried into the inside of the firewall. And then the devices are connected to a terminal inside the firewall. Once those devices are connected inside the firewall, Stuxnet opens the backdoor and manipulates the PLC (programmable logic controller) of the centrifuge to start the remote control of them. By this way, the one thousand centrifuges in the Iranian nuclear facilities were repeatedly accelerated and decelerated rapidly; and thus were hurt. By this way, it is found that Stuxnet has the ability to attack even the targets that are physically isolated from the general network.

The damaged centrifuges in the Iranian nuclear facilities were insulated from the general network. However, they had to be connected to the mobile devices of the manufacturer of those centrifuges for the periodical maintenance. If the centrifuges were connected to the general network, the centrifuges were not necessary to be connected to the mobile devices of the manufacturer. However, they were necessary to be connected, because the centrifuges were insulated. Furthermore, even if Stuxnet infects non-target nodes, it does nothing and is hiding. Thus, it is very difficult for any anti-virus software to detect it.

The attack of Stuxnet might be deemed to defer the nuclear research in Iran, and to prevent Israel from launching air strikes against Iran. Once the mechanism of the attack was disclosed, it might seem to be able to prevent the attack. However, it is dangerous that the source code of Stuxnet has been stolen and leaked. New malwares which are very similar to Stuxnet has been discovered since in 2014. (For example, Non-Patent Literature 2: http://www.wired.com/2014/07/usb-security/).

The virus that is called BadUSB manipulates the firmware of a USB device, instead of the PLC of industrial equipment. Since the USB devices are usually connected to other devices, the USB devices have the identification mechanism of the connection. The identification mechanism is installed into the firmware. The firmware is stored in the controlling chip of the USB devices and is used to control the operation of the USB devices. The BadUSB steals the identification from the firmware of a USB device and does nothing in the USB device until it is connected to the target device. For example, BadUSB does not infect the personal computer, but it steals the IDs of the mouse and the keyboard used to control the personal computer. By this way, a hacker who is on the other side of the earth can remote control other's computer. Because the virus does not infect the computer, it is impossible for the anti-virus software to detect BadUSB.

The smallest communication unit (node) in IoT/IoE is the controlling chip of a machine. The controlling chip has controlling program (firmware) stored inside. The firmware has identification code for identifying each chip. The above mentioned new attacking method to remote control the auto-driving vehicles can be performed by stealing the identification code. This is similar to BadUSB or Stuxnet.

It may thus become possible for a small group of hackers to carry out the synchronized terrorist attacks like September-11 in the future. This kind of new threats may not be eliminated by adopting the conventional counter-terrorism policy or the conventional cyber security technologies.

SUMMARY OF THE INVENTION

The majority of cyber security technology is the central control by using a software. Since the understanding of cyber security technology is different from a person to another, it is impossible to expect every end-user to fulfill the operation management correctly. Even if there are 999 people fulfilling the operation management correctly, the security becomes vulnerable if there is one person failing to do that. Thus, the security of a system using a network should be subject to the central control managed by a well-trained supervisor with highly reliable software. Such a central control is the management adopting software via a network.

However, as mentioned above, the amount of nodes in a IoT/IoE business model is up to trillions, which makes the central control very difficult. Furthermore, once an identification code of nodes connected to a network is stolen, the whole system (such as an auto-driving vehicle or an air traffic control system) becomes vulnerable. The usage of identification codes is indispensable as long as the network is under the control of software. This is the limitation of the central control security.

Therefore, the objective of this disclosure is to provide the method of local identification management of network nodes without using software. In order to solve the problem mentioned above, a chip identification device using a chip identification method may be utilized in a network unit of electronic appliances comprising a stem server and a plurality of peripheral devices connected to the stem server. The stem server comprises at least one passcode and at least one list of a plurality of registration codes. Each list is associated to a respective one of the at least one passcode. Each of the plurality of registration codes of one list associating to one passcode corresponds to a respective one of the plurality of peripheral devices connecting to the stem server. The stem server sends the at least one passcode to each of the plurality of peripheral devices. Each of the plurality of peripheral devices sends a respective output code thereof to the stem server in response to the at least one passcode sent by the stem server. Each of the plurality of peripheral devices comprises a plurality of components including at least one chip comprising a chip identification device. The chip identification devices of the plurality of peripheral devices are different from each other. The passcode is converted to an input code in each of the plurality of peripheral devices. The input code is built in the chip of the chip identification device and is a data aggregate of electrical signals assigned by a plurality of word lines and a plurality of bit lines. An address assigned on the chip is defined by one or more groups of a plurality of word lines and one or more groups of a plurality of bit lines. Each group of the plurality of word lines is assigned with a number different from each other, and each group of the plurality of bit lines is assigned with a number different from each other. A row number of the address is defined by the number of either one of the one or more groups of the plurality of word lines or the one or more groups of the plurality of bit lines disposed in a wiring layout on the chip, and a column number of the address is defined by the number of the other one of the one or more groups of the plurality of word lines and the one or more groups of the plurality of bit lines disposed in the wiring layout on the chip. The chip identification device comprises a plurality of identification cells disposed in a cell region comprising the one or more groups of the plurality of word lines and the one or more groups of the plurality of bit lines. The cell region comprises a first random number generator comprising a portion of the plurality of identification cells disposed at the addresses defined by a first group of rows and a first group of columns. The plurality of identification cells is semiconductor cells made simultaneously within the at least one chip in a same manufacturing process. Each of the plurality of identification cells electrically outputs at least a first value and a second value in response to an electrical input applied to the one or more groups of the plurality of word lines and the one or more groups of the plurality of bit lines disposed in the wiring layout on the chip. The first random number generator generates a first random code which is an aggregate of electronic data electrically output by the portion of the plurality of identification cells disposed at the addresses defined by the first group of rows and the first group of columns. The output code is an aggregate of electronic signals output generated by combining the input code with the first random code in a specified manner. The plurality of registration codes is electronic data stored in the stem server by registering the plurality of output codes in advance. The stem server compares each of the plurality of output codes with a respective one of the at least one list of the plurality of registration codes, and evaluates the validity of a respective one of the plurality of peripheral devices.

In addition, the chip identification device using the chip identification method may also be utilized in a network of electronic appliances comprising a plurality of network units of electronic appliances. Each network units comprises a first network unit and a plurality of second network units. The first network unit is connected to at least one of the plurality of second network units in a topology. Each of the plurality of network units comprises a stem server and a plurality of peripheral devices connected to the stem server. The topology may comprise the stem server of the first network unit, and the stem server of the first network unit may connect to one or more of the stem servers of the plurality of second network units. The topology may also comprise at least one of the plurality of peripheral devices of the first network unit, and each of the at least one of the plurality of peripheral devices of the first network unit may connect to one or more of the stem servers of the plurality of second network units. The topology may also comprise the stem server of the first network unit and at least one of the plurality of peripheral devices of the first network unit, the stem server of the first network unit connects to one or more of the stem servers of the plurality of second network units, and each of the at least one of the plurality of peripheral devices of the first network unit connects to one or more of the stem servers of the plurality of second network units.

In addition, a method of using chip identification device is jointly performed by a chip mass-produced by a semiconductor manufacturing process, a first chip manufacturer making the chip, a second chip manufacturer shown on a label on a surface of the chip, and a chip user assembling a product by using the chip. The method of using chip identification device comprises the following. Input a first published passcode, which is published by the first chip manufacturer, to the chip to obtain a first output code as an output. The first chip manufacturer manages a first list comprising the first published passcode and the corresponding first output code. Input a second published passcode, which is published by the second chip manufacturer, to the chip to obtain a second output code as an output. The second chip manufacturer manages a second list comprising the second published passcode and the corresponding second output code. Input the first published passcode to the chip by the chip user. Read an aggregate of electronic output signals, which is in response to the first published passcode input by the chip user, as a read code. Send the read code to the first chip manufacturer to compare the first output code and the read code. The chip is regarded as a counterfeit if the comparison is consistent. The chip comprises an intrinsic chip identification device. The chip identification device comprises a plurality of identification cells. The plurality of identification cells is disposed in a cell region comprising one or more groups of a plurality of word lines and one or more groups of a plurality of bit lines. The cell region comprises a physical random number generator comprising a portion of the plurality of identification cells disposed at addresses defined by a first group of the plurality of word lines and a first group of the plurality of bit lines. The identification cell is a semiconductor cell made simultaneously within the chip in a same manufacturing process, and electrically outputs at least a first value and a second value in response to an electrical input applied to the one or more groups of the plurality of word lines and the one or more groups of the plurality of bit lines, which are disposed in the wiring layout on the chip. The physical random number generator generates a random code as an aggregate of electronic data electrically output by the portion of the plurality of identification cells in response to the electrical input. The first output code is an aggregate of electronic signals output by the physical random number generator in response to an input of the first published code, and the second output code is an aggregate of electronic signals output by the physical random number generator in response to an input of the second published code.

According to this disclosure, a novel chip identification method is provided to reduce the risk that an identification code will be stolen to control the chip.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein:

FIG. 20 is a diagrammatic view of a corresponding table of input codes and registration codes.

FIG. 26 is a diagrammatic view of the relationship of input codes, arrangement of physical random numbers, and output codes.

DETAILED DESCRIPTION OF THE INVENTION

Figure 1:
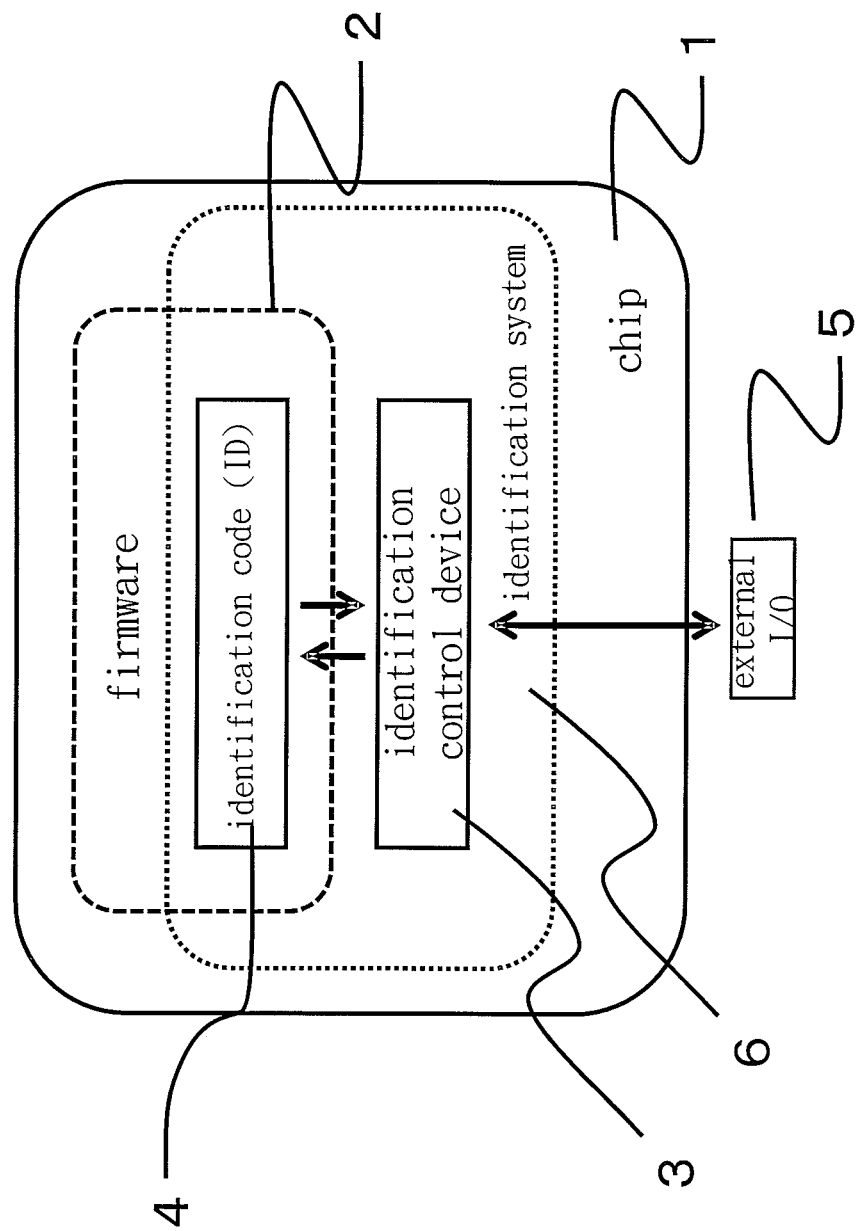
FIG. 1 is a diagrammatic view of a chip carrying conventional identification system.

FIG. 1 shows a conventional and typical chip controlling system. An identification controlling device 3, which realizes the functions of the chip identification, may read an identification code (ID) 4, which may be a part of the firmware 2, when needed. For instance, for the chip 1, the identification controlling device 3 may refer to the identification code (ID) 4 according to an external I/O 5, and may assert that the chip 1 is a certificated external device. However, this is only an assertion instead of proving it to be truly certificated. According to the above reason, one may steal the identification code (ID) 4, and then other chips may be used to replace the chip 1.

Figure 2:
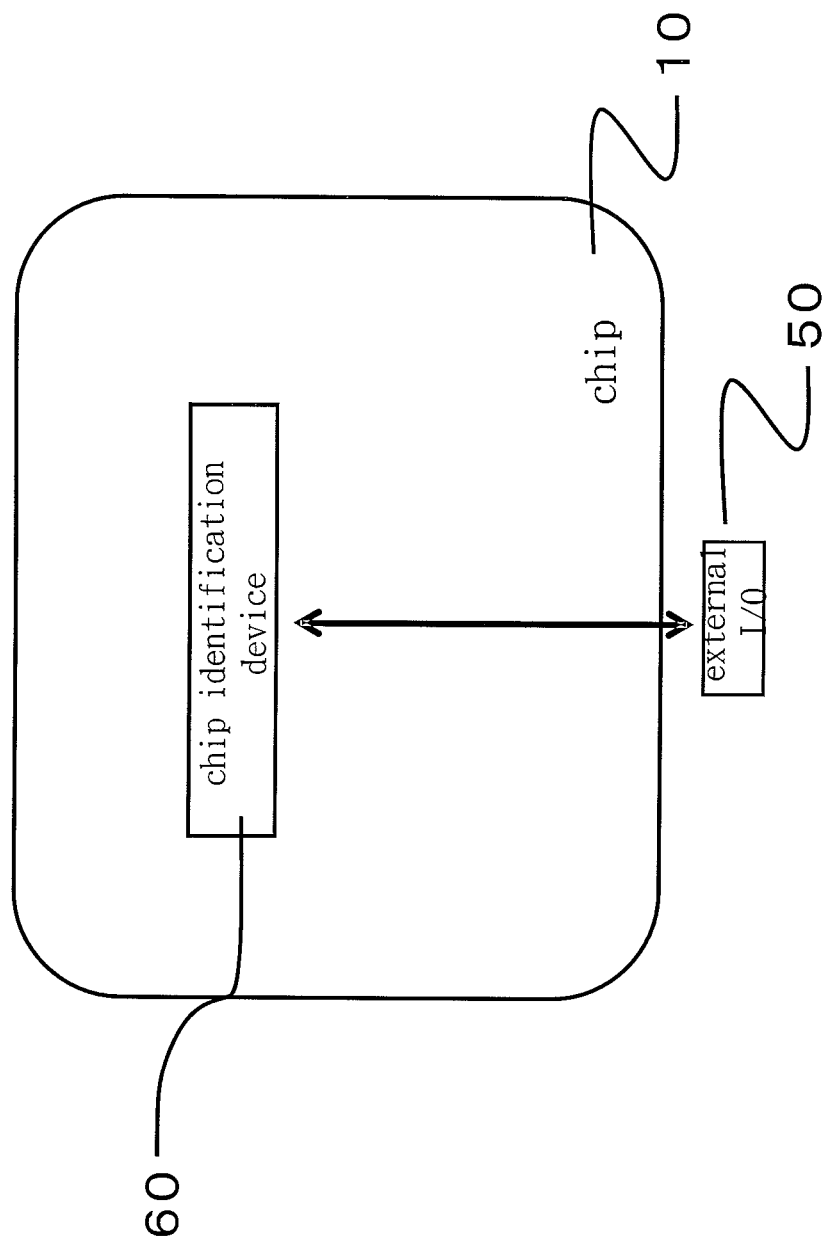
FIG. 2 is a diagrammatic view of a chip carrying a chip identification device of the disclosure.

As presented in FIG. 2, this disclosure substitutes a chip identification device 60 for an identification system 6 formed with the identification code (ID) 4 and the identification controlling device 3. The chip identification device 60 may generate output signals corresponding to each call (input signal) received from an external I/O device 50. The output signals may be generated based on physical randomness. Furthermore, it should be noted that the output signal may vary with respect to the change of the input signal.

Figure 3:
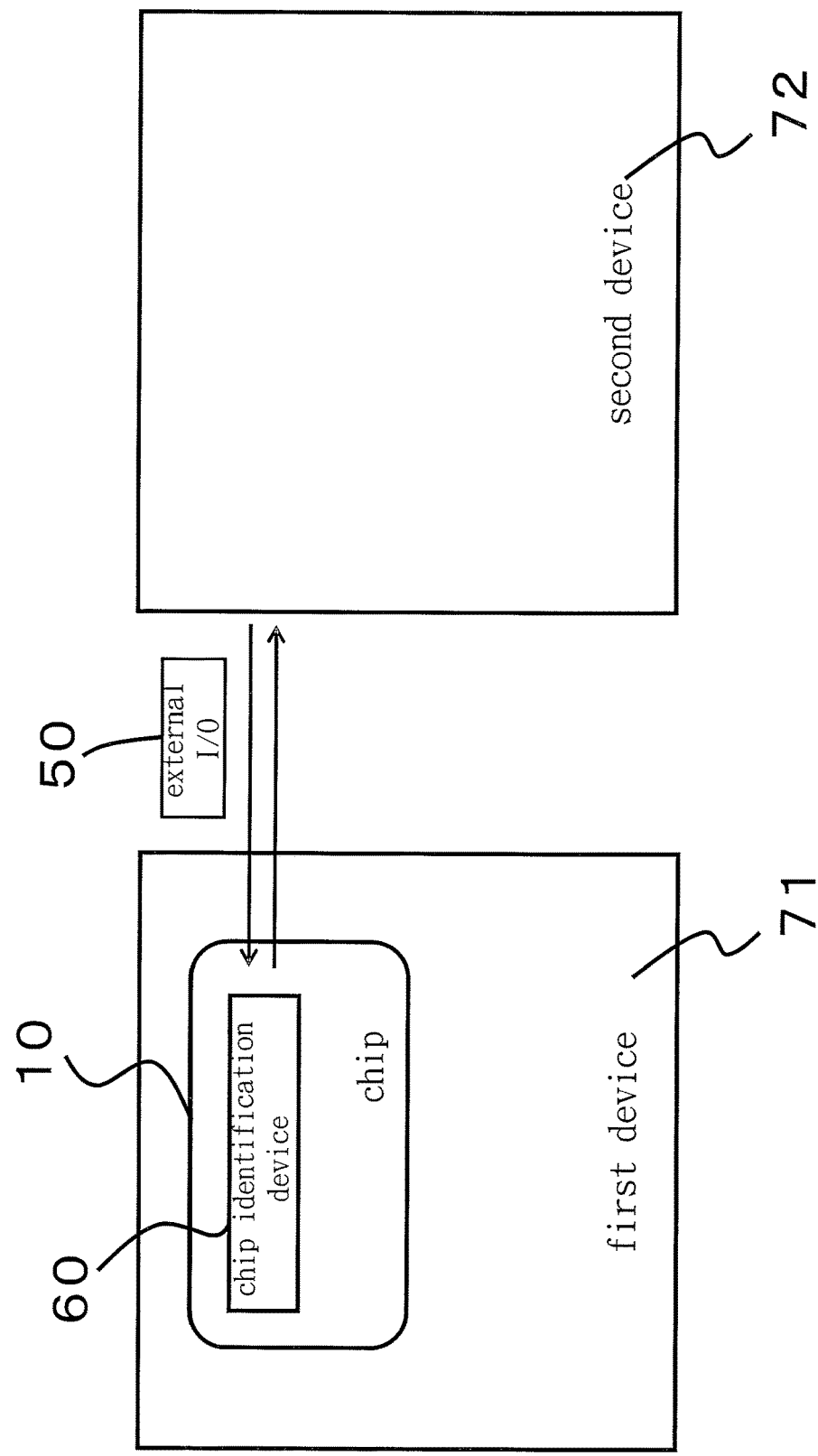
FIG. 3 shows a connecting method of a device comprising the chip carrying the chip identification device of the disclosure.

Referring to FIG. 3, let us consider the situation that a first device 71 exchanging data (communicating) with a second device 72 via the external I/O device 50, wherein the first device 71 has the chip 10 comprising the chip identification device 60.

Figure 4:
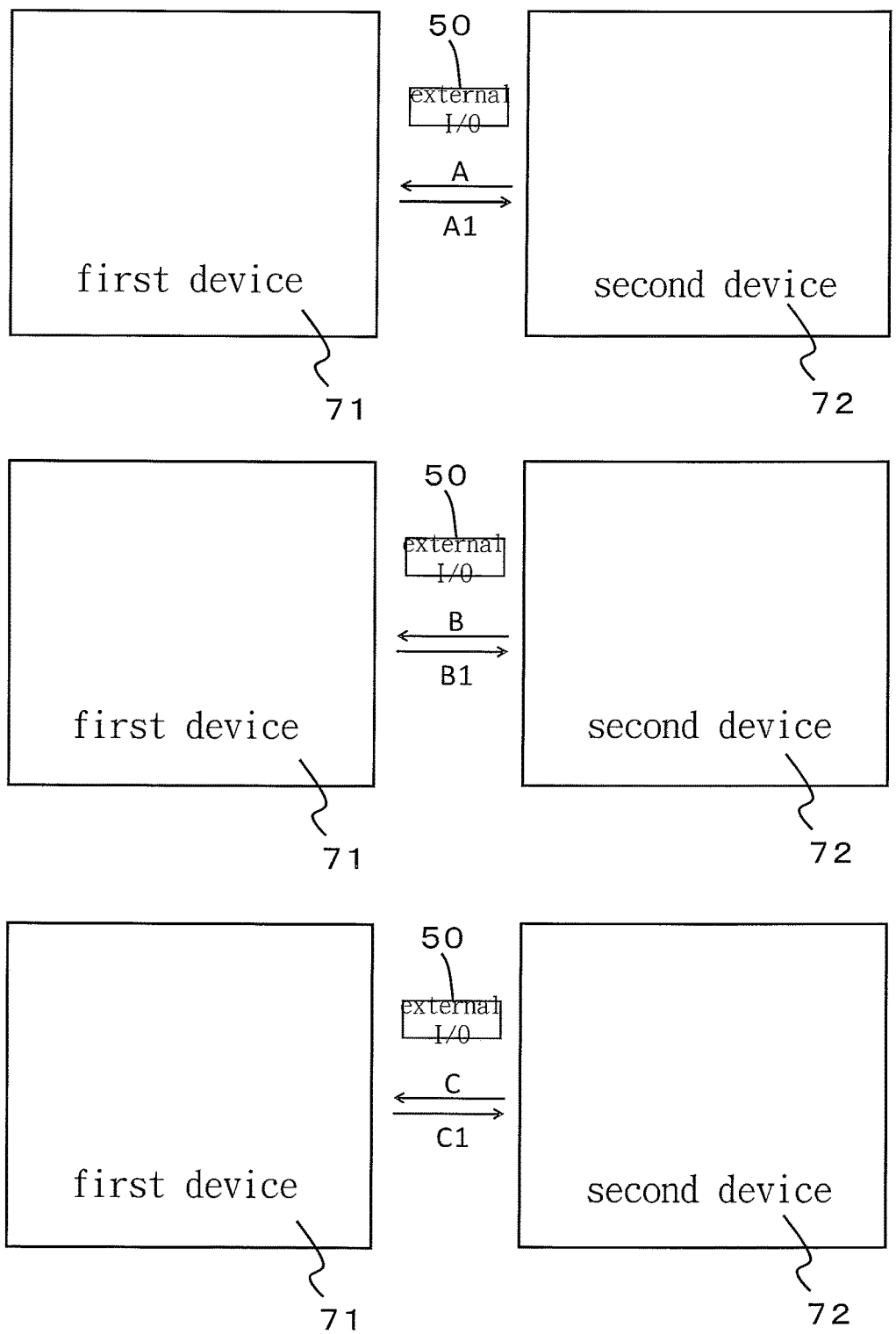
FIG. 4 shows the transmission of signals through external I/O.
Figure 5:
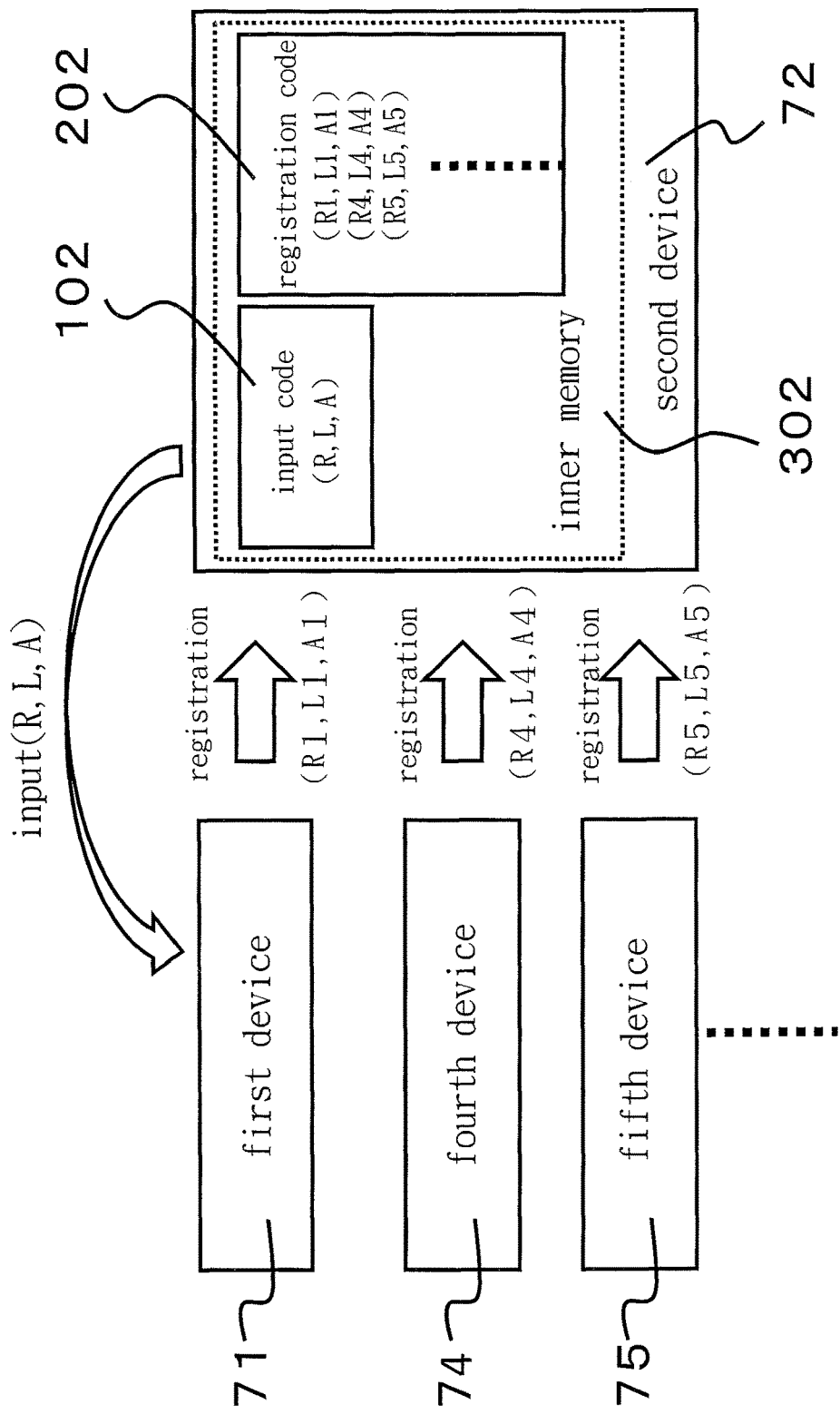
FIG. 5 shows the method of the device comprising the chip carrying the chip identification device of the disclosure registering with a device connected to the chip identification device of the disclosure.

Referring to FIG. 4, the second device 72 may send signal A, signal B, signal C, . . . , as input codes via the external I/O device 50 to the chip identification device 60 comprised in the first device 71, to identify the connected first device 71 by some means. The chip identification device 60 may return signal A1, signal B1, signal C1, . . . , respectively, as output codes via the external I/O device 50 to the second device 72. Here, the second device 72 may identify the first device 71 as a device "returning output signal A1 in reply to input signal A; returning output signal B1 in reply to input signal B; and returning output signal C1 in reply to input signal C; . . . ." It may be expressed as a communication series (A, B, C, . . . : A1, B1, C1, . . . ) in this event. Alternatively, in another situation, the second device 72 may identify the first device 71 as a device "returning output signal F1 in reply to input signal F; returning output signal A1 in reply to input signal A; and returning output signal K1 in reply to input signal K; . . . ." Such situation may be expressed as a communication series (F, A, K, . . . : F1, A1, K1, . . . ). However, this communication does not need to be done to all possible input signals. Since the pattern of the input signals (input codes) is limitless, it is barren that this communication is done to all possible input signals. On the contrary, the infinite patterns of the input signals may make the number of devices that may be connected to the second device 72 via network unlimitedly. In other words, when first connecting the first device 71 to the second device 72, the second device 72 may register the first device 71. The registration may preferably be done by a certificated user of the second device 72 or a person entrusted with the authority appropriately by a certificated user of the second device 72. For example, as shown in FIG. 5, when registering, randomly chosen input codes 102, such as (R, L, A), and the output codes (R1, L1, A1) returned by the first device 71, may be stored in the inner memory 302 of the second device 72. At this moment, the communication series of the registration may be (R, L, A: R1, L1, A1). More particularly, since the number of the devices that may be connected to the second device 72 may be infinite, it may be preferable to predetermine the input codes 102. In this event, the communication series (R, L, A: R1, L1, A1) registered on the first device 71 may be replaced with (R1, L1, A1) as a registration code 202. The example in FIG. 5 explains that the first device 71, a fourth device 74, a fifth device 75, . . . are registered to the second device 72. For example, the fourth device 74 may return to the second device 72 output codes (R4, L4, A4) in reply to input codes (R, L, A). The fifth device 75 may return to the second device 72 output codes (R5, L5, A5) in reply to input codes (R, L, A).

Figure 6:
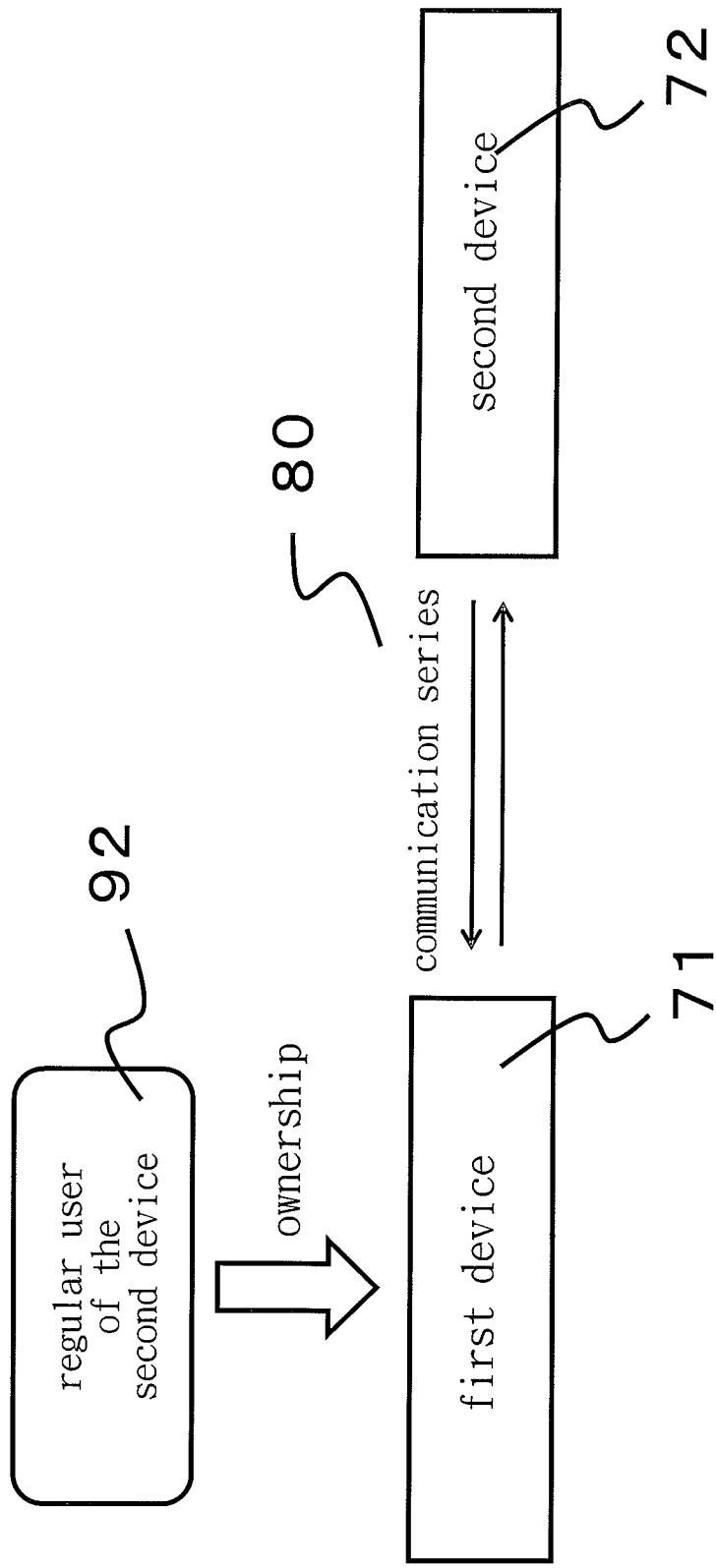
FIG. 6 shows a method of a certificated user using the device comprising the chip carrying the chip identification device of the disclosure in a network.

Referring to FIG. 6, it presents an example that a certificated user 92 uses the first device 71 that he holds to operate the second device 72. The first device 71 and the second device 72 may use a communication series 80 to communicate (connect), and may jointly complete the task that the certificated user 92 intends to do on the second device 72. Here, the certificated user 92 of the second device 72 may not make a commitment to the communication series 80. If it may make a commitment, the method of management and operation of the second device 72 may become complex, and may thus degrade the convenience of IoT/IoE. Particularly, when the second device 72 connects via network to an external device, the second device may first send input codes 102 (R, L, A) to the external device, and may confirm that whether the signals returned from the external device match with any registration code 202 (R1, L1, A1), (R4, L4, A4), (R5, L5, A5), . . . .

Figure 7:
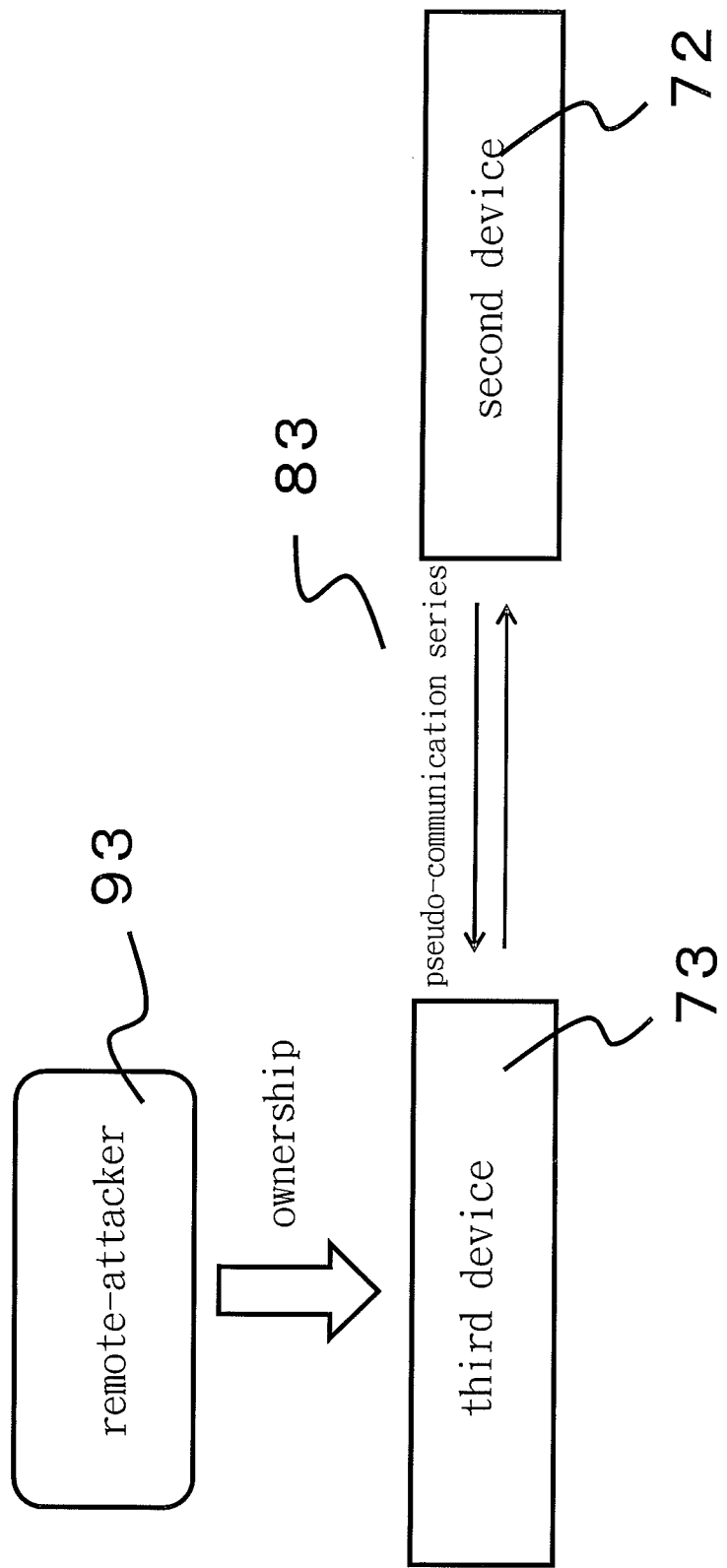
FIG. 7 shows a method of a remote attacker inappropriately connecting to the network.

Let us consider the situation shown in FIG. 7, where a remote attacker 93 inappropriately replaces the first device 71 with a third device 73, which may be held by the remote attacker 93. The third device 73 may have to completely imitate the communication series 80 without using the chip identification device 60 comprised in the first device 71. It may be enough to consider whether this is possible or not. If it may be impossible, it may be ascertained that the chip identification method presented in the disclosure may prevent a device from being stolen. The prerequisite may be that the one who is trying to inappropriately replace the first device 71 with the third device 73 (the remote attacker 93) may not really acquire the first device 71. This may be the natural condition in IoT/IoE. In other words, the theft in IoT/IoE may be based on remote operation. The purpose of the remote attacker 93 may be to remote control the second device 72 with the third device 73, which may be in his possession. In order to steal the first device 71, the remote attacker 93 may have to go to the place storing the first device 71, which is appropriately connected to the second device 72, and steal it secretly. It means that the attack may not be done via the network. In other words, the remote attacker 93 may not complete the remote control without being noticed by the user of the second device 72. When the third device 73 and the second device 72 are connected together via the network, the second device may send input signals (R, L, A, . . . ) via the network to the third device 73 to identify the third device 73 via the network connection. The third device 73 may return to the second device 72 output signals (R3, L3, A3, . . . ) via the network. Accordingly, a pseudo-communication series 83 (R, L, A, . . . : R3, L3, A3, . . . ) may be generated. Namely, the remote attacker 93 may have to make the pseudo-communication series 83 identical to the true communication series 80, which is (R, L, A: R1, L1, A1) in this example. Here, the pseudo-communication series (R, L, A: R3, L3, A3), which may be formed with the input codes 102 (R, L, A) and the response (R3, L3, A3) to the input, may be an example of the false communication series 83. If (R3, L3, A3) may be identical to (R1, L1, A1), the remote attacker 93 may replace the first device 71 with the third device 73 and may complete the remote attack. As in the example shown in FIG. 5, the remote attacker 93 may only have to make (R3, L3, A3) identical to anyone of the registration codes 202 stored in the inner memory 302 of the second device 72.

Thus, it may be found that there are basically two methods of conducting a remote attack. The first may be to steal the input codes 102 and at least one of the registration codes 202 stored in the inner memory 302 of the second device 72. For instance, if the remote attacker 93 successfully steals (R4, L4, A4) from the registration codes 202, and the input codes 102 (R, L, A), the remote attacker 93 may substitute the fourth device 74 for the third device 73, which may be in his possession, and may inappropriately remote control the second device 72. Similarly, if the remote attacker 93 may successfully steal (R1, L1, A1) from the registration codes 202, the remote attacker 93 may substitute the first device 71 for the third device 73, which may be in his possession, and may inappropriately remote control the second device 72. In order to prevent the system from being remote attacked as described, the supervisor of the system may have to strictly protect the inner memory 302 of the second device 72. Therefore, it may be preferable that the devices comprising inner memories where the input codes 102 or registration codes 202 may be stored, such as the second device 72, may be strictly protected by well-trained experts who always use the most advanced security software technology. By doing so, if the second device 72 may be mounted in the center of the network as the stem, and may serve as or may be under central control of the security supervisor, the first method of remote attack may be almost precluded. However, if the number of the devices connected to the network is up to trillions, it may be practically impossible to strictly protect all devices as the second device 72. This may also be the limit of the central control. Here, the remote attacker 93 may conduct the remote attacks on devices connected to the second device 72 but not reached by the central control, such as the first device 71, the fourth device 74, the fifth device 75, . . . in the example in FIG. 5. This may be the second method of remote attack. However, the first device 71 may not store the pairs (communication series 80), which may be formed by the input codes 102 and the registration codes 202, as identification codes 4 in its inner memory, as in the conventional example shown in FIG. 1. Other external devices to be connected to the second device 72 via network and to be used for some purpose g, such as the fourth device 74, the fifth device 75, etc. may be similarly protected from the second method of the remote attack. Those external devices (the first device 71, the fourth device 74, the fifth device 75, etc. in the example in FIG. 5) may individually comprise chips including different chip identification devices.

Figure 8:
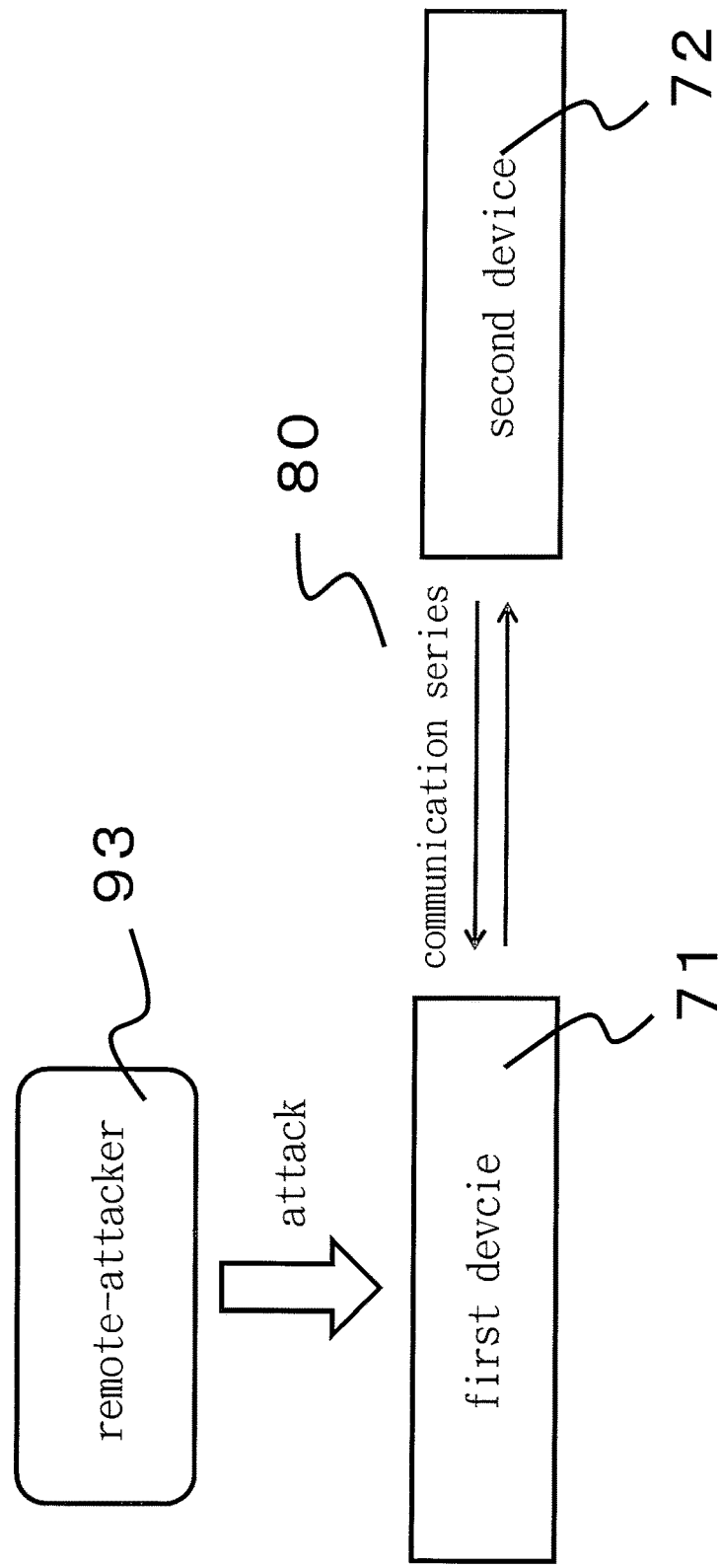
FIG. 8 shows a method of a remote attacker attacking the certificated device.

Let us consider the situation shown in FIG. 8, where the remote attacker 93 remote attacks the first device 71. Firstly, the remote attacker 93 may inappropriately access the inner memory of the first device 71, in order to steal the information (communication series) regarding the registration codes 202 and the input codes 102. However, this attack may fail with no exception, because the first device 71 may not store such information in its inner memory. Then, the remote attacker 93 may send randomly chosen signal (X, Y, Z) to the first device 71, and may obtain a response (X1, Y1, Z1). When (X, Y, Z) may be different from the input code 102 (R, L, A), the response (X1, Y1, Z1) may also be different from (R1, L1, A1) of the registration codes 202. Thus the second remote attack must also fail. Here, the problem may be that the signal set (X, Y, Z) randomly chosen by the remote attacker 93 may accidentally match with the input code 102 (R, L, A) stored in the inner memory 302 of the second device 72. In order to prevent such an accident, the number of the elements of the input codes 102 may have to be great, and may not be disclosed to any person other than the supervisor of the second device 72. The information may have to be strictly protected by the supervisor of the second device 72. In addition, it may be preferable that the information may be changed occasionally or periodically. When conducting the change, the re-registrations may have to be conducted on the devices connected to the second device 72. In order to reduce the frequency of such re-registrations, the number of elements of the input codes 102 may have to be managed to be as great as possible. Thus, the input codes 102 may act as passcodes.

It may be preferable that the passcodes may be commonly used to check the IDs of the various peripheral devices. In this event, individual input codes may not be needed to access each peripheral device. Thus, the input codes described above in the disclosure may be called the "common passcode" hereinafter. Thus, the stem server may have at least one common passcode.

The situation described above, wherein the second device 72 may be a computer (such as a personal computer), and the first device 71, the fourth device 74, and the fifth device 75 connected thereto may be peripheral devices connected to the computer to use. For instance, may be a mouse, a keyboard, a microphone, etc. As described above, it is the prerequisite that the substance of the computer is protected by the latest version of the anti-virus software and is managed by a supervisor. One of the objectives of the disclosure may be to preclude the substance of the computer from being irregularly substituted (theft) of the peripheral devices (mouse, keyboard, microphone, etc.). By doing so, the peripheral devices that the anti-virus software to protect the substance of the computer may be unable to protect may be protected from the remote attack.

Figure 9:
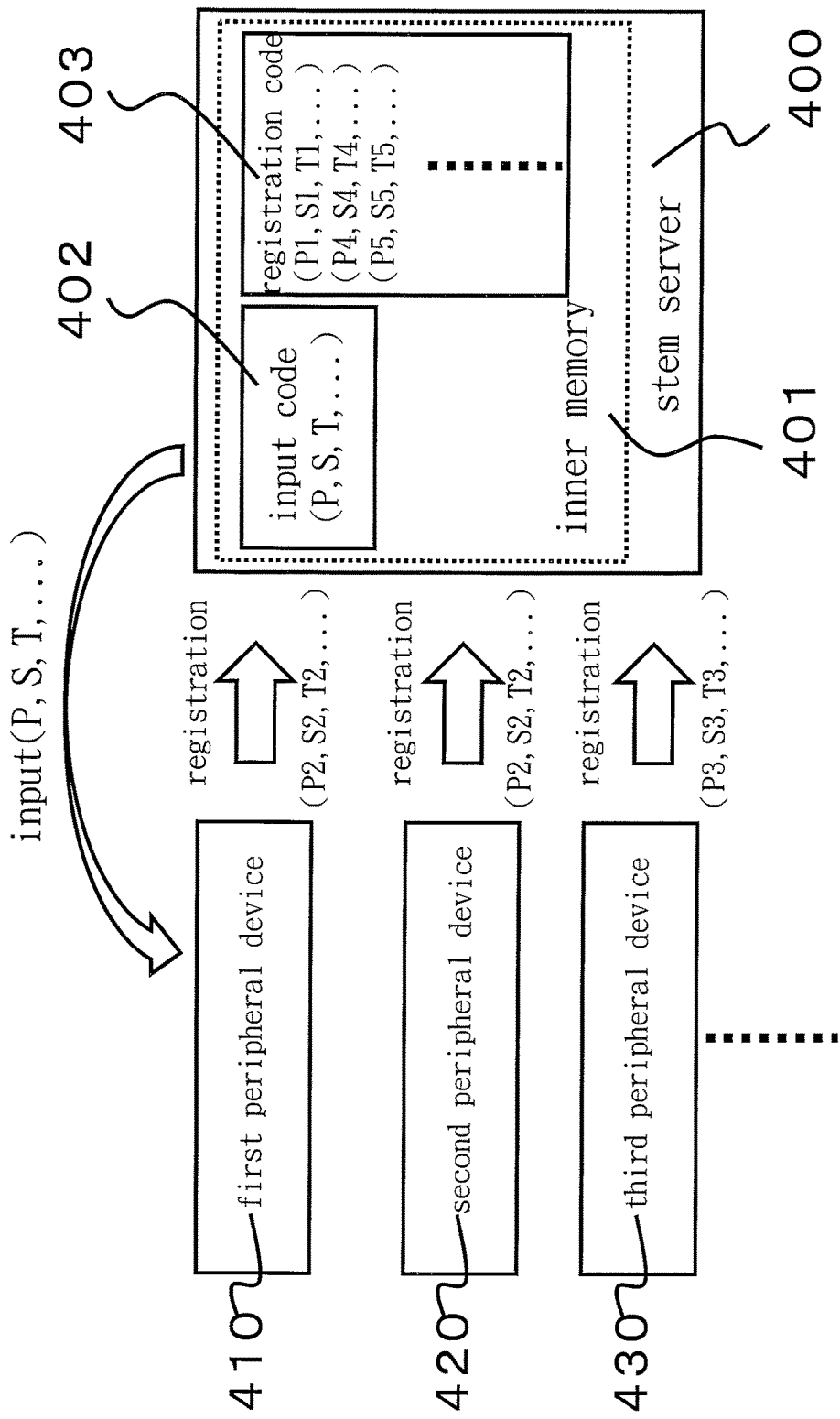
FIG. 9 is a diagrammatic view of a method of connecting peripheral devices comprising the chips carrying chip identification devices of the disclosure to a stem server.

In the case that the second device 72 may be used as the stem server providing the core functions of network services, the first device 71, the fourth device 74, and the fifth device 75, which are connected thereto, may be regarded as peripheral devices with regards to the stem server. FIG. 9 presents an example that a first peripheral device 410, a second peripheral device 420, and a third peripheral device 430, which are connected to a stem server 400 via network. For instance, the first peripheral device 410, the second peripheral device 420, the third peripheral device 430 may be terminal devices, which may be used to use the network service by end-users. For example, it may be a smartphone, a tablet, a computer terminal, a remote controller of a smart household appliance, a control panel of an auto-driving vehicle, or other wearable devices. As described above, the prerequisite may be that the stem server is managed by well-trained experts using the latest security technology. One of the objectives of the disclosure may be to protect the terminal devices (smartphone, tablet, computer terminal, or other wearable devices) of end-users from inappropriate access by the substitutions (thefts). By this way, the infinite number of information terminal devices spread all over the network, which may not be sufficiently protected even by well-trained experts with using the latest security software due to too large number of the terminal devices, may be protected from the remote attack.

In the case that the second device 72 may be used as the data center providing the core functions of cloud sensing services, the first device 71, the fourth device 74, the fifth device 75, which are connected thereto, may act as sensors gathering the data needed by the data center. The number of the sensors may be very huge to be regarded as infinite, and may be disposed in an extensive region. Thus, it may be practically impossible for the central control to protect the entire of the sensors from the remote attack. Such sensors may be a GPS, a virus monitor, a thermometer, a seismometer, a socket-type visible light communication device, a biosensor, and various smart sensors. As described above, the prerequisite may be that the data center is managed by well-trained experts using the latest security software. One of the objectives of the disclosure may be to protect the data center from the inappropriate access by the substitutions (thefts) of the sensors. Therefore, the entire of the sensors in the cloud sensing network, which may not be sufficiently protected even by well-trained experts with using the latest security software, may be protected from the remote attack.

One of the features of the disclosure may be that the peripheral devices (such as the first peripheral device 410, the second peripheral device 420, the third peripheral device 430), which may not be reached by the central control, may not have stored input data such as the common passcode. Thus, it may also be one of the features that, the security link may be divided into the "stem server" saving necessary data (such as the common passcode) for identification communication and the "peripheral devices" without such data stored. Furthermore, it may be one of the features that the "stem server" saving necessary data (such as the common passcode) for identification communication may be conducted under the central control, while the "peripheral devices" out of the central control may adopt the chip identification method of the disclosure.

Figure 10:
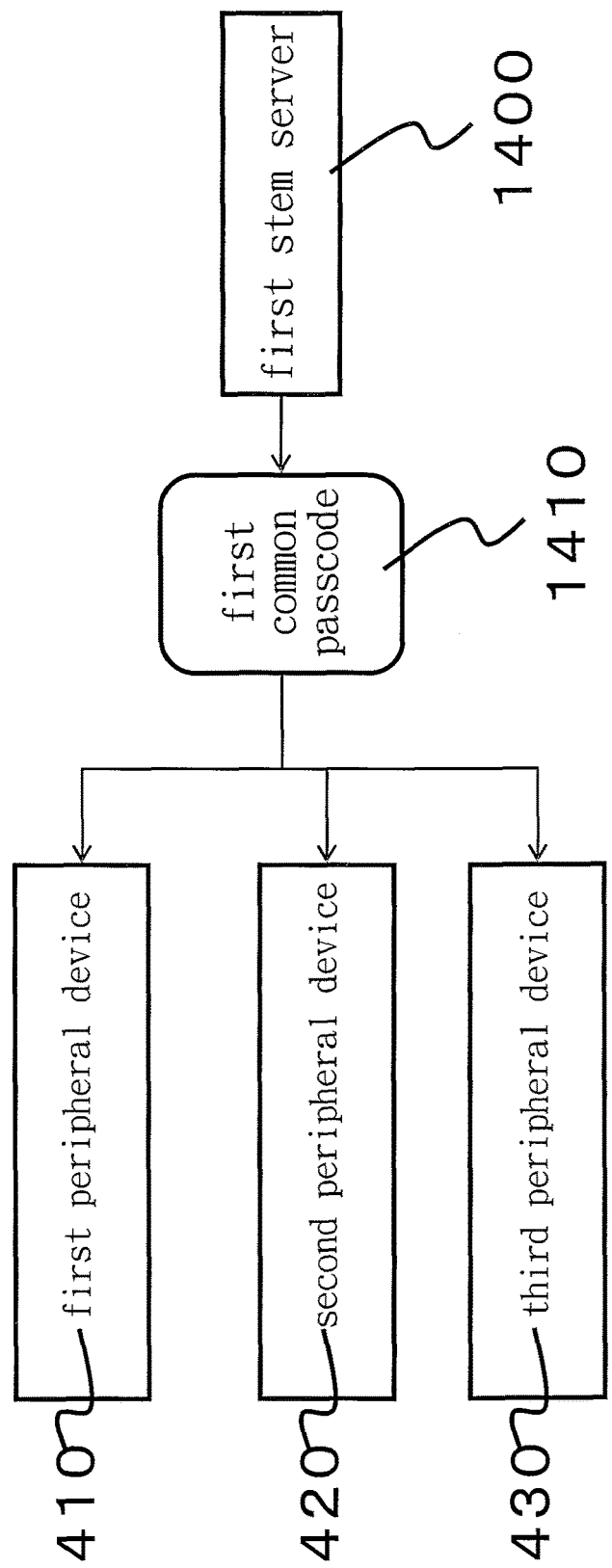
FIG. 10 is a diagrammatic view of a method of the stem server sending a common passcode to the peripheral devices comprising the chips carrying chip identification devices of the disclosure.
Figure 11:
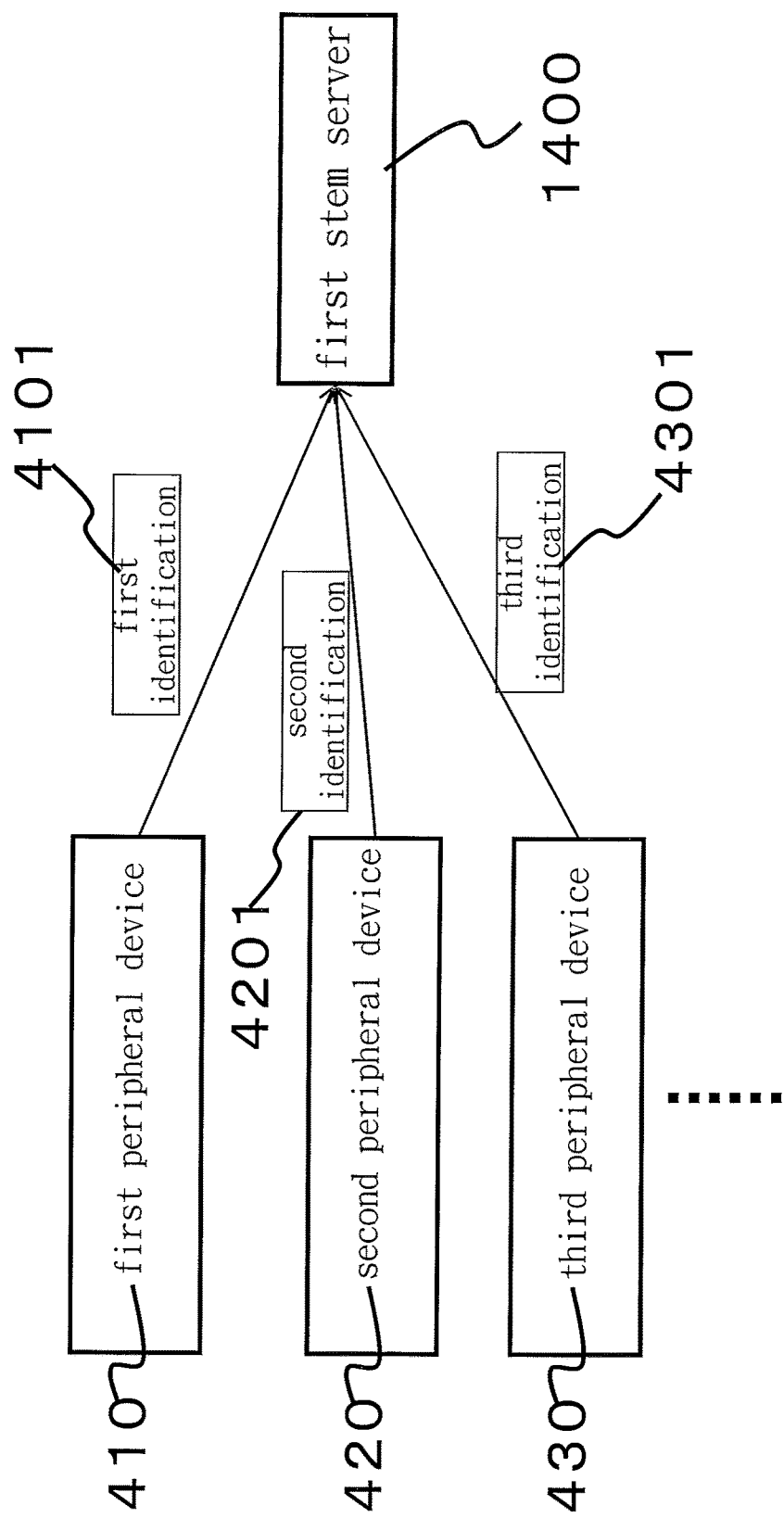
FIG. 11 is a diagrammatic view of a method of the peripheral devices comprising the chips carrying chip identification devices of the disclosure sending identification codes to the stem server.
Figure 12:
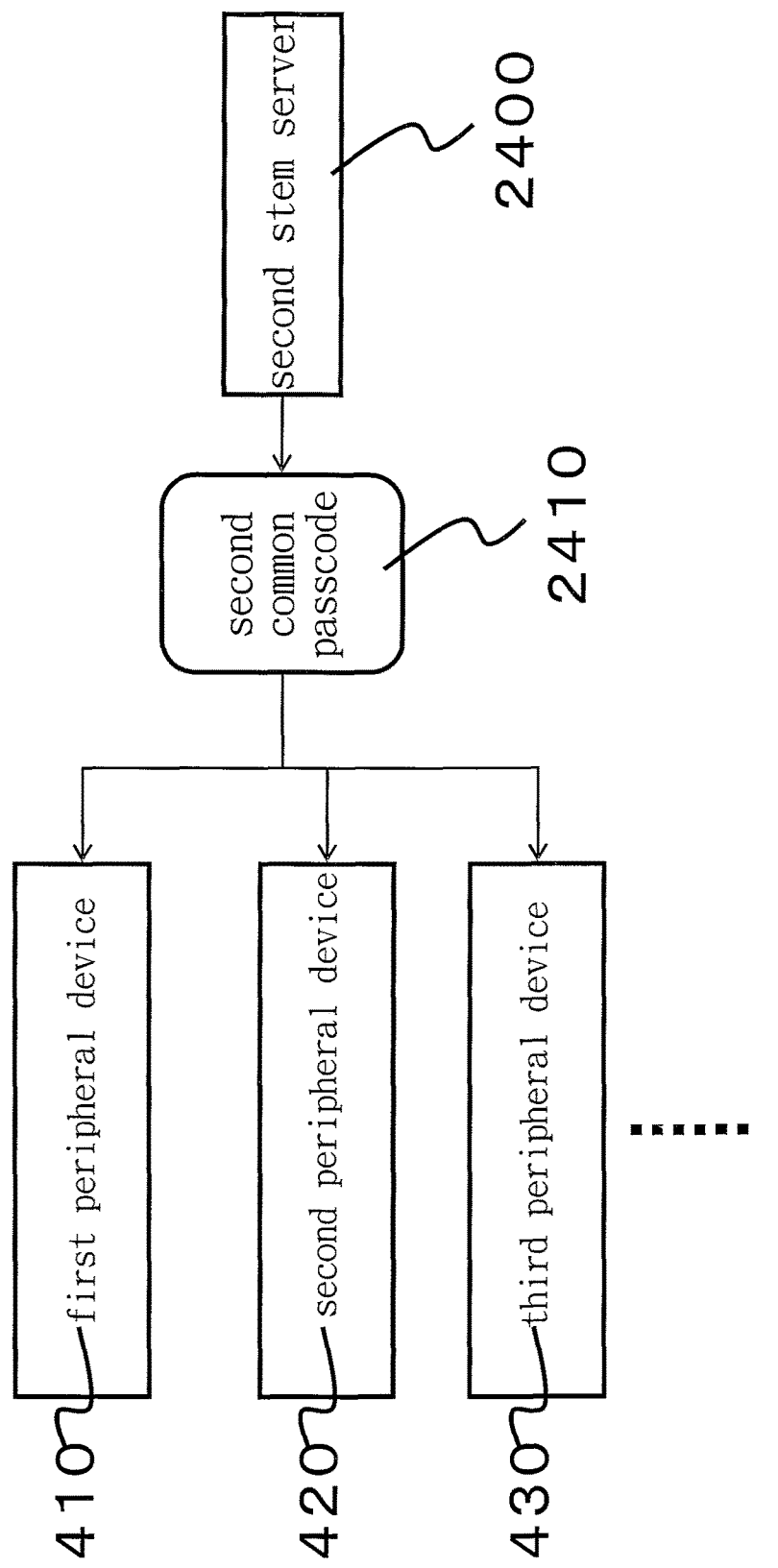
FIG. 12 is a diagrammatic view of a method of the stem server sending a common passcode to the peripheral devices comprising the chips carrying chip identification devices of the disclosure.
Figure 13:
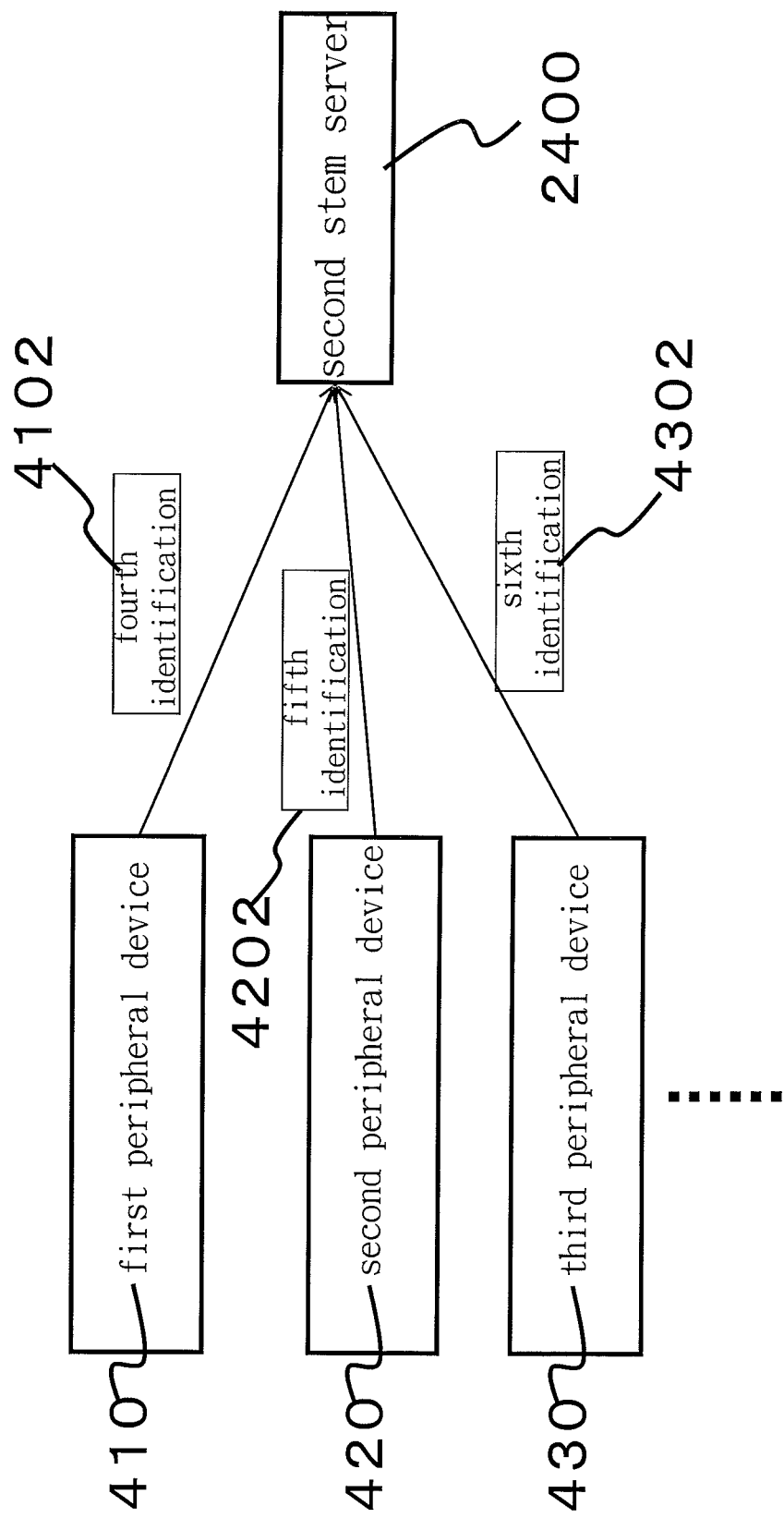
FIG. 13 is a diagrammatic view of a method of the peripheral devices comprising the chips carrying chip identification devices of the disclosure sending identification codes to the stem server.

Referring to FIG. 10, at least one of the common passcodes may be stored in a first stem server 1400, and may be sent to the peripheral devices to identify the peripheral devices. For instance, the first stem server 1400 may send a first common passcode 1410 to a first peripheral device 410, a second peripheral device 420, and a third peripheral device 430. The peripheral devices may identify the first stem server 1400 as "the one who sends the first common passcode 1410." As shown in FIG. 11, the first peripheral device 410, the second peripheral device 420, and the third peripheral device 430, may respond to the input of the first common passcode 1410; and then returning to the first stem server 1400 with a first identification 4101, a second identification 4201, and a third identification 4301, respectively. The first stem server 1400 may identify the first peripheral device 410, the second peripheral device 420, and the third peripheral device 430 as "those who return the first identification 4101, the second identification 4201, and the third identification 4301, in response to the first common passcode 1410", respectively. Similarly, as shown in FIG. 12, a second stem server 2400 may send a second common passcode 2410 to the first peripheral device 410, the second peripheral device 420, and the third peripheral device 430. The peripheral devices may identify the second stem server 2400 as "the one who sends the second common passcode 2410." As shown in FIG. 13, the first peripheral device 410, the second peripheral device 420, and the third peripheral device 430, may respond to the input of the second common passcode 2410; then returning to the second stem server 2400 with a fourth identification 4102, a fifth identification 4202, and a sixth identification 4302, respectively. The second stem server 2400 may identify the first peripheral device 410, the second peripheral device 420, and the third peripheral device 430 as "those who return the fourth identification 4102, the fifth identification 4202, and the sixth identification 4302, in response to the second common passcode 2410", respectively. Surely, any two of the first identification 4101, the second identification 4201, the third identification 4301, the fourth identification 4102, the fifth identification 4202, and the sixth identification 4302, are all different. Furthermore, the first stem server 1400 may also use another common passcode, which may be convenient for more advanced security management.

Figure 14:
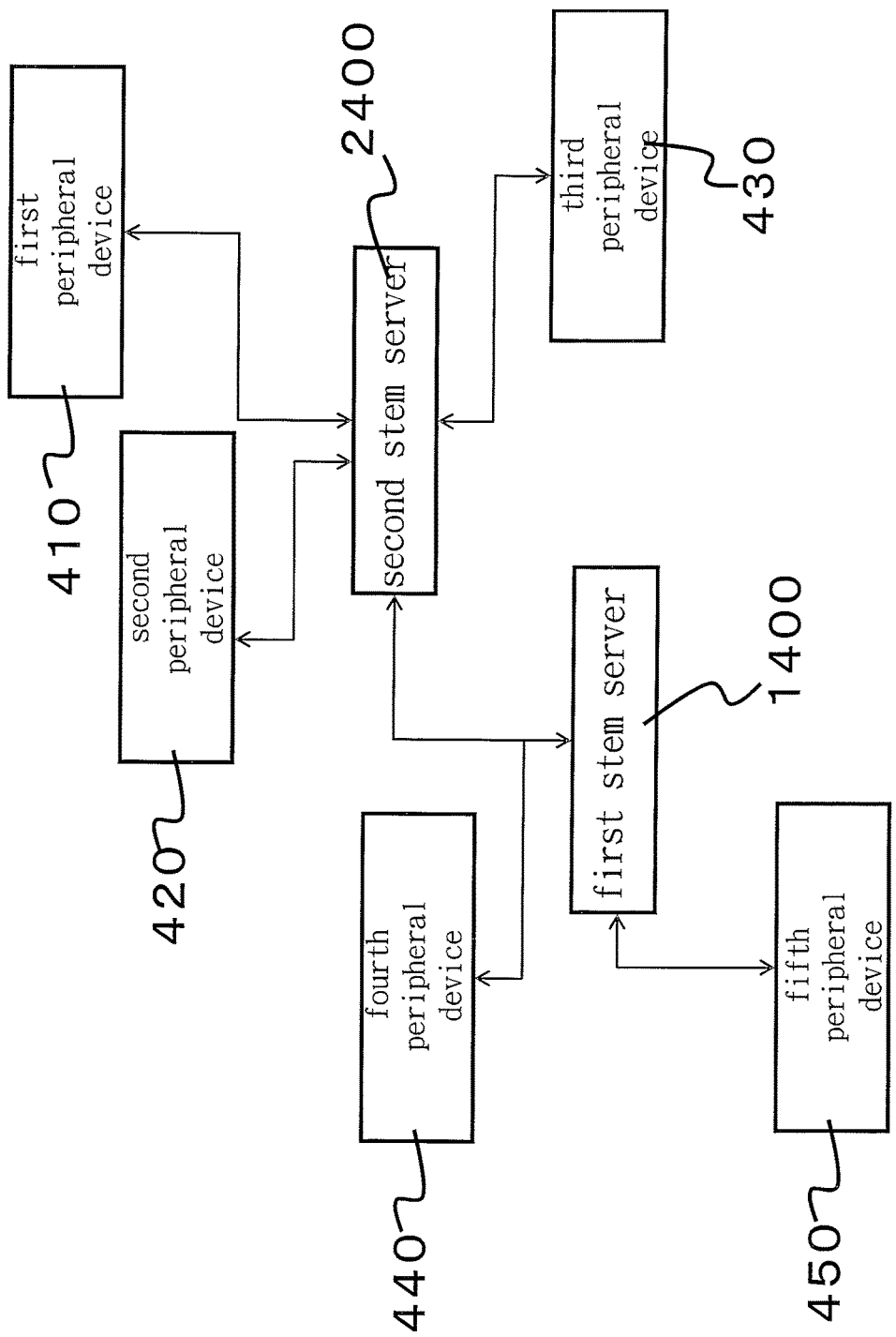
FIG. 14 illustrates an example of the network comprising a plurality of stem servers and a plurality of peripheral devices equipped with the chips having the chip identification devices of the present disclosure, wherein the network is divided into a first network unit and a second network unit connected to each other in a topology, wherein the topology comprises a stem server of the first network unit connecting to a stem server of the second network units.

In a real world network, the number of the peripheral devices may be limitlessly large and the number of stem servers may be more than one. For example, FIG. 14 shows a network comprising two stem servers (the first stem server 1400 and the second stem server 2400) and five peripheral devices (the first peripheral device 410, the second peripheral device 420, the third peripheral device 430, a fourth peripheral device 440, and a fifth peripheral device 450). This network is divided into two network units (a first network unit and a second network unit) connected in a topology. The first stem server 1400, the fourth peripheral device 440, and the fifth peripheral device 450 may form the first network unit, where the first stem server 1400 serves as the central control. The second stem server 2400, the first peripheral device 410, the second peripheral device 420, and the third peripheral device 430 may form the second network unit similarly. These network units may be connected in the topology only between the first stem server 1400 and the second stem server 2400. Moreover, the fourth peripheral device 440 and the fifth peripheral device 450 may be connected to the first stem server 1400; while the first peripheral device 410, the second peripheral device 420, and the third peripheral device 430 may be connected to the second stem server 2400. The connection here means that the electronic devices may be identified and be connected to each other with identification using the identification process provided above, not merely the normal connection. One of the features of the disclosure may be to provide such kind of networks that comprises a plurality of stem servers and a plurality of peripheral devices, wherein the stem servers may communicate with other stem servers directly, but the peripheral devices may not communicate with other peripheral devices directly. The reason may lie in the fact that the peripheral devices unreached by the central control may not have stored with input data, such as the common passcode. On the other hand, the peripheral devices may communicate with other peripheral devices indirectly through the stem servers. For instance, the first peripheral device 410 may communicate with the second peripheral device 420 indirectly through the second stem server 2400. The fourth peripheral device 440 may communicate with the fifth peripheral device 450 indirectly through the first stem server 1400. The third peripheral device 430 may communicate with the fourth peripheral device 440 indirectly through the first stem server 1400 and the second stem server 2400 connected via network. Thus, the resources for central control may be concentrated to the stem servers only. An auto-driving vehicle and a smart house may be a practical example for FIG. 14. For instance, the network unit comprising the first stem server 1400, the fourth peripheral device 440, and the fifth peripheral device 450 may be components of an auto-driving vehicle. At the same time, the network unit comprising the second stem server 2400, the first peripheral device 410, the second peripheral device 420, and the third peripheral device 430 may be components of a smart house. The battery of the auto-driving vehicle may charge the battery of the smart house when a disaster happens. For example, the auto-driving vehicle may have a sensor (such as the fourth peripheral device 440) monitoring the condition of the battery of the smart house. That is, the fourth peripheral device 440 may be connected via network to both of the first stem server 1400 and the second stem server 2400.

Figure 15:
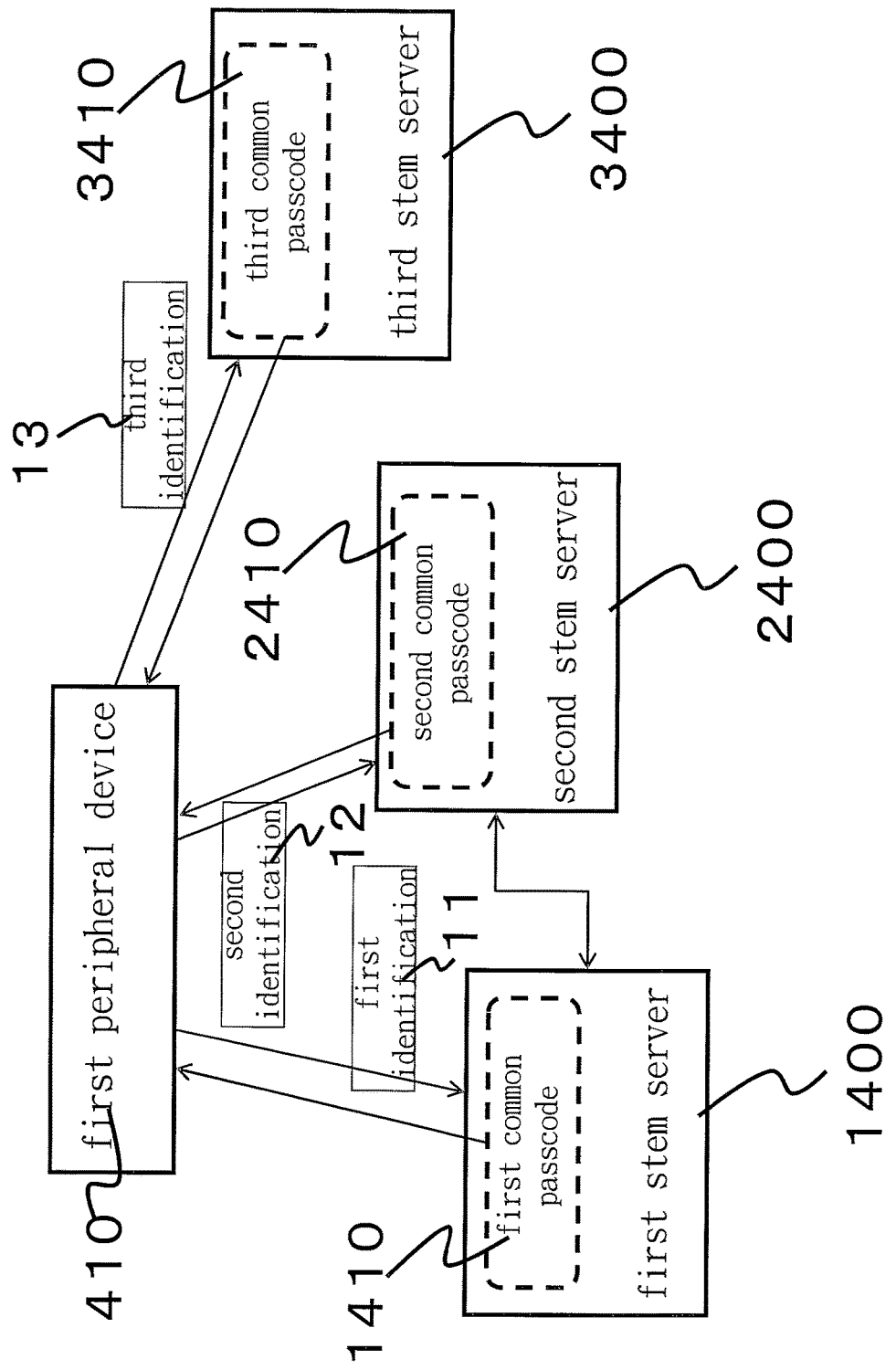
FIG. 15 illustrates an example in which the topology comprises at least one of the plurality of peripheral devices of the first network unit, wherein each of the at least one of the plurality of peripheral devices of the first network unit connects to one or more of the stem servers of the second network units, respectively.

Referring to FIG. 15, it may be acceptable that the topology is a peripheral device (e.g., the first peripheral device 410) connected to a plurality of stem servers (e.g., the first stem server 1400, the second stem server 2400, and a third stem server 3400) in the network related to the present disclosure. This network is divided into three network units (a first network unit and two second network units) connected in the topology. Among them, for example, the first stem server 1400 may communicate with the second stem server 2400 directly, while neither the first stem server 1400 nor the second stem server 2400 may communicate with the third stem server 3400 directly. It may not have been proved yet here that the third stem server 3400 may not be a remote attacker. Thus, it may be important that the first peripheral device 410 may not store any data regarding the communication identification (the common passcodes and so forth). For example, while the first peripheral device 410 has been registered to the first stem server 1400, the first stem server 1400 may set a bound to the connection of the first peripheral device 410 with other stem servers. Because the external I/O to control the device (such as an external I/O controlling circuit 980 in FIG. 23) may transfer all signals to be received by the first peripheral device 410 to the first stem server 1400, and the first stem server 1400 may monitor all of the input signals sent to the first peripheral device 410. Thus, if a code identical to the first common passcode 1410 is found, emergency treatment may be done. For instance, the first stem server 1400 may terminate the connection from the first peripheral device 410. Alternatively, the first peripheral device 410 may be used merely to monitor the conduct of the remote attacker. When the second stem server 2400 registers the first peripheral device 410 after the first stem server 1400, the second stem server 2400 may apply for a registration approval of the first peripheral device 410 to the first stem server 1400 in advance. To do so, the second stem server 2400 and the first stem server 1400 may have to be connected directly. If the first stem server 1400 permits the second stem server 2400 to connect to the first peripheral device 410, the first peripheral device 410 may receive the second common passcode 2410 and then return the second identification 12 to the second stem server 2400. By this way, the second stem server 2400 may register the first peripheral device 410. Afterwards, the second stem server 2400 and the first peripheral device 410 may be connected free from the approval of the first stem server 1400. Subsequently, in order that the third stem server 3400 connects to the first peripheral device 410, it may be necessary that the first stem server 1400, or the first stem server 1400 and the second stem server 2400, permits the first peripheral device 410 to receive the third common passcode 3410 from the third stem server 3400 in advance. By doing so, the first stem server 1400, or the first stem server 1400 and the second stem server 2400, may have the power to limit the connection of the third stem server 3400 and the first peripheral device 410. That is, if an unapproved input code is input to the first peripheral device 410, the connection to the first peripheral device 410 may be denied or limited. This power may be executed by certificated administrator of the first stem server 1400, or the first stem server 1400 and the second stem server 2400.

The first stem server 1400 may have the first common passcode 1410, the second stem server 2400 may have the second common passcode 2410, and the third stem server 3400 may have a third common passcode 3410. In other words, the first peripheral device 410 may identify the first stem server 1400 as "the one who inputs the first common passcode 1410 to the first peripheral device 410", the second stem server 2400 as "the one who inputs the second common passcode 2410 to the first peripheral device 410", and the third stem server 3400 as "the one who inputs the third common passcode 3410 to the first peripheral device 410." In responding to those inputs, the first stem server 1400 may identify the first peripheral device 410 as "the one who returns the first identification 11 to the first stem server 1400", the second stem server 2400 may identify the first peripheral device 410 as "the one who returns a second identification 12 to the second stem server 2400", and the third stem server 3400 may identify the first peripheral device 410 as "the one who returns a third identification 13 to the third stem server 3400." Here, the data regarding the communication identification (the common passcodes or the returned identification data in responding to the common passcodes) may be stored in the stem servers, but may not be stored in the peripheral device. The peripheral device may have the chip identification device of the disclosure.

Next, the requirements that may have to be satisfied in the chip identification method of the disclosure will be described.

(The property of output independence)

Figure 16:
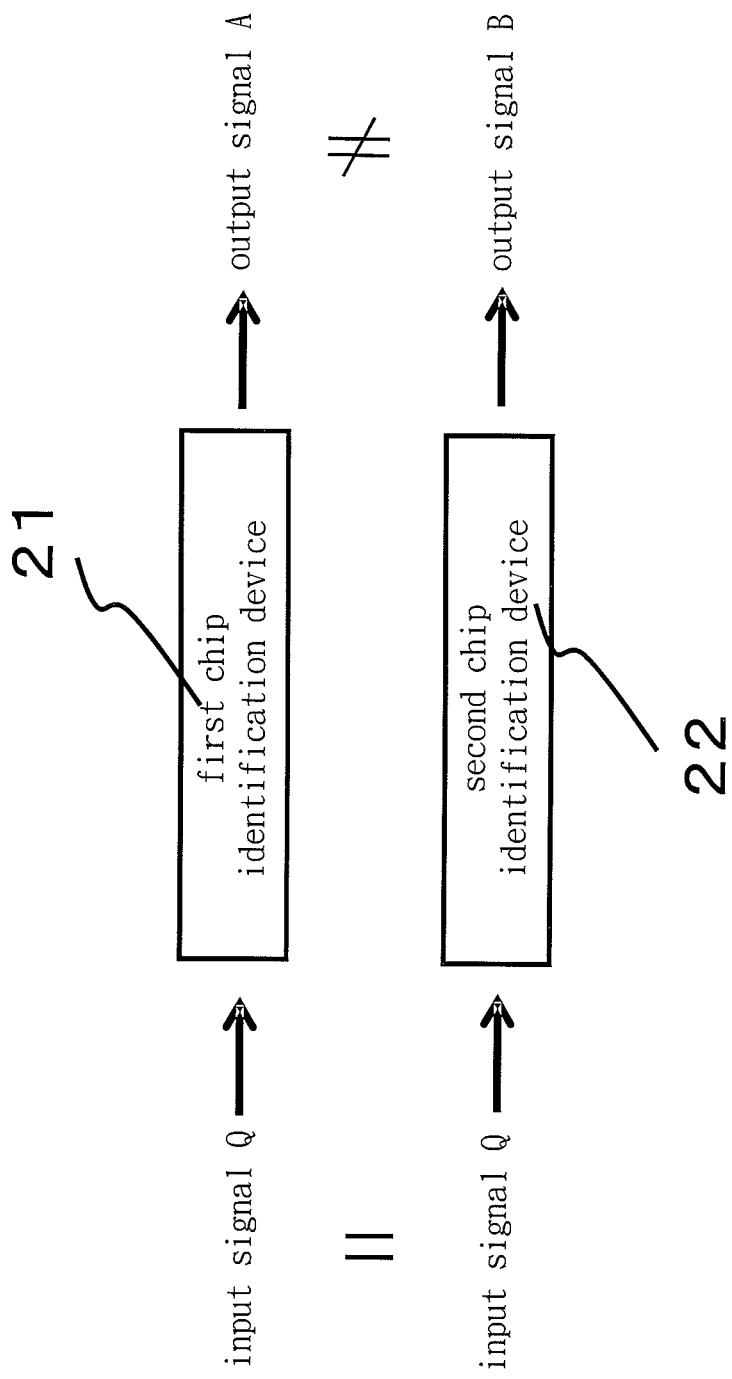
FIG. 16 shows the property of output independence that the chip identification device of the disclosure must satisfy.

Firstly, let us define the property when a same input signal is input to two different chip identification devices. As shown in FIG. 16, a same input signal (input signal Q) is input to two different chip identification devices, i.e., a first chip identification device 21 and a second chip identification device 22. At the time that the same input signal is input to them, the first chip identification device 21 may generate an output signal A, and the second chip identification device 22 may generate an output signal B, wherein the output signal A and the output signal B are different each other. That is, even though the input signals are identical, the output signals may be different while the chip identification devices are different. This property may be a necessary requirement for examples using common passcodes (FIG. 10, FIG. 11, FIG. 12, and FIG. 13). In other words, even if the same common passcodes are sent to the peripheral devices having different chip identification devices as input signals independently, the signals returned from each peripheral device may be different with regard to peripheral devices. For instance, as shown in FIG. 10, the first common passcode 1410 is sent to the peripheral devices having different chip identification devices, which may be the first peripheral device 410, the second peripheral device 420, and the third peripheral device 430, the output signals returned from the peripheral devices are shown in FIG. 11, which may be the first identification 4101, the second identification 4201, and the third identification 4301. Here, any two of the first identification 4101, the second identification 4201, and the third identification 4301 are different each other. Similarly, the example shown in FIG. 12 and FIG. 13 may also illustrate the same property.

(The property of input independence)

Figure 17:
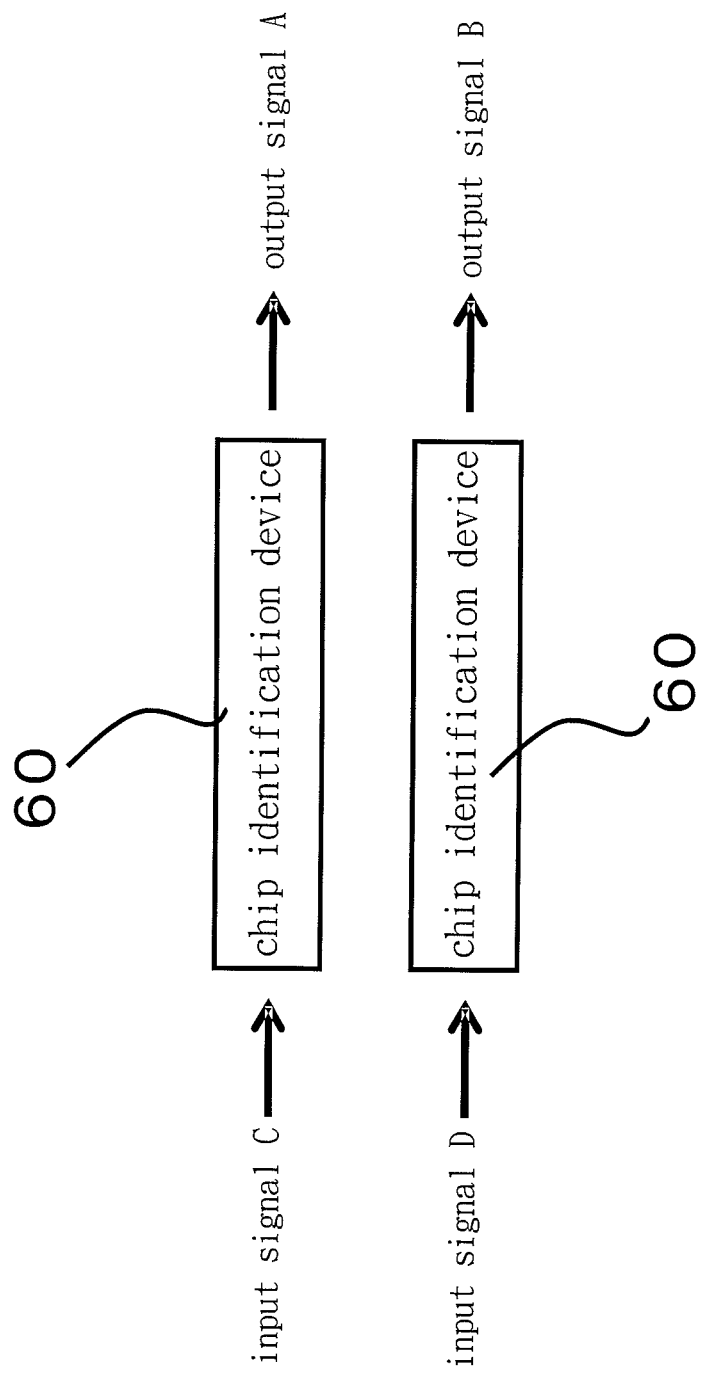
FIG. 17 shows the property of input independence that the chip identification device of the disclosure must satisfy.

In contrast, inputting different input signals to identical chip identification device may generate different output signals. For example, as shown in FIG. 17, inputting an input signal C to a chip identification device 60 may generate an output signal A, while inputting an input signal D to the identical chip identification device 60 may generate an output signal B. Here, as long as the input signal C and the input signal D are different, the output signal A and the output signal B may also be different signals. As shown in FIG. 15, the different stem servers sending the different passcodes to the same peripheral device as the input signals, and then the different stem servers may receive the different identifications as the output signals from the same peripheral device. This property may be a necessary requirement. More specifically, the first stem server 1400 may send the first common passcode 1410 to the first peripheral device 410, and the first peripheral device 410 may return to the first stem server 1400 with the first identification 11; the second stem server 2400 may send the second common passcode 2410 to the first peripheral device 410, and the first peripheral device 410 may return to the second stem server 2400 with the second identification 12; and the third stem server 3400 may send the third common passcode 3410 to the first peripheral device 410, and the first peripheral device 410 may return to the third stem server 3400 with the third identification 13. Here, needless to say, any two of the first identification 4101, the second identification 4201, and the third identification 4301 are different from each other.

Therefore, FIG. 14 may present an example satisfying the requirements of the property of input independence and the property of output independence simultaneously. Practically, in almost all situations, the number of the stem servers may be larger than 2, and the number of the peripheral devices may be larger than 5. FIG. 14 may provide one of the simplest examples and not more.

(The property of output unpredictability)

Figure 18:
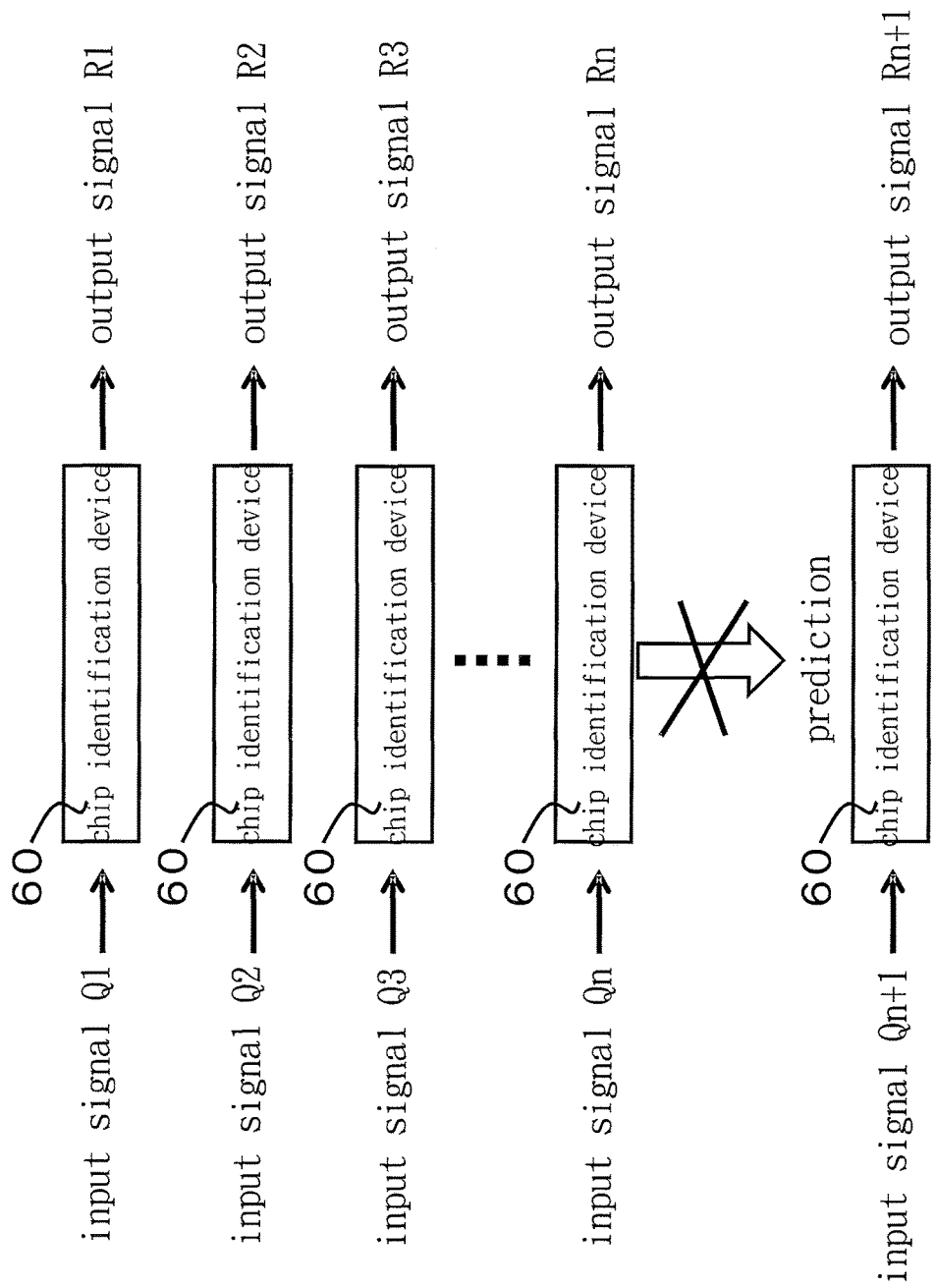
FIG. 18 shows the property of output unpredictability that the chip identification device of the disclosure must satisfy.

As shown in FIG. 18, it may already be known that sending n input signals Q1-Qn to the same chip identification device 60, may generate output signals R1-Rn in responding to each input signals. Provided that n is an integer larger than 2, the output signal Rn+1, which may be generated when sending the input signal Qn+1 to the chip identification device 60, may not be predicted based on the combination of (Q1, R1), (Q2, R2), . . . , (Qn, Rn), while the input signal Qn+1, which may be different from any of the n input signals Q1-Qn, is not sent to the same chip identification device 60. If the chip identification device 60 generates output by using a certain algorithm, which means the identification is returned by using software, the requirement may be unsatisfied. Thus, the chip identification device 60 may have to generate the output signals based on physical randomness.

(The property of input-output reliability)

Figure 19:
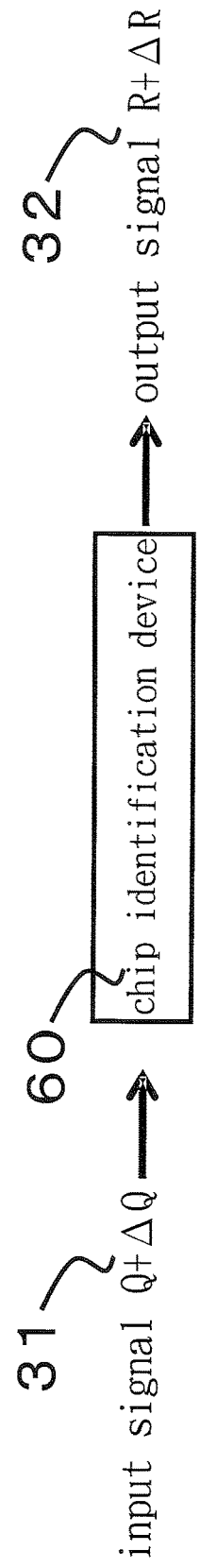
FIG. 19 shows the property of input-output reliability that the chip identification device of the disclosure must satisfy.

As shown in FIG. 19, a noise, which may be uncontrollable by a circuit controlling the input signal Q, may cause an input signal error $\Delta Q$ (31) to be added to the input signal Q. On the other hand, the input signal error $\Delta Q$ (31), which may be uncontrollable by a circuit controlling the output signal R, may cause an output signal error $\Delta R$ (32) to be added to the output signal R. In this event, the absolute value of the difference between two different input signals (such as Q1 and Q2) may be larger than the maximum value of the absolute value of the input signal error ΔQ (31). Here, the absolute value of the difference between an output signal R1, which may be output in responding to the input signal Q1, and an output signal R2, which may be output in responding to the input signal Q2, may have to be larger than the maximum value of the absolute value of the output signal error ΔR (32).

The chip identification method of the disclosure may have to satisfy all four requirements described above simultaneously, namely, the property of output independence, the property of input independence, the property of output unpredictability, and the property of input-output reliability.

(Inspection)

When updating a network without the disclosure, which may already exist before applying the disclosure, to satisfy the requirement of the disclosure, the peripheral devices connected to the stem servers may have to be replaced with the peripheral devices comprising the chips including chip identification devices of the disclosure. At the time, it may be needed to inspect whether the replacements have been done completely. Or, it may be needed to inspect whether a portion of the peripheral devices, which may adopt the chips without the chip identification devices of the disclosure, have been inappropriately used. The inspections here may act as a part of the protection inspection of the stem servers, and thus may be conducted at any time. It may be preferred that the inspections are also conducted when registering the peripheral devices.

The most effective method of conducting the inspection may be to conduct remote attacks on the peripheral devices, which may be the targets of the inspection, from the stem servers serving as the central control. The chips comprised in the peripheral devices, which may be the targets of the inspection, may have to store in the inner memories thereof with the corresponding tables of common passcodes and registration codes, if the chip identification devices of the disclosure are not adopted (refer to FIG. 20). The chips comprising the chip identification devices of the disclosure may not have the codes stored in the inner memories thereof. In the network of the disclosure, only the stem servers may have appropriately stored the code corresponding tables as shown in FIG. 20. Referring to FIG. 9, the combination of the input codes 402 and the registration codes 403 may provide the corresponding table. The input codes 402 in FIG. 9 corresponds to the input codes 42 in FIG. 20, and the registration codes 403 in FIG. 9 corresponds to the registration codes 43 in FIG. 20.

Figure 21:
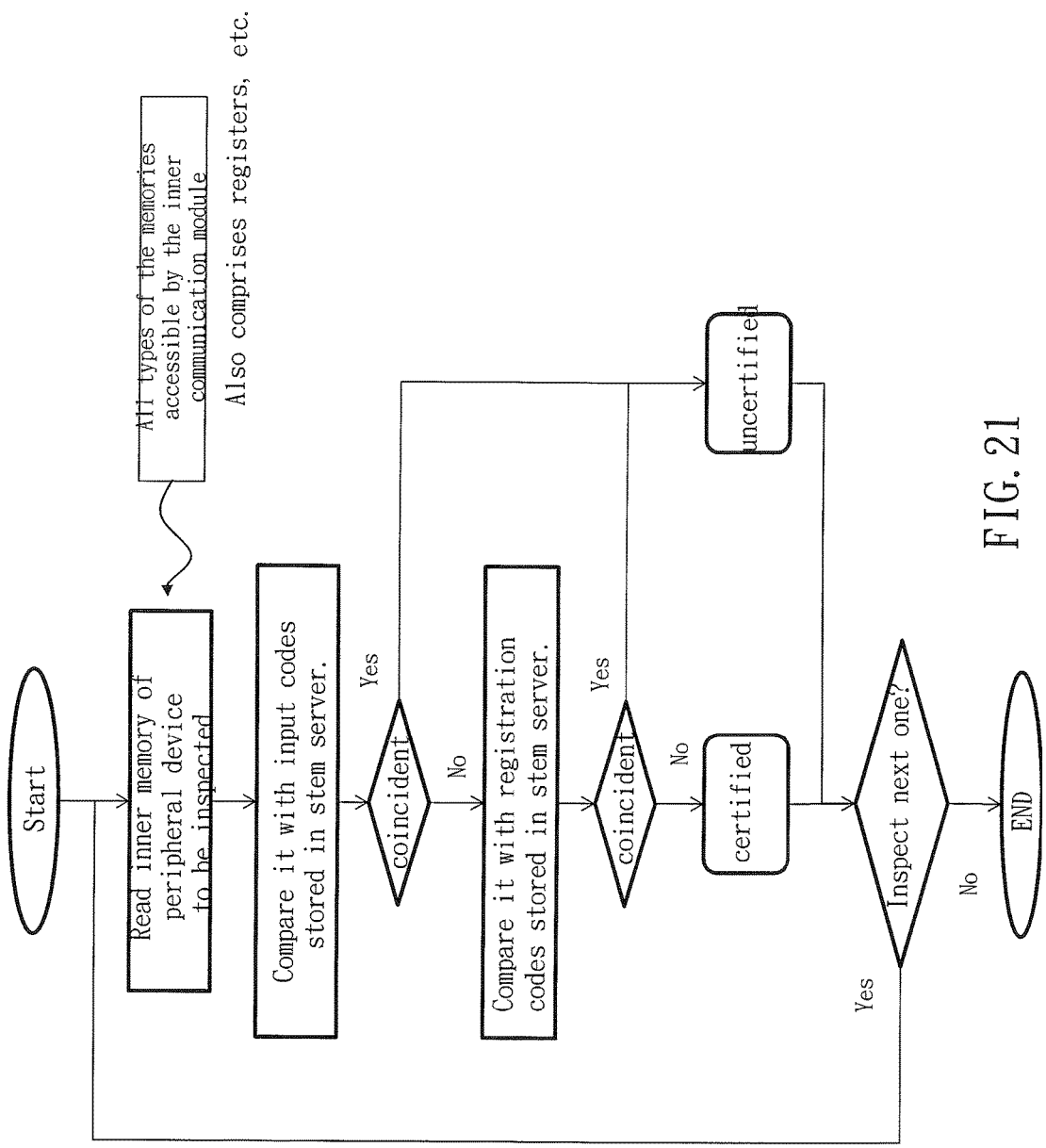
FIG. 21 is a flow chart of a process of inspecting the certification of a peripheral device.

The specific process of the inspection may be shown in FIG. 21. Firstly, find the peripheral devices to be inspected. Next, the inner memories of the peripheral devices under inspection may be read. Then, whether identical codes are found among the input codes stored in the stem server, may be examined. If no identical codes are found, further compare them to the registration codes stored in the stem server. If still no identical codes are found, the peripheral devices under inspection may be determined as certificated. Subsequently, move onto another peripheral device to be inspected. If no other peripheral device to be inspected, the inspection process may be over. If yes, read the inner memories of the peripheral device to be inspected, and the rest remains the same.

Thus, all of the devices comprising the network with the chip identification method of the disclosure, as shown in FIG. 14, may be divided into one group of the stem servers (e.g., 1400 and 2400), which may be protected and managed by well-trained security experts, and the other group of the peripheral devices (e.g., 410, 420, 430, 440, and 450), which may not be managed by the security experts. Here, the peripheral devices may not be connected to any other peripheral devices, while they may be connected to at least one of the stem servers. Accordingly, the network unit may comprise the stem server and a plurality of peripheral devices connected directly to the stem server. The stem server may be connected freely with other stem servers, and a peripheral device may be connected to another peripheral device indirectly through at least one of the stem servers. Thus, a network unit may also be connected to another network unit. FIG. 14 provides an example where two network units may form a joint network by connecting the stem servers thereof. Practically, there may be more stem servers, which means, a network comprising more network units may be formed. Furthermore, the connections between the electronic devices in the network may identify each other according to the identification process provided above, which means the connection with the identification.

Each peripheral device may have different chip identification device. As shown in FIG. 10 and FIG. 12, the stem servers (1400 and 2400) may have stored at least one intrinsic common passcodes (1410 and 2410), respectively. Referring to FIG. 9, the common passcodes (1410 and 2410) sent by the stem servers (1400 and 2400) may be securely stored in the inner memories thereof as input codes (e.g., 402). Referring to FIG. 11 and FIG. 13, the peripheral devices (410, 420, and 430) input with the common passcodes (1410 and 2410) may return to the stem server (1400 and 2400) the intrinsic identifications (4101, 4201, and 4301) and (4102, 4202, and 4302), in responding to the same common passcodes, respectively. Here, the returned identifications may differ from each other. Thus, the chip identification devices of the disclosure comprised in the peripheral devices may have to satisfy the property of output independence, as shown in FIG. 16. Referring to FIG. 9, the stem server may compare conveniently the output codes returned by the peripheral devices in responding to each input code (e.g., 402) and the registration codes (e.g., 403), which may be securely stored in the inner memory of the stem server.

Referring to FIG. 15, a peripheral device may be allowed to connect with a plurality of stem servers. In this event, the peripheral device (e.g., 410) may be input with a plurality of common passcodes (e.g., 1410, 2410, and 3410), and then different identifications (e.g., 11, 12, and 13) may have to be returned to the plurality of stem servers in responding to different inputs, respectively. Thus, as shown in FIG. 17, the chip identification device may have to satisfy the property of input independence.

Next, let us consider the requirements regarding the chip identification device of the disclosure. Firstly, provided forming the chip identification devices with software, the output signals in responding to the input signals, may have to be generated by using a certain algorithm. Thus, if the remote attacker (e.g., 93) decodes the algorithm, the registration codes may be counterfeited, as shown in FIG. 20, while the input codes are known. By doing so, the remote attacker may steal some of peripheral devices, and may be able to inappropriately access the stem server. To preclude such an inappropriate conduct, the chip identification device of the disclosure may have to satisfy the property of the output unpredictability, as shown in FIG. 18. However, once the programs are designed with algorithm, any program may never satisfy the property of the output unpredictability. That is, it may be impossible to generate totally random codes by using any program and any algorithm. Therefore, the chip identification device of the disclosure may have to adopt the physical randomness.

Figure 64:
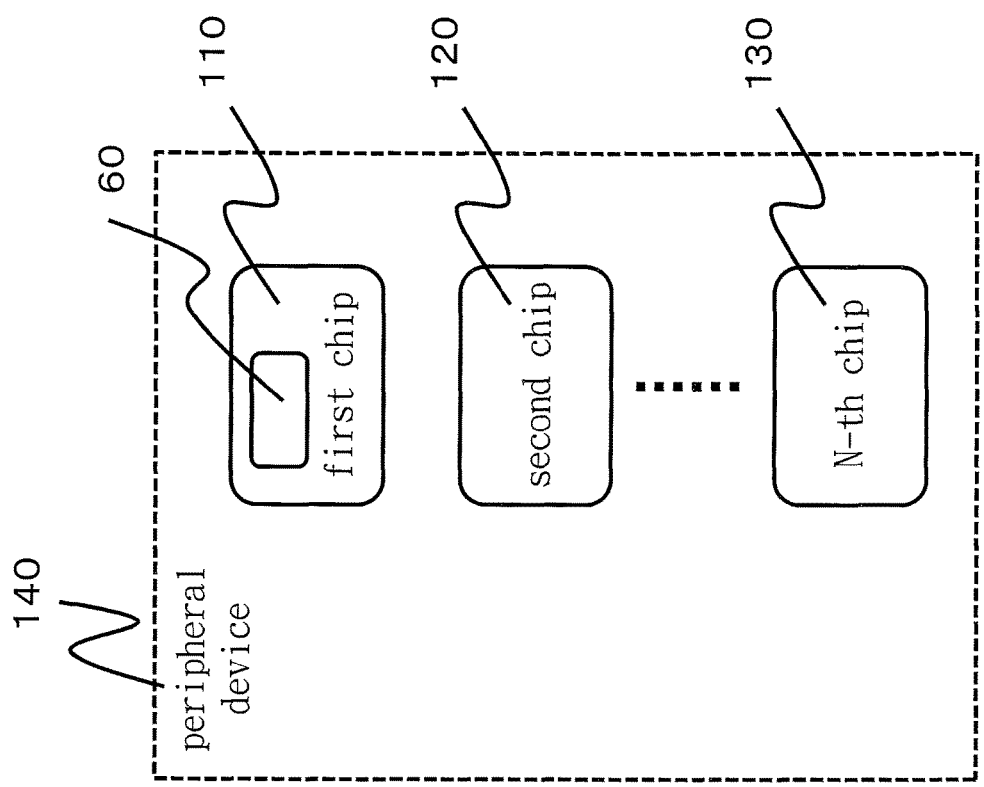
FIG. 64 is a diagrammatic view of a peripheral device carrying the chip comprising the chip identification device.

The chip identification device described above may be hybrid by being mixed with and carried along with semiconductor chips comprising modules providing other functions, while it may also be possible to independently manufacture semiconductor chips only having the chip identification function. Moreover, it may be preferred that the chip identification device generates the output signals (the identification codes) adopting the physical randomness, after receiving the input codes (the common passcodes). The common passcodes may not be stored in the inner memories of the peripheral devices. Given that the electronic devices may be formed with a plurality of chips, as shown in FIG. 64, carrying at least one chip of the chip identification device of the disclosure may be required. Furthermore, the chip identification device itself may also be an electronic device fulfilled with a semiconductor chip. Therefore, the network may be a network of electronic devices having at least one chip, which comprises the peripheral devices and the stem servers as components.

The chip identification device of the disclosure may be formed on a semiconductor nonvolatile memory. Firstly, let us generate random combinations of "1"s and "0"s using any method. Here, the checker pattern shown in FIG. 22 with randomly disposed white and black blocks may be generated by using black color to represent "1"s and using white color to represent "0"s, and distribute them according to the address of the memory cell arrays. As long as the random number is generated in digital, the property of input-output reliability as shown in FIG. 19 may be satisfied.

Therefore, the chip identification device of the disclosure may be used to control the uncertainty of semiconductor devices and the manufacturing processes of semiconductor devices, and thus to generate the required physical randomness described above.

Regarding one of the embodiments of the disclosure, let us refer to the figures and the description below.

Figure 22:
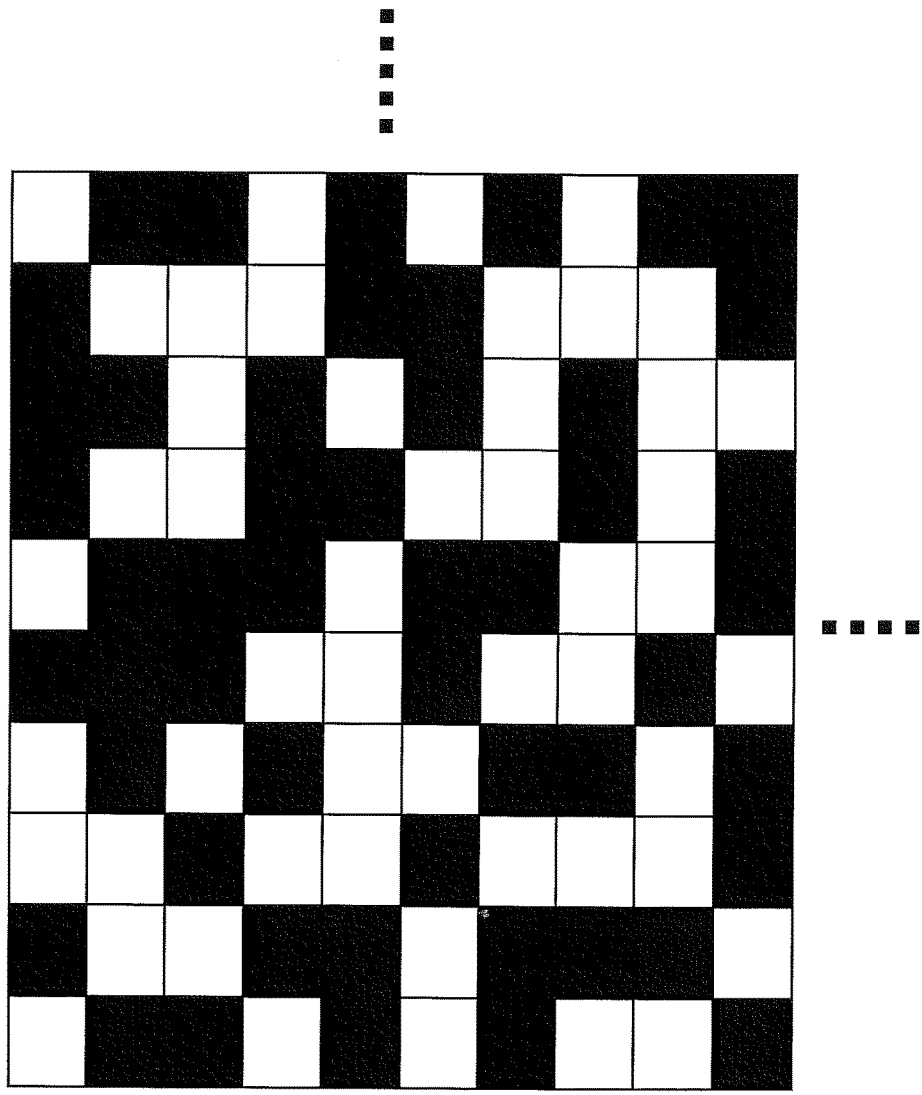
FIG. 22 is a diagrammatic view of data disposed in checker pattern.
Figure 23:
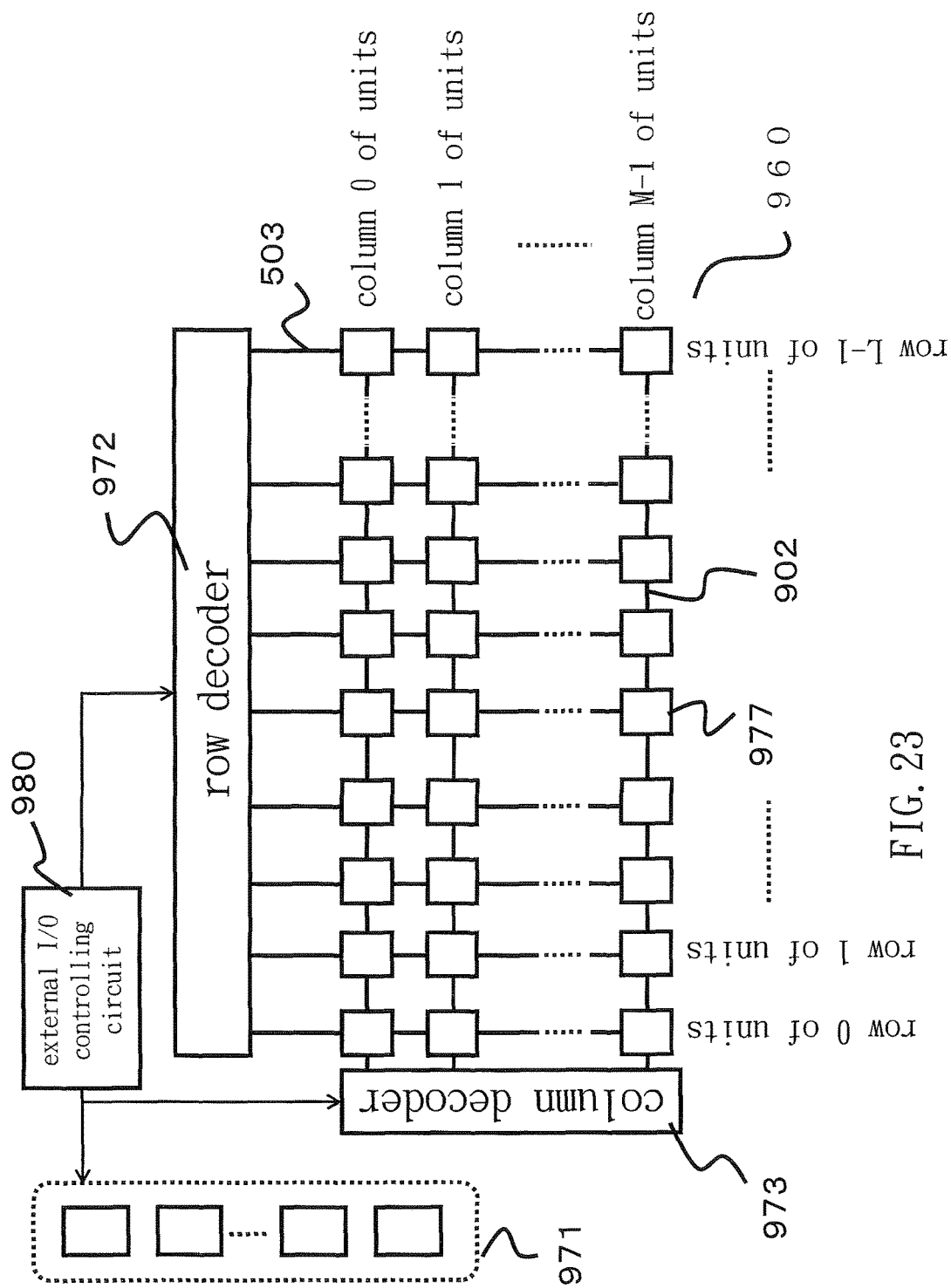
FIG. 23 is a diagrammatic view of layout of an identification unit.

Referring to FIG. 23, it shows an example of the arrangement of the units in FIG. 22. Along the direction of rows, there may be L lines of word lines 503. The bit lines 902 may be arranged in M lines along the direction of columns, and may be perpendicular to the L lines of the word lines 503. Identification cell 977 of the components of the chip identification device may be disposed at the intersections of the L lines of the word lines 503 and the M lines of the bit lines 902. Though this example is different from the cell array of the nonvolatile memory and does not comprise any select gate, the essence of the disclosure may not be changed if a select gate is imposed into between the word line (L−1) and a bit line contact 505, and, between the word line (0) and the bit line contact on the opposite side.

Figure 24:
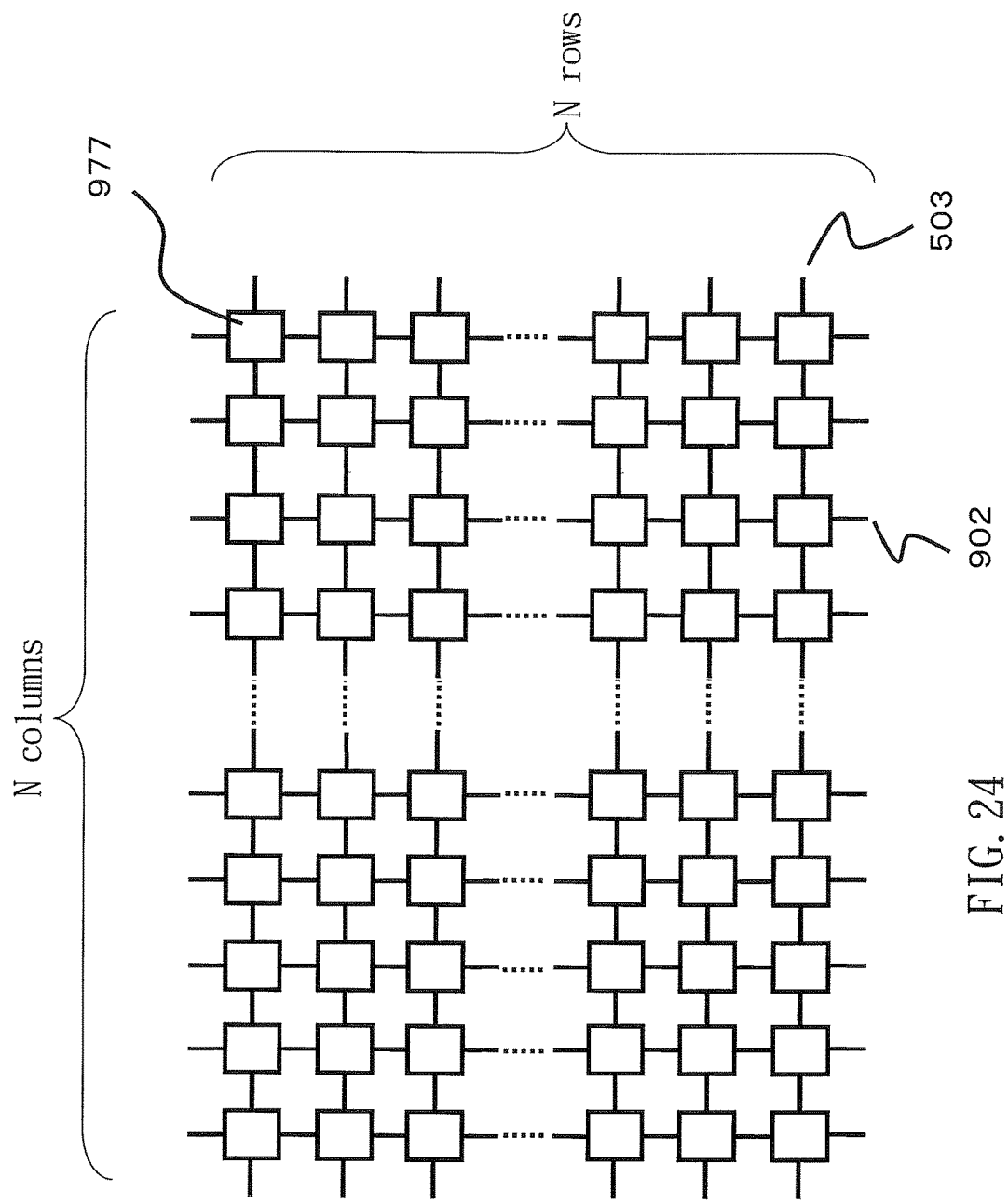
FIG. 24 is a diagrammatic view of layout of the identification unit in checker pattern with N rows and N columns.

Referring to FIG. 24, it shows an example extracting N lines from the word lines 503 and N lines from the bit lines 902 of the identification cell array 960 in FIG. 23. N may generally be a natural number less than or equal to L and M.

Figure 25:
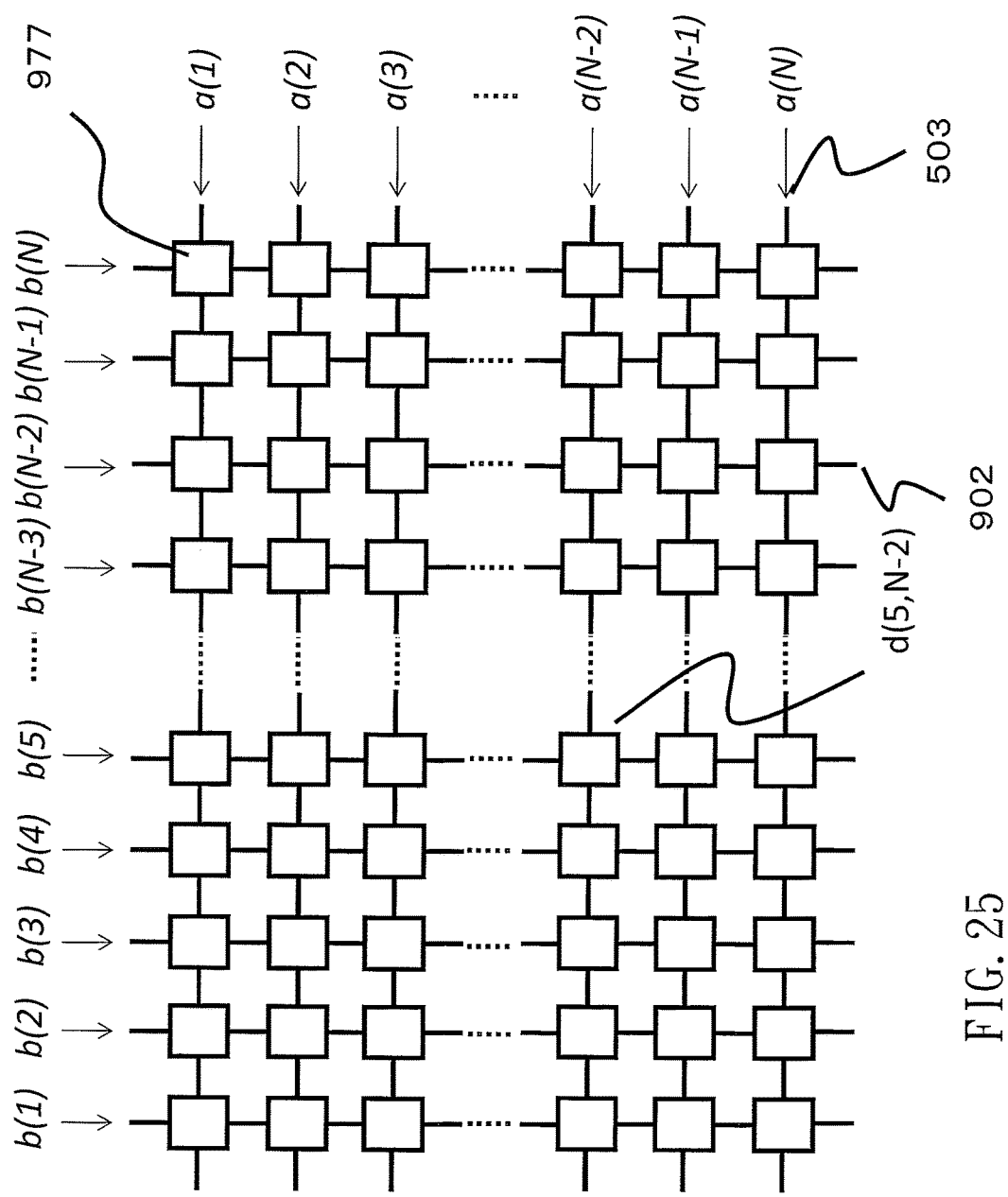
FIG. 25 is a diagrammatic view of inputting input codes to the identification unit with layout in checker pattern with N rows and N columns.

For example, with input codes (P, S, T, . . . ), let us consider the situation of (a(1), b(1), a(2), b(2), . . . , a(N), b(N)). The input codes may be separated into an array a and an array b, as shown in FIG. 25, corresponding to (a(1), a(2), . . . , a(N)) starting from the first row, and corresponding to (b(1), b(2), . . . , b(N)) starting from the first column. In this event, the data at row i column j of the identification cell 977 may be regarded as a component d(i, j). (i, j) may correspond to the address of the identification cell 977. In the example shown in FIG. 25, there is a component d(5, N−2). Here, {d(i, j)}, the set of component d(i, j), may be random codes comprising the random aggregates of 0s and 1s. Thus, the input codes may be divided into two groups, corresponding to rows and columns, respectively, and may correspond to the addresses of the input codes and the identification units. The division of the input codes may be conducted following a predetermined formula. Of course, the exchange of the array a and the array b may be one of the examples. There may be infinite methods, while the method as shown in the example, which extracts the array a and the array b from the input codes orderly, may merely be one of the examples. Moreover, the number of the components of the array a and the array b may not have to be equal. However, the sum of the number of the rows and the number of the columns of the identification cell array 960 may have to be at least larger than 2N, in order to have all the components of the input codes to be input. Here, the input codes are expressed as {a(i), b(j)}, given that i and j are independent natural numbers. Thus, the output codes {c(i, j)} may be generated from the series {a(i)}, series {b(j)}, and the random codes {d(i, j)} by any method. The combination of the input codes {a(i), b(j)} and the output codes {c(i, j)} may correspond to the communication series 80 shown in FIG. 6. The random codes {d(i, j)} may be adopted as an example of the physical random number.

The embodiments of the disclosure mainly concern the methods generating output codes {c(i, j)} from a first input series {a(i)}, a second input series {b(j)}, and the physical random number {d(i,j)}. Illustration is provided below along with drawings.

The First Embodiment

One of the examples may adopt the modulo mod(x, y) to generate the output codes {c(i, j)}. This may be the remainder of X being divided by y.

$$c(i,j) = \mathrm{mod}(a(i)+b(j)+d(i,j), 2) \qquad \text{Formula 1}$$

FIG. 26 provides a chart showing the relationships of the series {a(i)}, the series {b(j)}, the physical random numbers {d(i, j)} and the output codes {c(i, j)} generated by Formula 1. After applying the function, it may be easily expected that the ratio of the number of the 0s and the 1s is not changed. This may be a necessary requirement of the stabilization of the quantity of the data processed by the communication series 80. Thus, the quantity of the data input from the right of Formula 1 and the quantity of the data output from the left of Formula 1 may be made identical. In other words, if there is a huge difference between the quantity of the input information and the quantity of the output information, the quantity of the information of the system defined in Formula 1 may be made identical to the quantity that is less. As a result, at least a portion of the information that corresponds to the difference of the two quantities may be lost.

Figure 27:
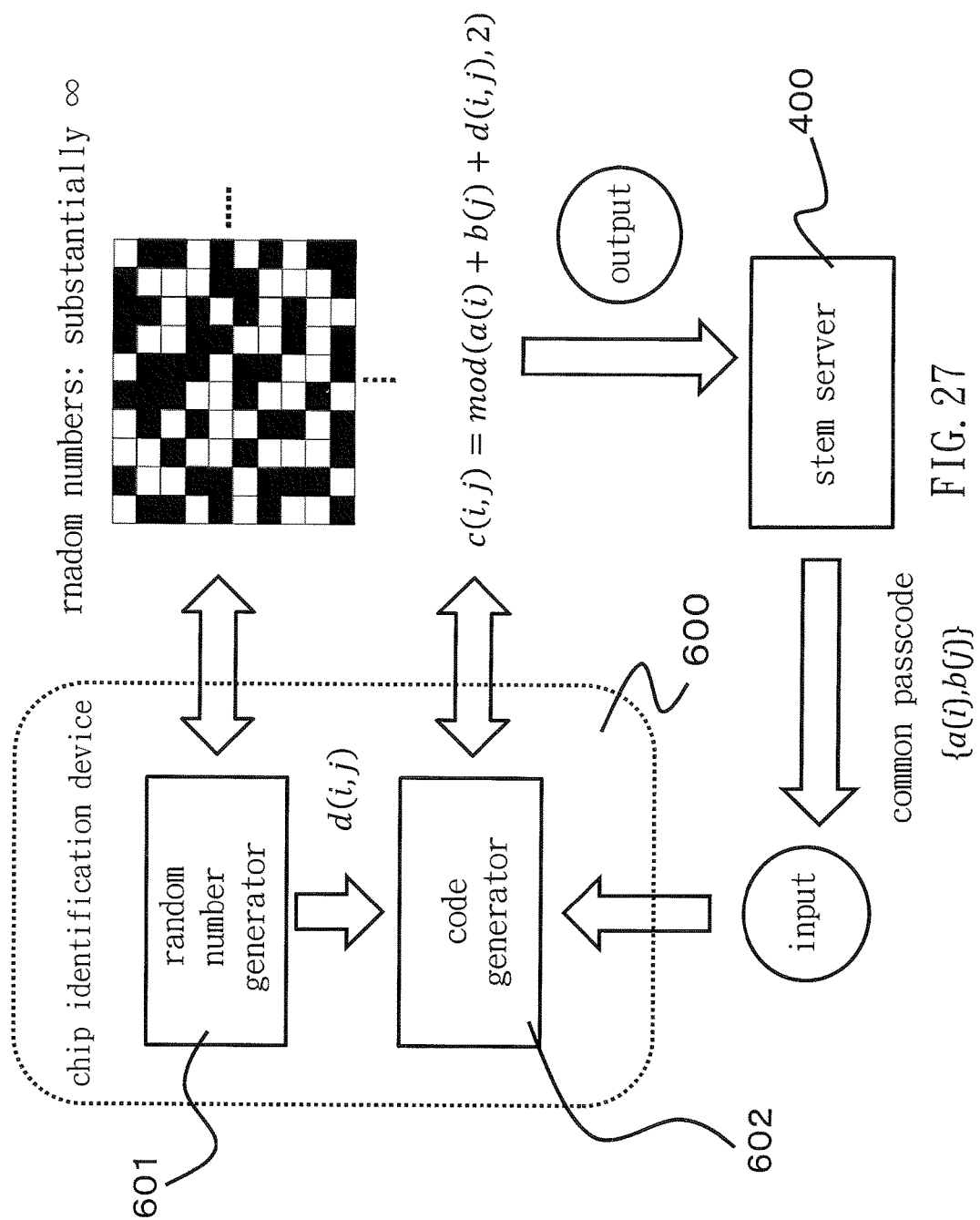
FIG. 27 is a diagrammatic view of the components for showing an example of using the chip identification device.

Referring to FIG. 27, it provides a concept of the basic components realizing the mechanism shown in Formula 1. That is, it comprises generating the physical random numbers {d(i, j)} using the random number generator 601, inputting the input codes {a(i), b(j)} as the common passcodes from the stem server 400, and generating the output codes {c(i, j)} using a code generation 602. In this example, the random number generator 601 and the code generator 602 may both belong to the components of the chip identification device 600. On the other hand, though not shown in the figure since it may be self-evident, the code generator 602 may be disposed outside of the chip identification 600. Anyway, at least the random number generator 601 may be implemented into the chip at as low in cost as possible. In the disclosure, FIG. 22 provides the concept of an example of the random number generator 601. The code generator 602 may be constructed by program according to the conceptual illustration of Formula 1. Here, the codes may be generated by using an algorithm, while obtaining the physical randomness from the physical random number $\{d(i,j)\}$ may be one of the features of the disclosure. However, the sum of the numbers of the rows and the columns of the random number generator 601 may have to be larger than or at least equal to the sum of the numbers of the components of $\{a(i)\}$ and $\{b(j)\}$, in order to have all of the components of the input codes to be input.

The Second Embodiment

Figure 28:
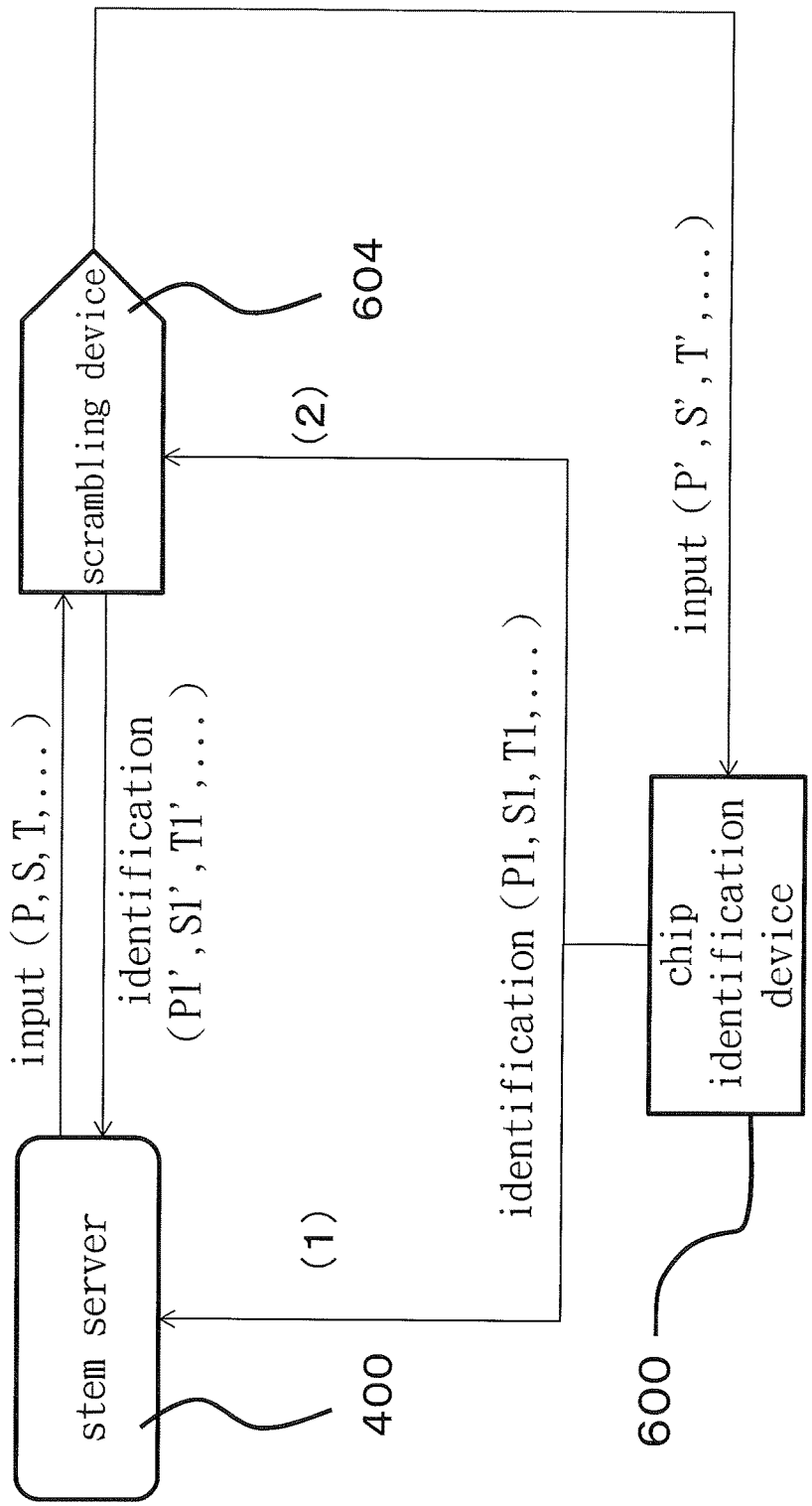
FIG. 28 is a diagrammatic view of an embodiment with a scrambling device.

Referring to FIG. 28, it provides a concept of the second embodiment, in which the input codes (P, S, T, . . . ) is sent to a scrambling device 604 from the stem server 400. By doing so, the input codes (P, S, T, . . . ) may be modified into (P', S', T', . . . ). The input codes may be input as the input codes (P', S', T', . . . ) to the chip identification device 600, which may be a module of the peripheral devices. Here, though not shown in the figure, the peripheral devices connected to the stem server 400 may have to comprise at least the chip carrying the chip identification device 600. The chip identification device 600 may return identifications (P1, S1, T1, . . . ). Next, (1) the identification (P1, S1, T1, . . . ) may be output to the stem server 400. Alternatively, (2) the identification (P1, S1, T1, . . . ) may be returned to the scrambling device 604, and the scrambled identification (P1', S1', T1', . . . ) may be returned to the stem server 400. Otherwise, though not shown in the figure since it may be self-evident, (3) a different second scrambling device may be used to convert the identification (P1, S1, T1, . . . ) into (P1'', S1'', T1'', . . . ) and then return it to the stem server 400. At least two independent scrambling devices may be required in method (3).

Figure 29:
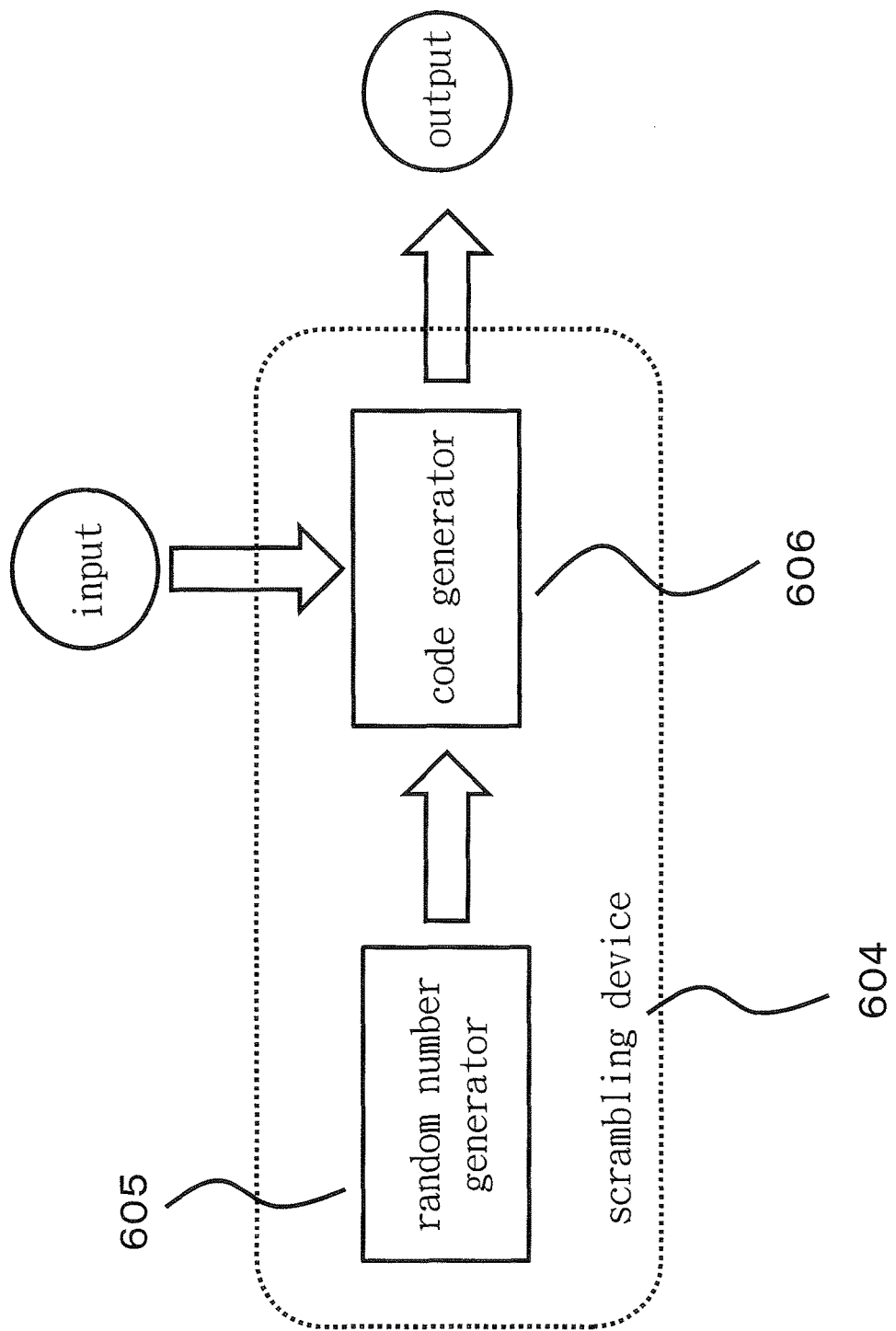
FIG. 29 is a diagrammatic view of the components of the scrambling device.

However, it may be preferable that, to reduce the cost as possible, the scrambling devices are embedded into the chip having the chip identification device 600. FIG. 29 illustrates an example of the basic components of the scrambling device 604. In this example, the scrambling device 604 may comprise the random number generator 605 and the code generator 606 and may then be similar to the chip identification device 600. The detailed explanation of the random number generator 605 and the code generator 606 may be similar to the explanation as illustrated in FIG. 27, and may thus be omitted. Moreover, though not shown in the figure since it may be self-evident, the code generator 606 may be disposed outside of the scrambling device 604.

The Third Embodiment

Figure 30:
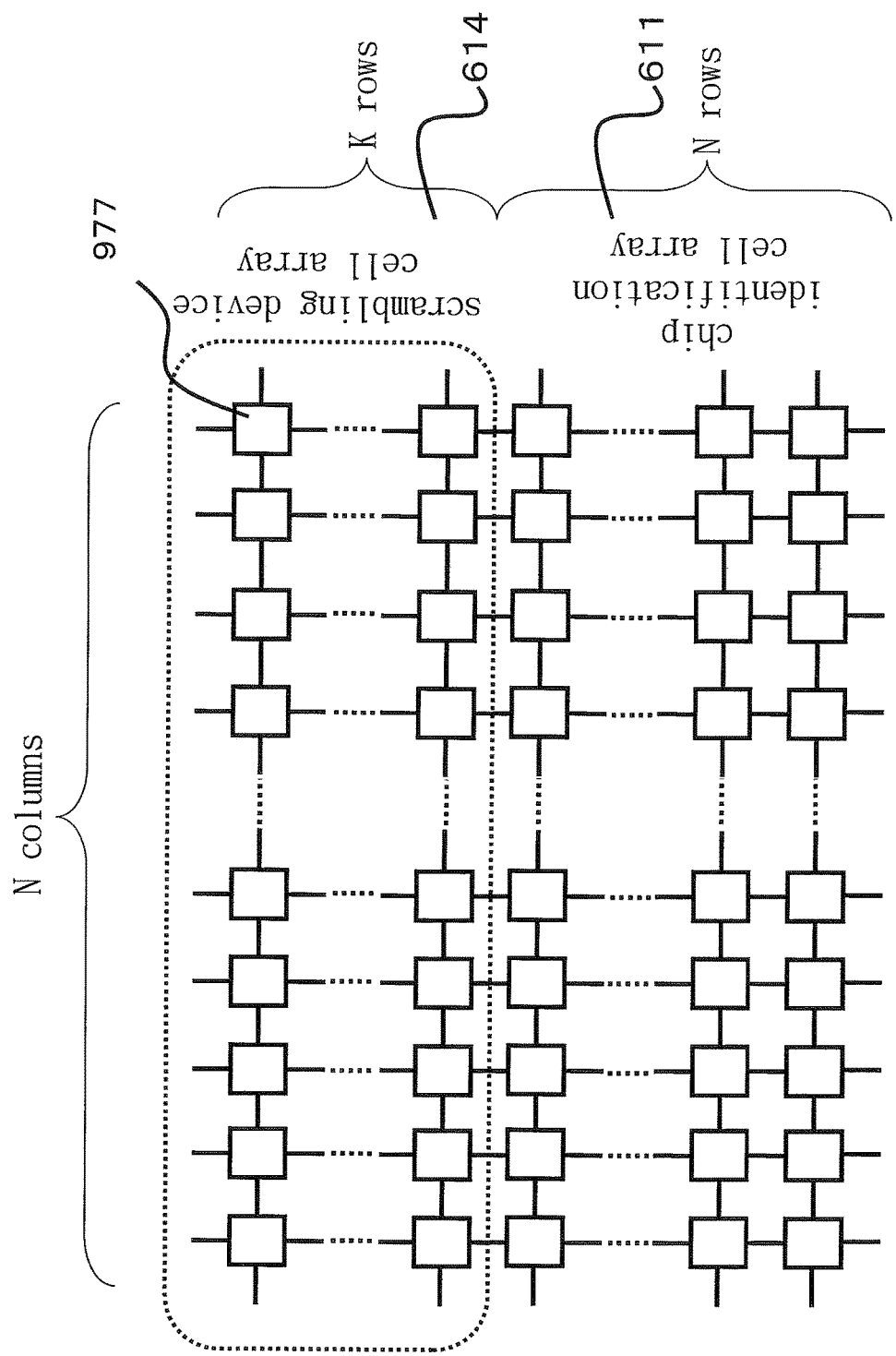
FIG. 30 is a diagrammatic view of the arrangement of a unit comprising both of the scrambling device and the identification device.

Referring to FIG. 30, it shows a portion of the array of the identification cell 977 in FIG. 23 with the row number being N+K and the column number being N. The upper array with K rows and N columns may be allocated to a scrambling device cell array 614, and the lower array with N rows and N columns may be allocated to a chip identification device cell array 611.

Figure 31:
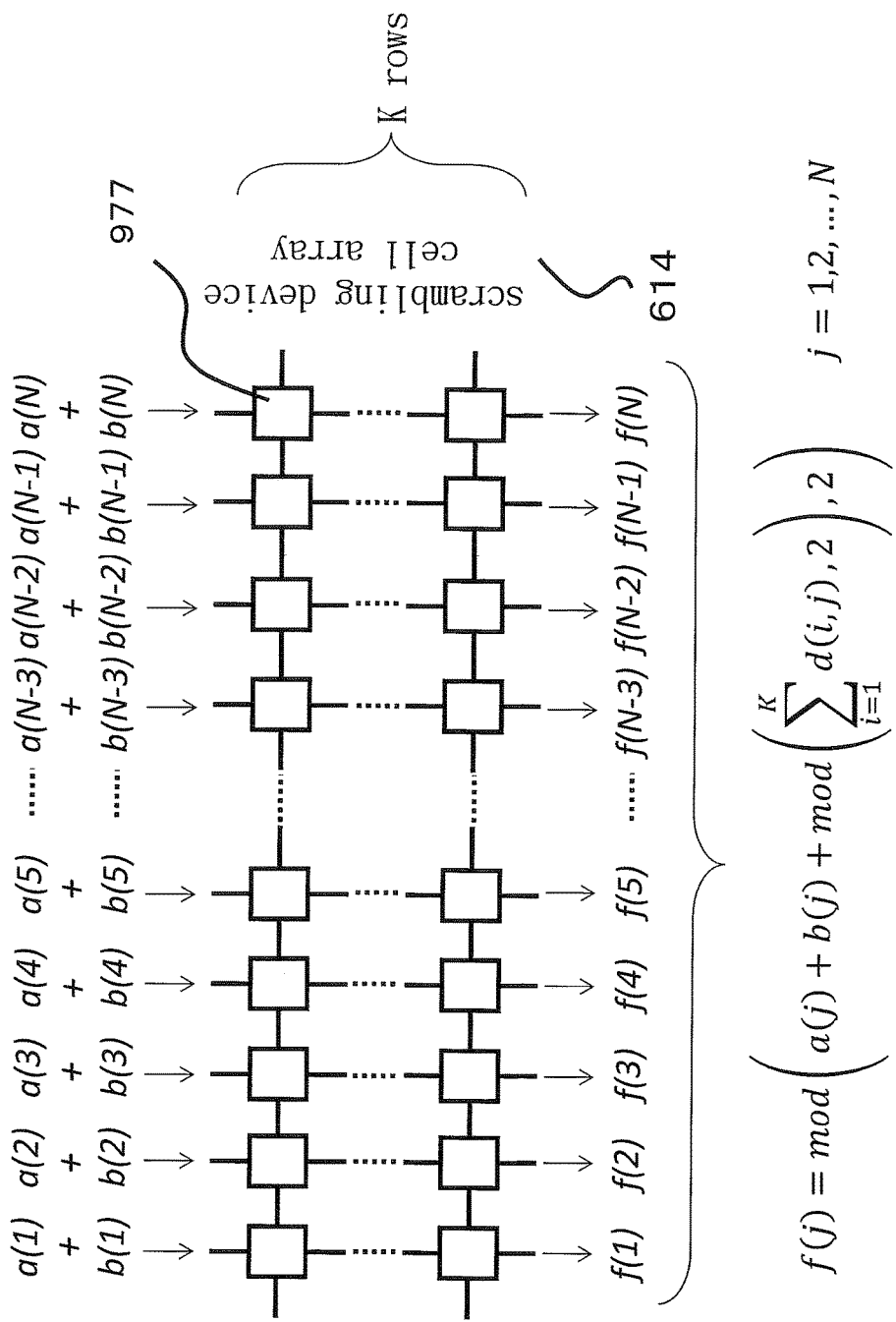
FIG. 31 is a diagrammatic view of the mechanism of the scrambling device.
Figure 32:
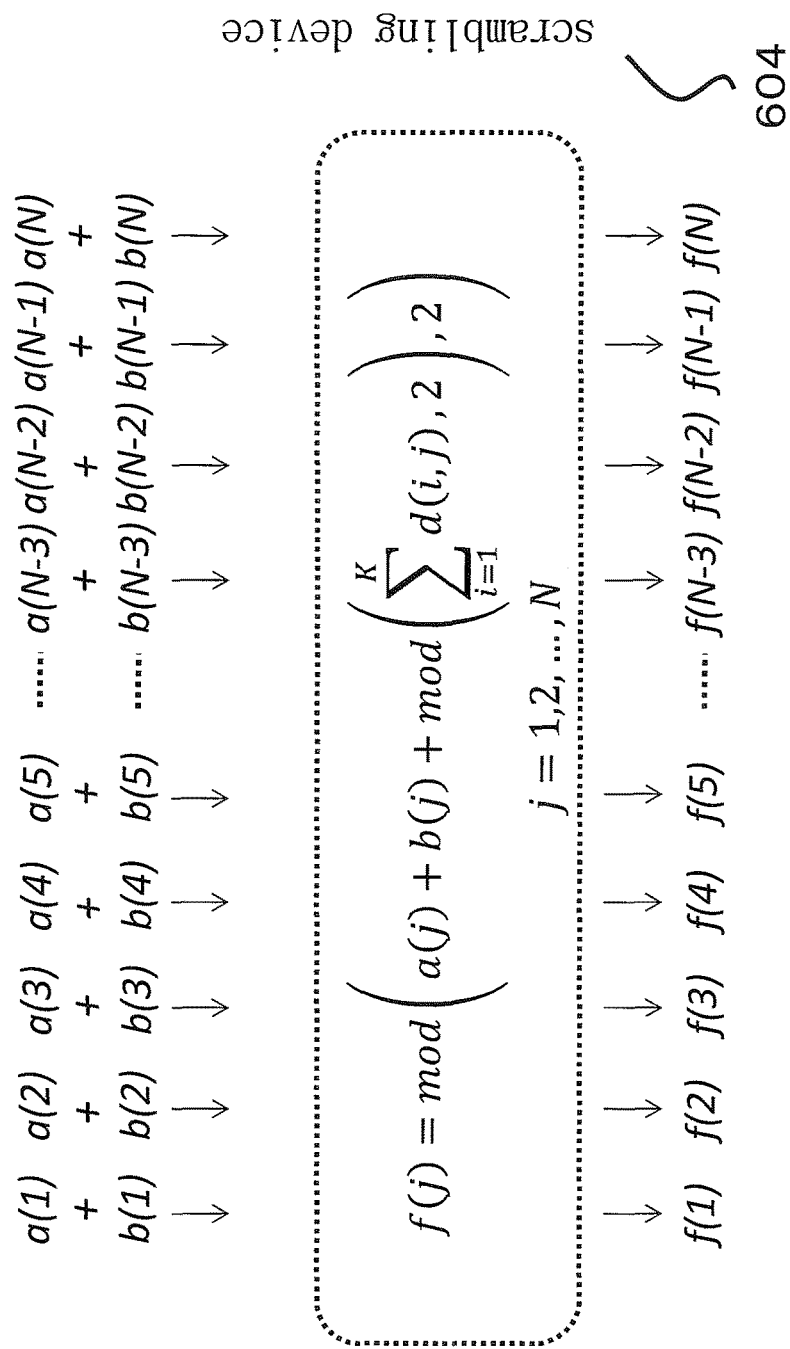
FIG. 32 is a diagrammatic view of the mechanism of the scrambling device.

Referring to FIG. 31, it provides an example realizing the random number generator 605 forming the scrambling device 604. Firstly, each element of $\{a(j)+b(j)\}$ is input into each column. Next, the elements of the physical random number d(i, j) are sum up in the row direction (i), and then they may be divided by 2 at each column number (j). Thus, a(j) and b(j) are added to the reminder at each column number (j); and furthermore divided by 2. The remainder may act as an intermediate output $\{f(j)\}$. Thus, as shown in FIG. 32, the function of the code generating device 606 forming the scrambling device 604 may be expressed as the formula below.

$$f(j) = \mod\left(a(j) + b(j) + \mod\left(\sum_{i=1}^{K} d(i, j), 2\right), 2\right) \quad \text{Formula 2}$$

The $\{f(j)\}$ may be the output of the scrambling device 604 in FIG. 28, FIG. 29, FIG. 32, and FIG. 34. It is noted that j may be a natural number from 1 to N.

Figure 33:
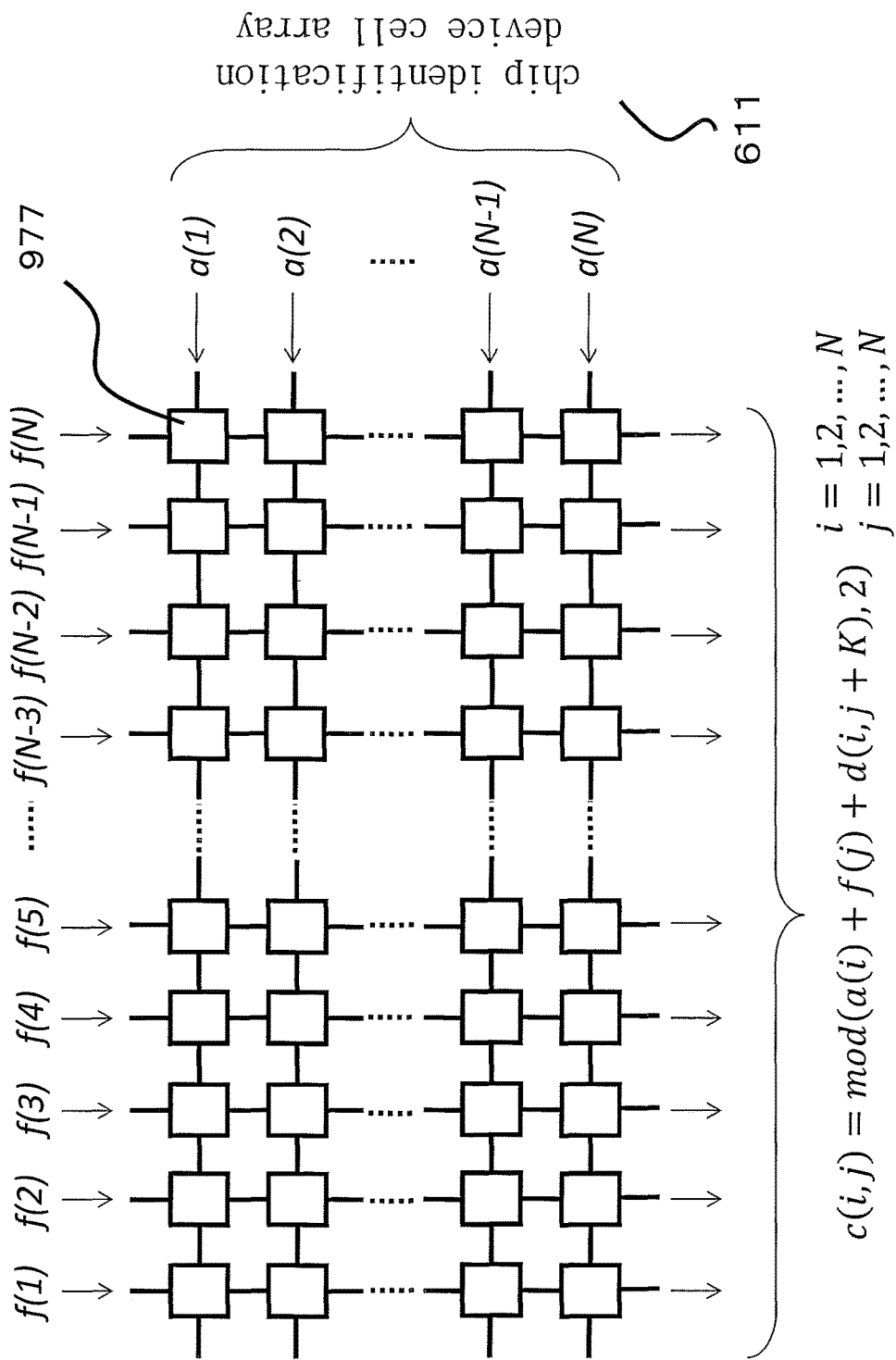
FIG. 33 is a diagrammatic view of the mechanism of the chip identification device.

Referring to FIG. 33, it provides an example of the chip identification device cell array 611 forming the random number generator 601 of the chip identification device 600 in FIG. 27. The illustration is omitted because it may be the same as the result of substituting $\{f(j)\}$ for the array $\{b(j)\}$ in FIG. 25 and Formula 1. Here, $\{c(i, j)\}$ expressed by Formula 3 may be the output of the code generator 602.

$$c(i,j)=\mod(a(i)+f(j)+d(i+K,j),2) \quad \text{Formula 3}$$

It is noted that, i and j are natural numbers independent from each other.

Figure 34:
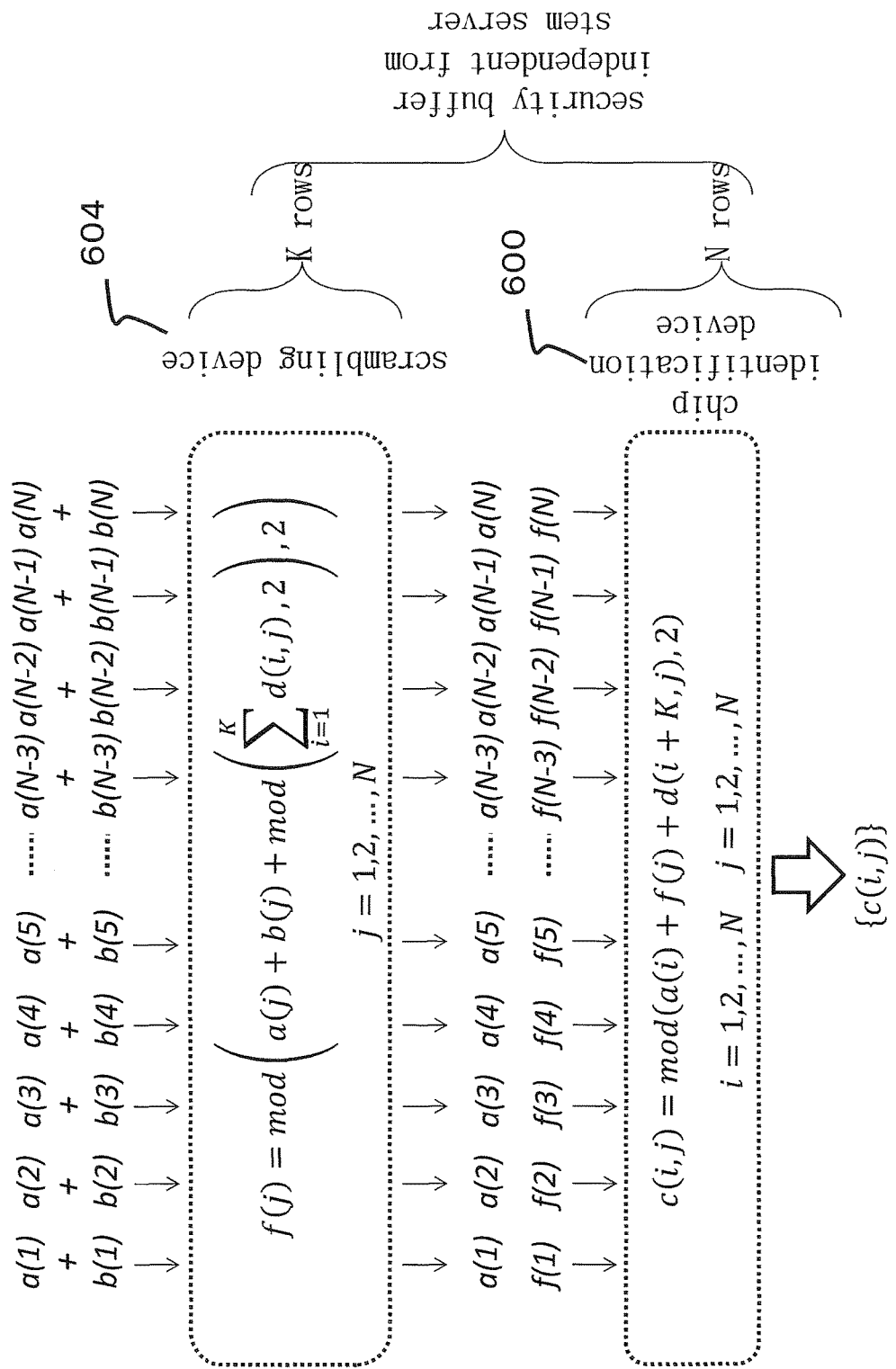
FIG. 34 is a diagrammatic view of the mechanism of the scrambling device and the chip identification device.

Referring to FIG. 34, it shows the relationship between the inputs and the outputs of the scrambling device 604 and the chip identification device 600 in FIG. 28. The input codes $\{a(i), b(i)\}$ may be converted to the intermediate codes $\{a(i), f(i)\}$ by implementing the physical random number with the scrambling device 604. Inputting the $\{a(i), f(i)\}$ to the chip identification device 600 as next input codes, the output codes $\{c(i, j)\}$ may be output.

Here, it is noted that the method to select the K rows of the scrambling device 604 and the N columns of the chip identification device 600 may not have to be managed on the stem server side. For example, when the peripheral devices are registered to the stem servers, the owner of the peripheral devices, or the certificated supervisors of the peripheral devices may voluntarily decide it. The decided (N, K) may be stored in the places like the nonvolatile memories in the peripheral devices.

At this moment, the (N, K) may be information that does not need to be known by the stem server side. However, after the peripheral device is registered to the stem server under the central control and then connected the network, it may be possible for the stem server to inspect and then reset as needed. Then, the peripheral devices may have to be re-registered with the reset (N, K). After resetting the (N, K), the intermediate codes $\{a(i), f(j)\}$ generated by the scrambling device 604 may be different even though the identical input code $\{a(i), b(j)\}$ is input to the peripheral device. Accordingly, the output codes $\{c(i, j)\}$ generated by the chip identification device 600 may also be different.

The stem server may record the (N, K) reset during the previous maintenance. At the next maintenance, the (N, K) stored in the inner memory of the chip may be read, and then compared with the previously recorded (N, K). If not identical, the chip may be deemed as inappropriately accessed. The chip may be thus disconnected from the network, or the supervisor may be alerted. By this way, the (N, K) may be efficiently utilized as a security buffer. Furthermore, thanks to the fact that the physical random numbers $\{a(i, j)\}$ is adopted to generate codes in Formulae 1-3, it may be no problem even though the security buffer (N, K) itself has been leaked.

In the case that a CPU is used to generate codes according to Formulae 1-3, if the intermediate outputs {f(j)}, generated between the scrambling device and the chip identification device, is not output out of the CPU, a portion or all of the {f(j)} may have to be stored in a register of the CPU. It may not be, however, needed to store all of the {f(j)} in the inner memories of the peripheral devices. Alternatively, in the case that a peripheral circuit in a same chip is used to generate codes according to Formulae 1-3, the intermediate outputs {f(j)}, generated between the scrambling device and the chip identification device, may not be output out of the chip. In other words, the intermediate codes {a(i), f(j)} may also not be output out of the chip. Anyway, after the output codes {c(i, j)} is generated, the intermediate outputs {f(j)} may be automatically overwritten and thus eliminated. Moreover, it may be ultimately hard for the remote control attacker to extract, by the reverse engineering, the intermediate outputs {f(j)}, confined in the chip or the CPU, from the register to be used during the code generation. That is because the register may be a very small memory. For example, it may be only 32 bits or 64 bits at most in general personal computers. On the other hand, the bit capacity needed to record all the intermediate outputs {f(j)} is N bits. Accordingly, if N is large enough, the intermediate codes {f(j)} may have to be divided into several packets to be stored in the register in turns every time the code is generated. Here, if the register may only use R bits in turns to generate codes, as the example shown in FIG. 34, then column 1 to column R may be in packet 1, column R+1 to column 2R may be in packet 2, column 2R+1 to column 3R may be in packet 3, . . . . And thus, a portion of the intermediate outputs {f(j)} may be generated according to Formula 2 to be stored in the register in turns. That is, if N is large enough, the region of the register to store the intermediate output {f(j)} may be overwritten at each update of the packet. Thus, even during the generation of the codes, it may be impossible for the remote control attacker to theft the entire intermediate outputs {f(j)} at once. Furthermore, in the disclosure, because the physical random numbers {d(i, j)} (i=1, . . . , K) are used to generate the intermediate codes {f(j)} from the input codes {a(i), b(j)}, it may be impossible to predict the intermediate outputs {f(j)} from the input codes {a(i), b(j)}. Moreover, because the physical random numbers {d(i, j)} (i=K+1, . . . , K+N), independent from the former, are used to generate the output codes {c(i, j)} from the intermediate input codes {a(i), f(j)}, it may be impossible to predict the output codes {c(i, j)}. Even though the intermediate codes {f(j)} were stolen, it would be impossible to predict the output codes {c(i, j)} generated by the physical randomness comprising the physical random numbers {d(i, j)} (i=K+1, . . . , K+N). Furthermore, because the security buffer (N, K) may be updated at any time, the intermediate codes generated in response to the same input codes {a(i), b(j)} may also be updated at any time. As a result, if N is set to be larger than 64, the security may be significantly improved.

Figure 35:
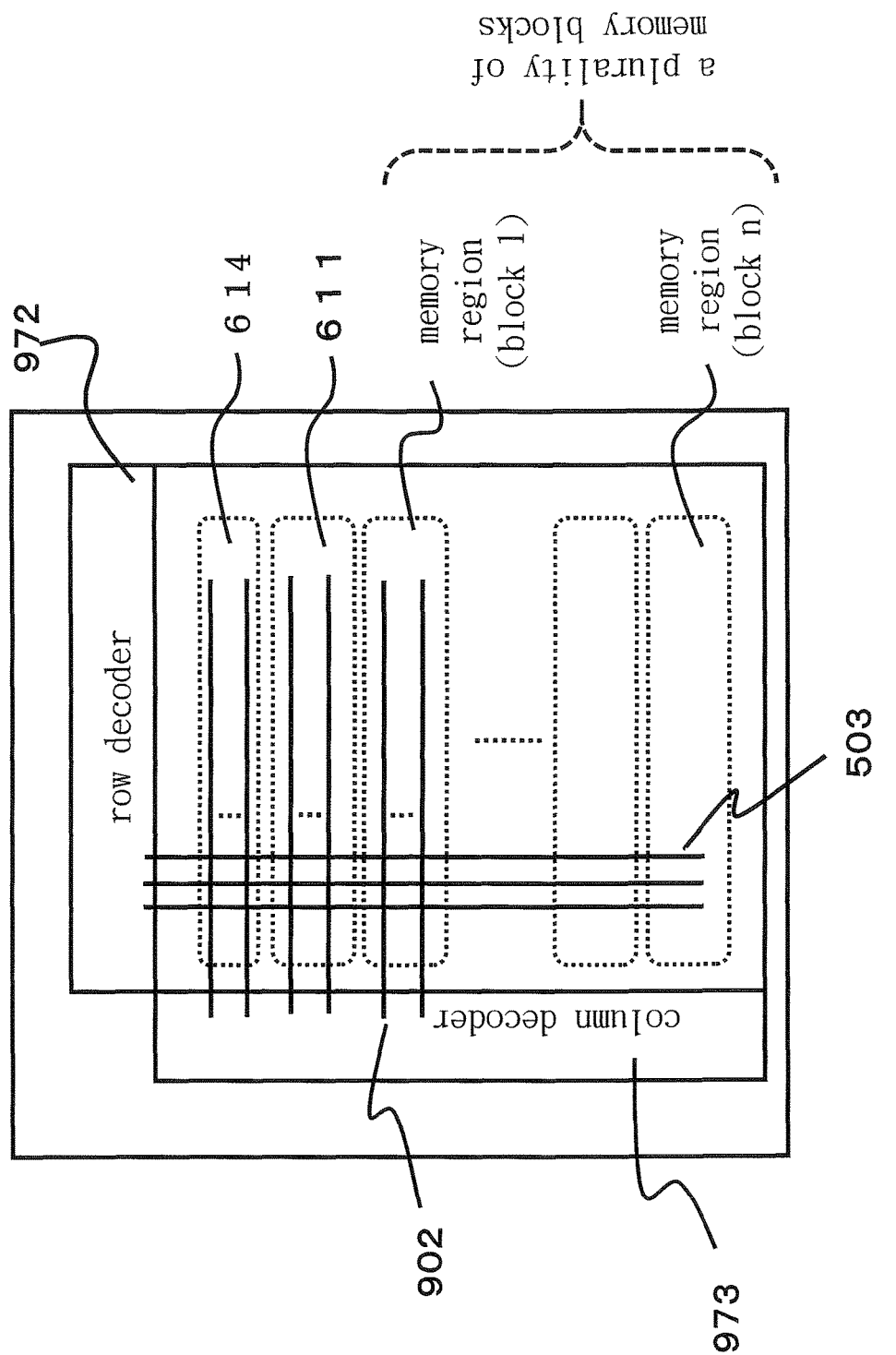
FIG. 35 is a diagrammatic view of a memory chip carrying the hybrid of the scrambling device and the chip identification device.
Figure 36:
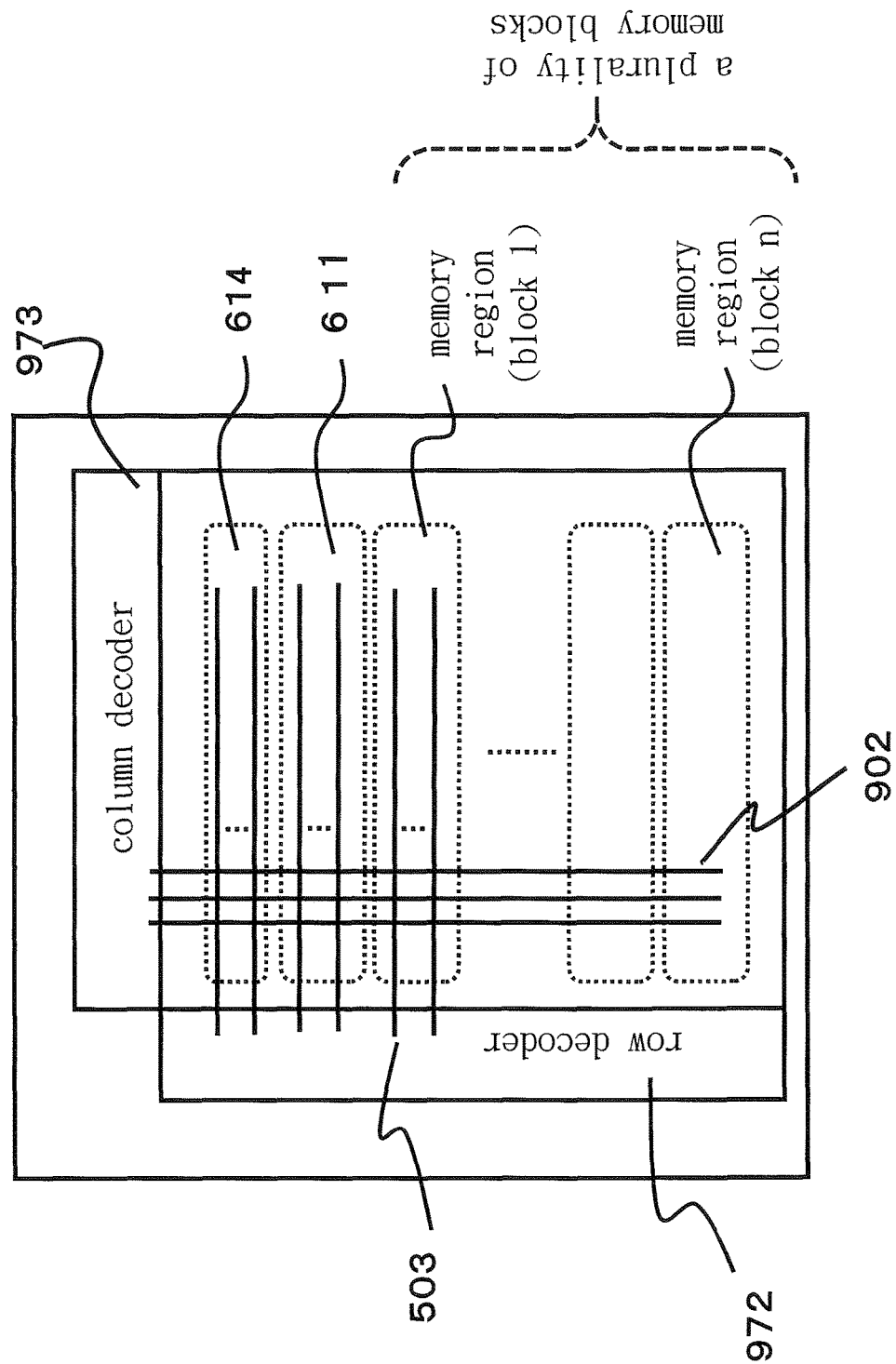
FIG. 36 is a diagrammatic view of a memory chip carrying the hybrid of the scrambling device and the chip identification device.

Referring to FIG. 35, it shows an example of a memory chip including the scrambling device cell array 614 and the chip identification device cell array 611. These regions may be disposed together with the memory region along the direction of the word lines, and may then share the word lines 503. FIG. 36 shows another example of a memory chip including the scrambling device cell array 614 and the chip identification device cell array 611. These three regions may be disposed along the direction of the bit lines, and may then share the bit lines 902.

The Fourth Embodiment

Figure 37:
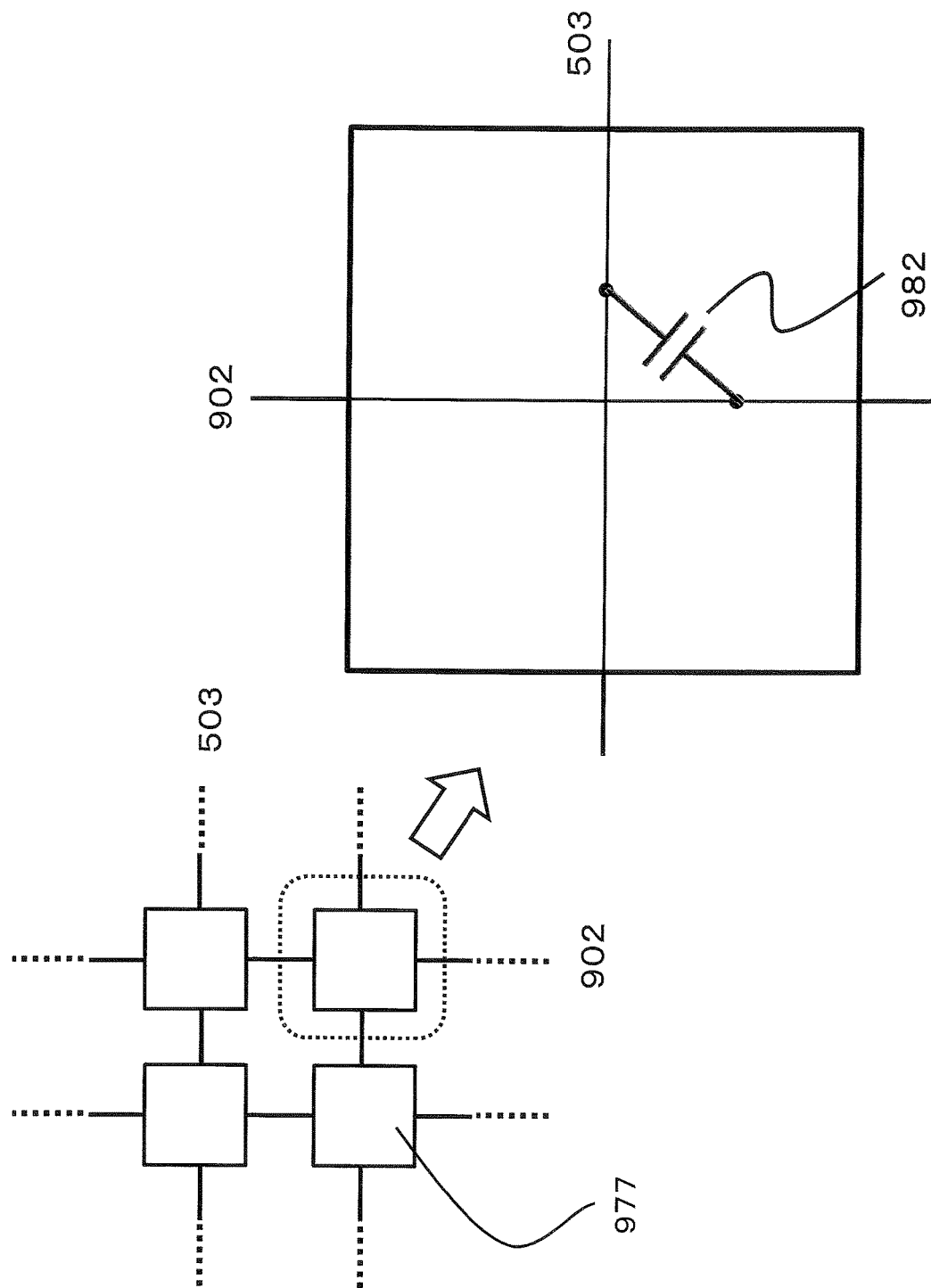
FIG. 37 is a diagrammatic view of the identification unit.

Referring to FIG. 37, it shows a diagrammatic view of the identification cell 977. A capacitor 982 may be disposed at an intersection of the word line 503 and the bit line 902. Generally speaking, a capacitor may have the structure of an insulating film sandwiched by two conductors, and may store the electric charge by applying an electric field between those two conductors. Here, if the applied electric field is a DC field, the current may not flow. However, if the applied electric field is too high, the insulating film may be broken. The current may flow in such a broken capacitor even if the applied electric field is a DC field. Applying a voltage between the word line 503 and the bit line 902 may also apply the voltage to the capacitor 982 disposed at the selected intersection.

The breakdown described above may probabilistically occur with the physical randomness. It may become easy for the current to flow through a broken identification cell, even if a DC field is applied, which may correspond to "1" in terms of the semiconductor memory. It may also correspond to a black in FIG. 22. In contrast, it may be difficult for the current to flow through an unbroken identification cell in response to the applied electric field, which may correspond to a "0" in terms of the semiconductor memory. It may also correspond to white in FIG. 22. The possibility may be roughly tuned by adjusting the detailed condition of the applied electric field or the capacitor (such as the physical properties, the structure, or the size). When the possibility is approximately 50%, a white and black random checker pattern as shown in FIG. 22 may be obtained.

Figure 38:
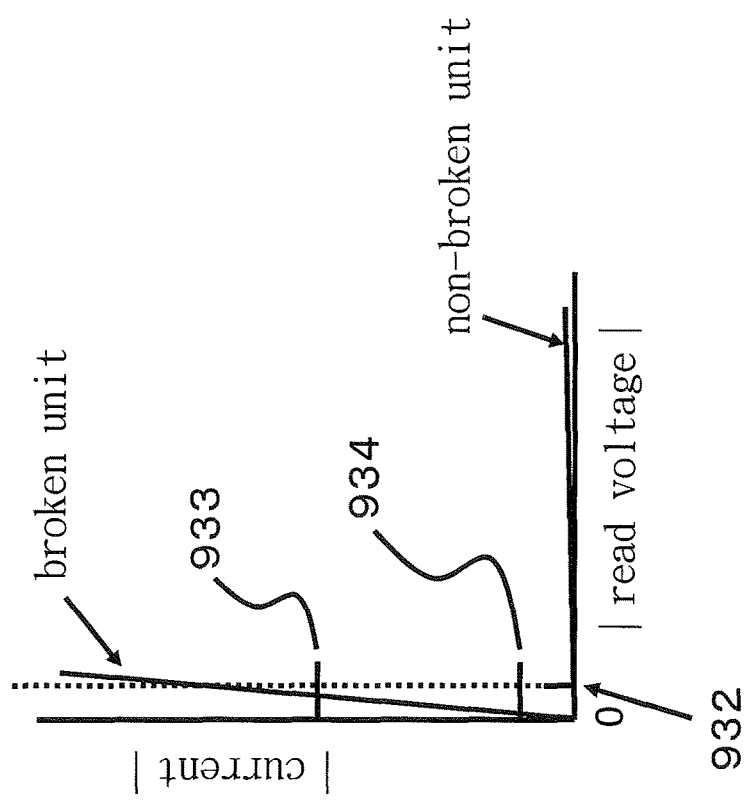
FIG. 38 is a diagrammatic view of a method of reading the identification unit.

Referring to FIG. 38, it shows a voltage-current diagram for determining the breakdown. The horizontal axis may be the absolute value of the read voltage applied to the capacitor 982 for reading. The vertical axis may be the absolute value of the current flowing through the capacitor 982 with the read voltage. In the broken cell, even at a low voltage, a very high current may flow. On the contrary, in an unbroken cell, almost no current may flow even at a high voltage. As a method of distinguishing the difference, the breakdown determining current value 933 and the non-breakdown determining current value 934 in response to the breakdown determining voltage 932 are introduced. Thus, when the read voltage whose absolute value equals to the breakdown determining voltage 932 is applied to the capacitor 982, the corresponding cell may be regarded as broken if the absolute value of the current flowing through the capacitor 982 is larger than the breakdown determining current value 933. Otherwise, the corresponding cell may be regarded as unbroken if the absolute value of the current flowing through the capacitor 982 is lower than the non-breakdown determining current value 934. The read voltage here may be a DC voltage.

First, the address of the cell to be read may have to be selected in order to read the data. To select the address, as shown in FIG. 23, the row may be selected by the row decoder 972, and the column may be selected by the column decoder 973. Those decoders (972 and 973) are connected to I/O PIN 971. The combination of the selected row and column may form the address. In the example shown in FIG. 39, the addresses are represented in binary. Then, according to the method shown in FIG. 38, the read voltage may be applied between the word line 503 and the bit line 902 connected to the cell corresponding to the selected address, and may then read the data ("1" or "0") of the corresponding address. After reading, the address of the cell to be selected is updated, and then this process may be repeated until the data of the entire cells in the identification cell array will be read.

Figure 39:
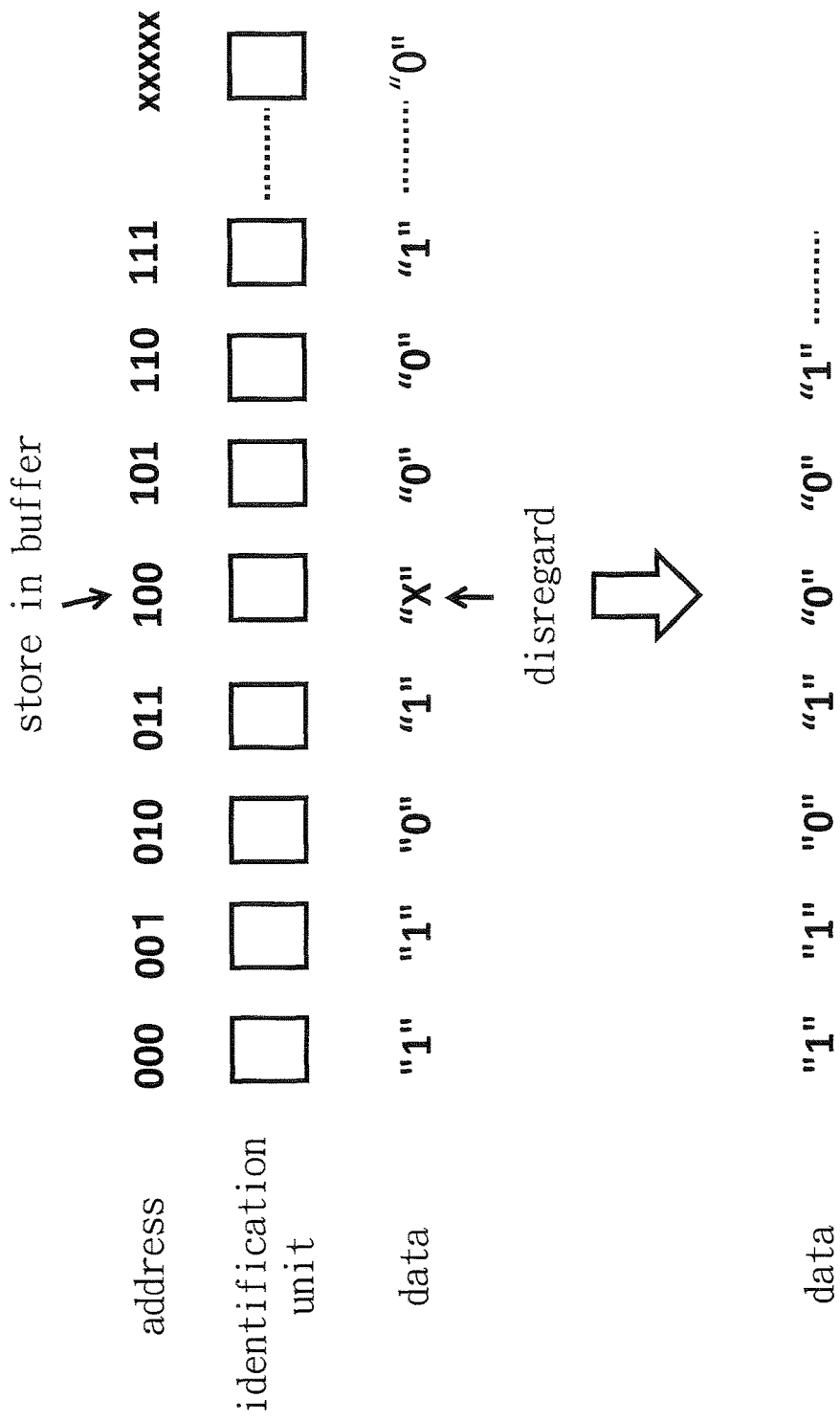
FIG. 39 is a diagrammatic view of a method of correcting error in the identification unit.

In the determining method provided in FIG. 38, there may be a certain gap between the breakdown determining current value 933 and the non-breakdown determining current value 934. Thus, it may neither be determined broken nor unbroken while the absolute value of the read current of the cell is in this gap. The cell like this may neither correspond to "0" nor "1" in terms of the semiconductor memory, and thus may be marked as "X". FIG. 39 provides an example of the binary-represented address of the cells on the cell array and the corresponding data. As one of the examples, the sequence may be "1", "1", "0", "1", "X", "0", "0", "1", . . . from the left. Accordingly, the data of the fifth identification cell from the left is "X".

Next, as shown in FIG. 39, it may be regarded that the white and black checker pattern shown in FIG. 22 may be obtained by plotting the combination of the series of "0" and "1" and the corresponding addresses. Here, "0" may be converted to white, and "1" may be converted to black. However, if there is an "X" which is neither "0" nor "1", the white and black checker pattern shown in FIG. 22 may not be generated. Thus, before plotting the checker pattern, the cells corresponding to the "X"s may have to be eliminated.

For example, the address (such as 100 in binary) of the cell corresponding to "X" may be stored in a buffer. Then, the data of the cells corresponding to each of the addresses may be compared with the record stored in the buffer. If the corresponding address is stored in the buffer, the data may not be read. By doing so, the data of the cells corresponding to the "X"s may be eliminated, and the combination of data comprising only "0"s and "1"s and the corresponding addresses may be generated. Thus, the white and black checker pattern as shown in FIG. 22 may be obtained.

Furthermore, regarding the breakdown of the insulating film described above, there may be two modes of breakdown generally, which are soft breakdown and hard breakdown. The soft breakdown mode may generally occur in a stage before the hard breakdown occurs. At the read voltage, the current in the soft break down mode may be lower than in the hard breakdown mode and larger than in the non-broken condition. Moreover, in the soft breakdown mode, during the period applying the voltages repeatedly, the condition of the soft breakdown mode may be unstable and, may recover to the non-broken condition or may move to the hard breakdown mode. However, once the cell falls into the hard breakdown mode, it may not recover to the non-broken mode or move to the soft breakdown mode. In the disclosure, based on the method provided in FIG. 38 and FIG. 39, the hard breakdown mode, which is the more stable breakdown mode, may be viewed as "1" in terms of the semiconductor memory, while the soft breakdown mode may be viewed as "X". A gap between the breakdown determining current value and the non-breakdown determining current value may be used to label the soft breakdown mode as "X". Thus, according to the method mentioned above, by eliminating the "X" data of the soft breakdown cells, the white and black checker pattern as shown in FIG. 22 may not be easily changed even while the read voltage is repeatedly applied. And thus, the property of the reproducibility of the pattern may be obtained.

Generally speaking, it may be difficult to artificially distinguish the transition from the soft breakdown mode to the hard breakdown mode and that from the non-broken condition to the soft breakdown mode by applying the electric stress. Thus, in the process of applying electric stress repeatedly, the ratio of the soft breakdown mode labelled "X" may be smaller than a predetermined value, or may be larger than the predetermined value. However, if the number of the cells in the soft breakdown mode is larger than the predetermined value, the randomness of the pattern may be insufficient because of the reduction of the data quantity. Thus, it may be required to repeatedly apply the voltage pulses for the electric stresses. For example, a first breaking pulse voltage may be applied, and then a breakdown inspection may be carried out according to the method shown in FIG. 38. When the ratio of "X" is larger than the predetermined value, a second breaking pulse voltage may be applied, and then the breakdown inspection may be carried out according to the method shown in FIG. 38. If the ratio of "X" is still very high, a third breaking pulse voltage may be applied, and then the breakdown inspection may be carried out according to the method shown in FIG. 38. This process may be repeated until the ratio of "X" is made smaller than the predetermined value. Furthermore, it may be required to define an upper limit of the times of the process to be repeated in advance. If the ratio of "X" is still not smaller than the predetermined value after the times of the process to be repeated reach the upper limit, the chip identification device may be deemed as failing in the inspection. If passing the inspection, the address of the cell labelled "X" may be recorded in the buffer, and the corresponding data may be eliminated. If failing in the inspection, the chip may be viewed as defective product and may be discarded. However, as long as the quantity of the cells is huge enough, the physical randomness may still be ensured even if the ratio of the soft breakdown mode is high to some amount. In this event, the process to inspect the ratio of "X" may be omitted.

Figure 40:
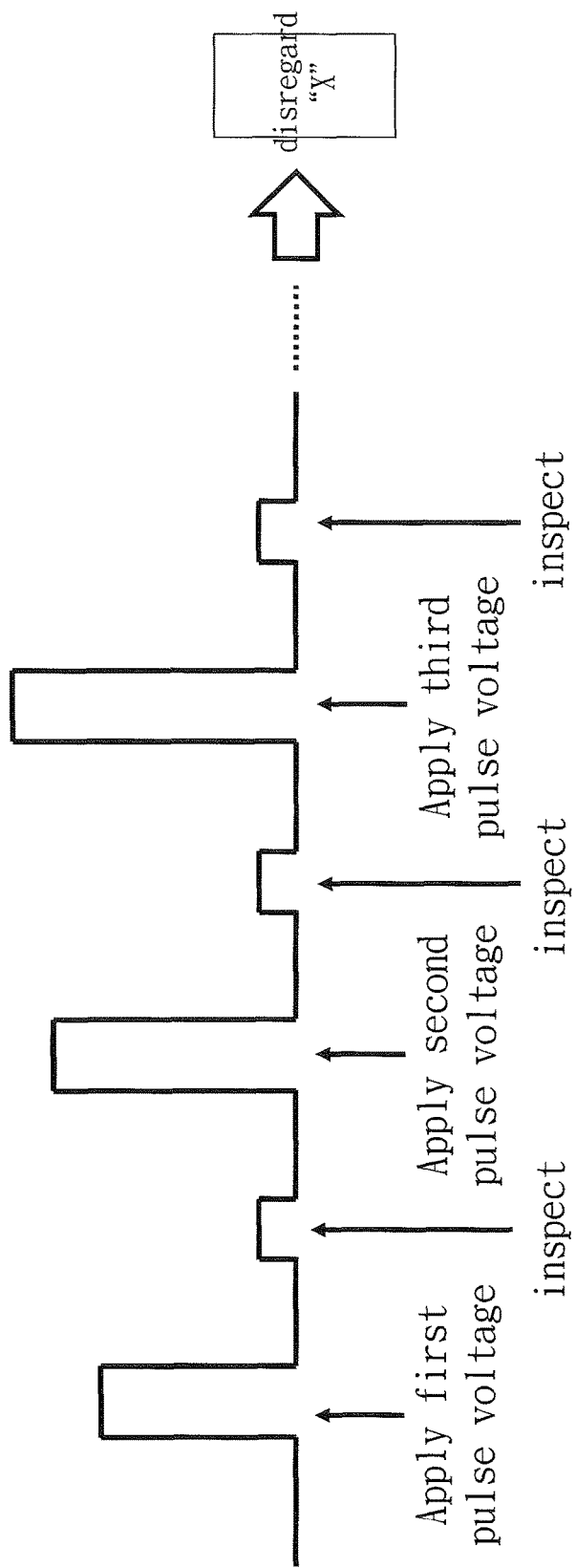
FIG. 40 is a diagrammatic view of a method of breaking the identification unit.

To maximize the physical randomness, the ratios of "0"s and "1"s may preferably be at approximately 50% respectively. The cells labelled "X" may be in soft breakdown mode. During the period that the pulse voltages are repeatedly applied, those cells may be transited to "1" (the hard breakdown mode), as shown in FIG. 40. Thus, it may be preferable that the pulse height may be incremented by a certain voltage at every pulse while the period of each pulse is fixed a constant. Thus, for example, even though the number of "0"s is large at the first pulse, the ratio of "1"s may rise gradually while the pulses are repeatedly applied. Accordingly, by optimizing the times of the pulses to be applied, the period of the pulses to be applied, and the incremental method of the pulse height, the ratio of the data to be eliminated ("X"s) may be reduce as much as possible, while the ratios of "0"s and "1"s may be close to 50% respectively. If it fails, it may be discarded as a defective product as described above. Thus, only quality items having a sufficient physical randomness with stable data of "0"s and "1"s, may be produced and forwarded.

Figure 41:
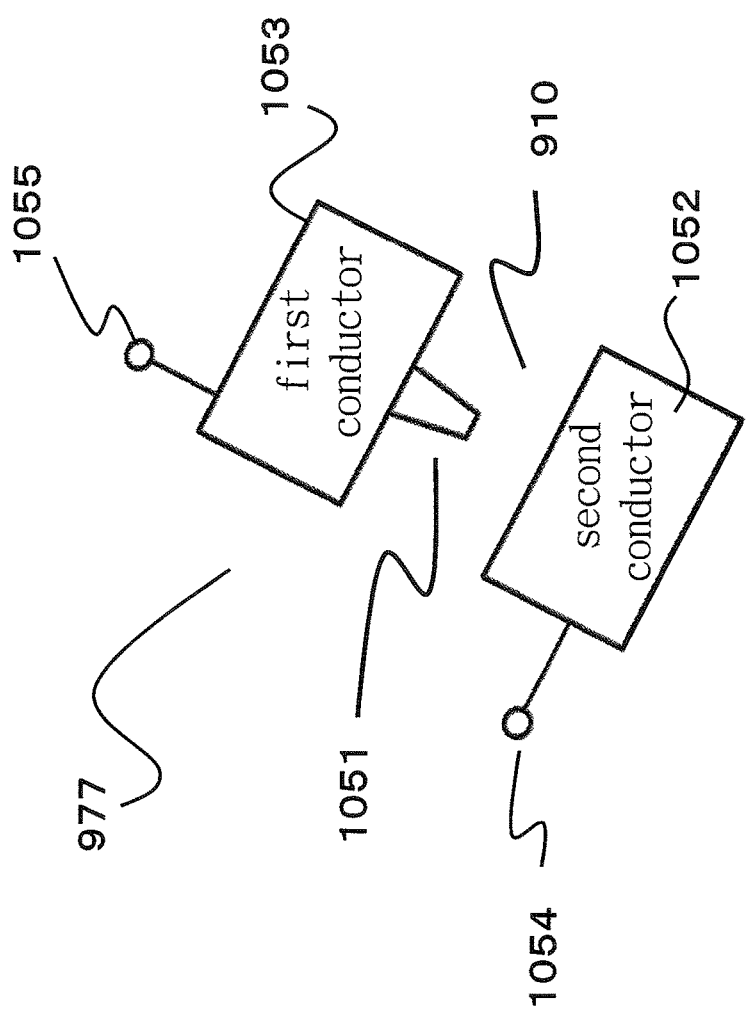
FIG. 41 is a diagrammatic view of the structure of the identification unit.

Furthermore, in another example, it may also be possible to make the hard breakdown mode dominate the soft breakdown mode by designing the cell structure. For example, as shown in FIG. 41, let us consider the cell structure comprising a first conductor 1053, a second conductor 1052, an insulating film 910, and a conductor front 1051. The first conductor 1053 may be connected to a first electrode 1055, and the second conductor 1052 may be connected to a second electrode 1054. The first electrode 1055 may be connected to either the word line 503 or the bit line 902, while the second electrode 1054 may be connected to the other. The molecular structure of the insulating film 910 around the conductor front 1051 may be unstable under the mechanical stress, and may thus be easy to be broken.

Moreover, the electric field may be easily concentrated around the conductor front 1051 by applying the breaking pulse. That is, the hard breakdown may be more likely to occur. However, because the depth of the conductor front 1051 may vary in manufacturing, the breakdown occurring rate of the insulating film 910 between the conductor front 1051 and the second conductor 1052 may also vary. Here, by further adjusting the method of applying the breaking pulse, the physical randomness of "0" and "1" may be increased as much as possible.

The Fifth Embodiment

Figure 42:
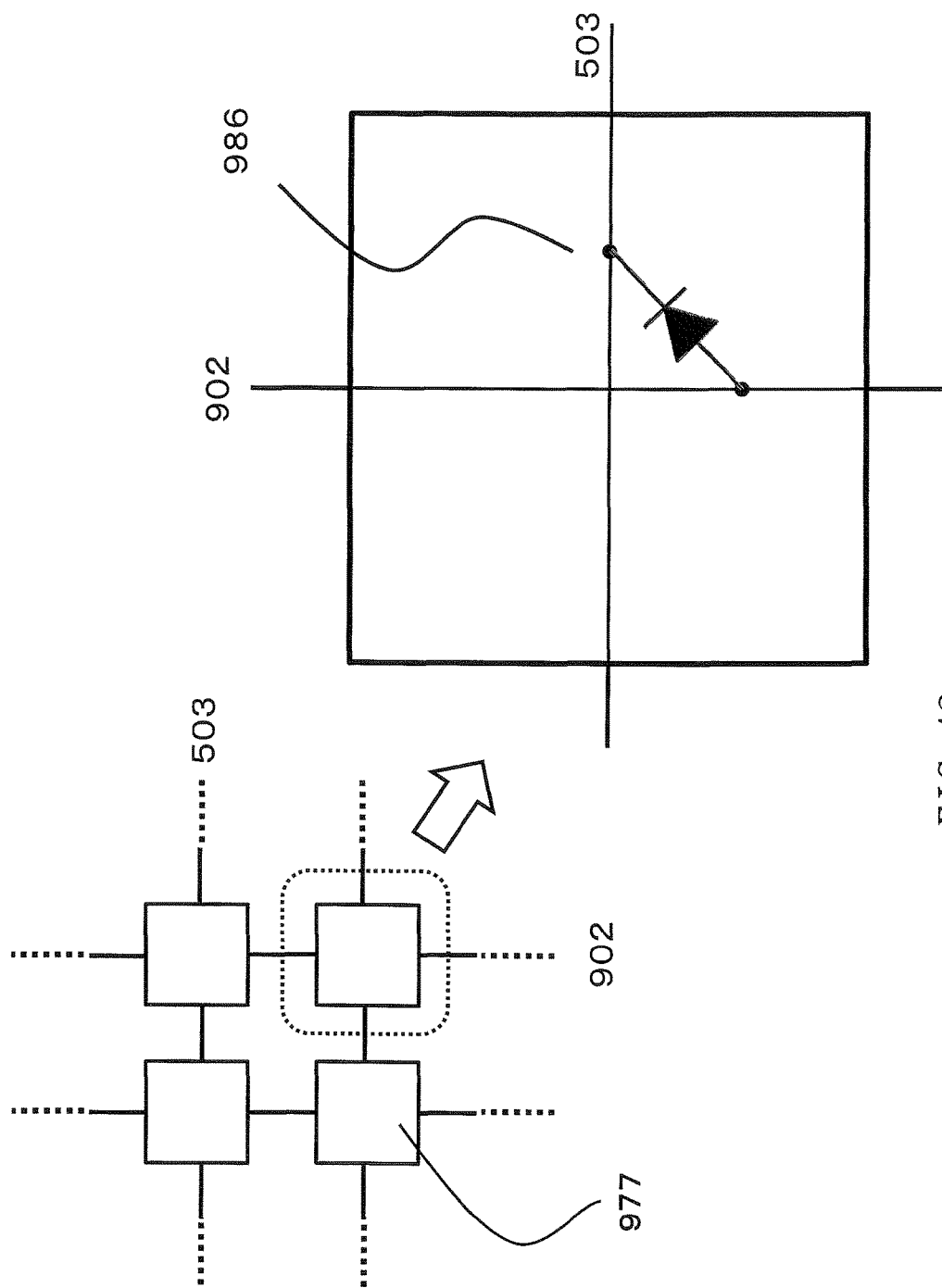
FIG. 42 is a diagrammatic view of the identification unit.
Figure 59:
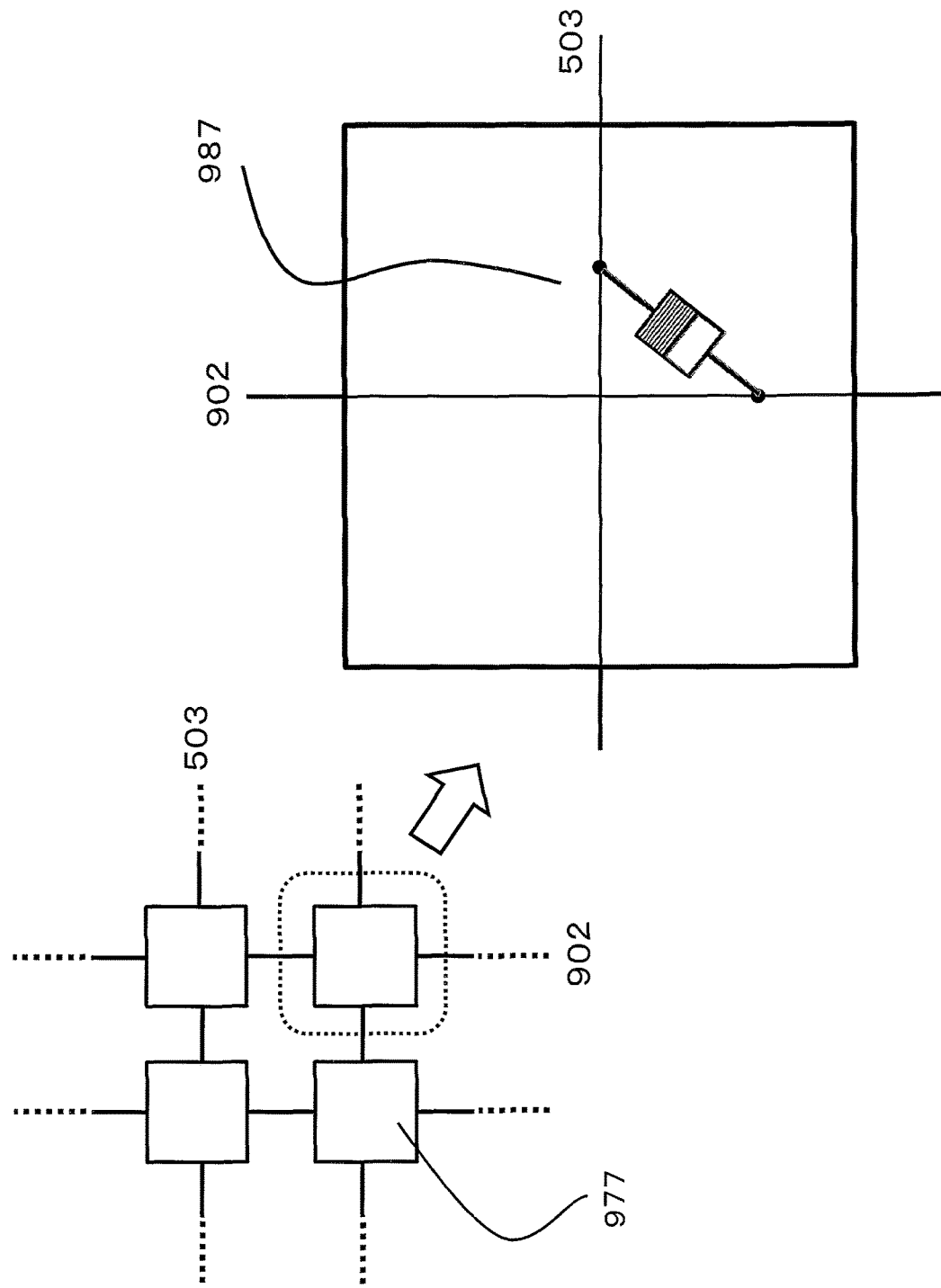
FIG. 59 is a diagrammatic view of the identification unit.

Let us consider the case in which the conductors each connected to the word line 503 and the bit line 902 adopt the identification cell 977 forming a diode. If the diode component comprises a PN junction 986 (FIG. 42), or a Schottky junction 987 (FIG. 59), by applying a strong voltage stress to the diode, the diode may be probabilistically broken. Whether the diode may be broken or not may be determined by applying the read voltage in the reverse direction of the diode. In the broken cell, the current may easily flow while the read voltage is applied in the reverse direction, which may correspond to "1" in terms of the semiconductor memory. In the non-broken cell, the current may hardly flow even while the read voltage is applied in the reverse direction, which may correspond to the "0" in terms of the semiconductor memory. Both the voltage stress and the read voltage may be applied between the selected word line 503 and the selected bit line 902.

As mentioned above, in the case that the component, which forms the identification cell 977 connecting to each of the word line 503 and the bit line 902, is the PN junction 986 or the Schottky junction 987, the read voltage may be in the reverse direction. On the contrary, in the case that the component, which forms the identification cell 977 connecting to each of the word line 503 and the bit line 902, is the capacitor 982, the direction of the read voltage, forward or reverse, may not matter. In this regard, the breakdown determining method may also be illustrated by FIG. 38. Here, the read voltage applied to the two electrodes sandwiching the diode may be the absolute value thereof, and the current flowing through the diode component while the read voltage is applied may also be the absolute value thereof. In other words, in the case of PN junction or Schottky junction, the absolute values may be the absolute values of the reverse voltage and the reverse current. The description of the capacitor may be the same as above, and thus omitted.

The Sixth Embodiment

Figure 43:
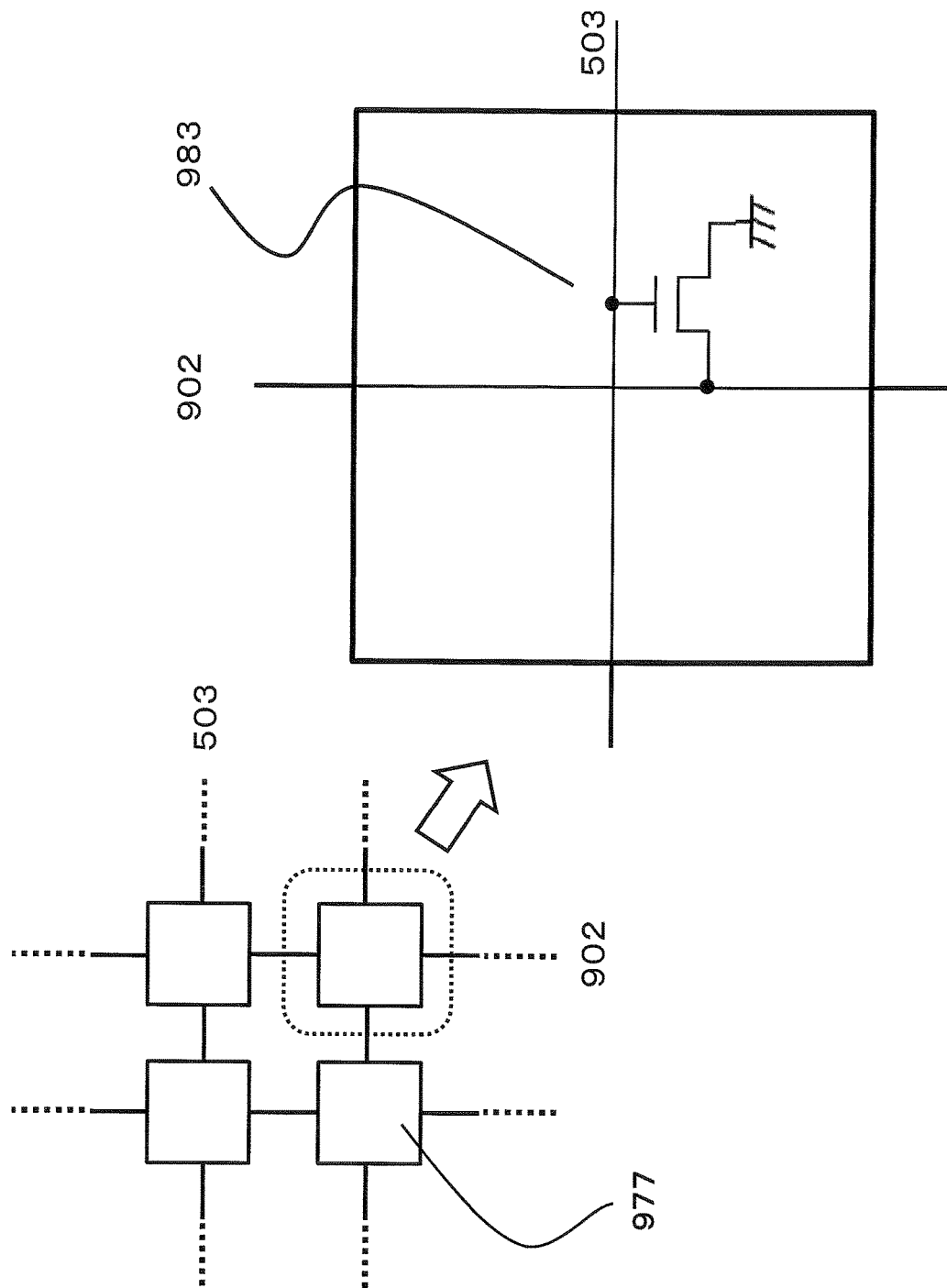
FIG. 43 is a diagrammatic view of the identification unit.
Figure 69:
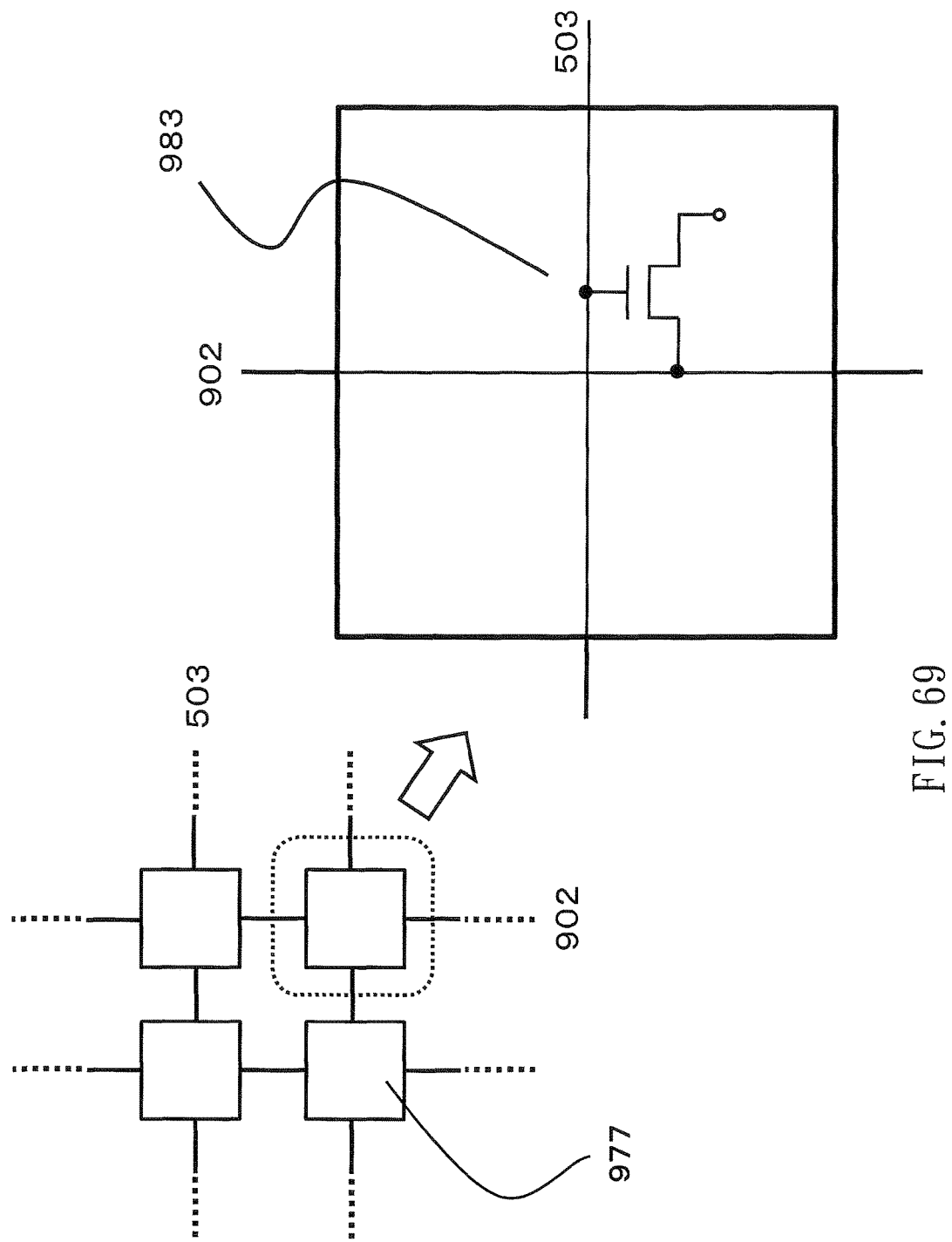
FIG. 69 is a diagrammatic view of the identification unit.

Referring to FIG. 43, it shows the case in which the identification cell 977 is a Metal-Oxide-Semiconductor (MOS) Field-Effect Transistor (MOSFET) 983. Generally speaking, a MOSFET may comprise two adjacent diffusion layers and a MOS capacitor on a surface of a semiconductor substrate. The MOS capacitor may be formed by laminating a gate insulating film on the semiconductor substrate and a gate electrode thereon. In this example, one of the two diffusion layers may be connected to the bit line 902, and the other diffusion layer may be grounded. The gate electrode may be connected to the word line 503. Thus, in this embodiment, it may be possible to adopt the breakdown of the gate insulating film, which may form the factor of physical randomness. In the case adopting the insulating breakdown, the voltage stress may be applied to the word line 503 during the period in which the bit line 902 is grounded. The pulse shown in FIG. 40 may be one of the examples of the voltage stress. The read may be executed by applying the breakdown determining voltage 932 between the bit line 902 and the word line 503 and then reading the current flowing between the bit line 902 and the word line 503. Moreover, in another example as shown in FIG. 69, one of the two diffusion layers may be connected to the bit line 902, and the other diffusion layer may be connected to a different electrode. The different electrode may be connected to a source line or any other line in the chip. While the electric potential of the electrode may be set to zero, the breakdown of the gate insulating film may occur in the similar manner as mentioned above. Otherwise, if the different electrode remains floating, the breakdown of the gate insulating film may only occur on the bit line side.

The Seventh Embodiment

Figure 44:
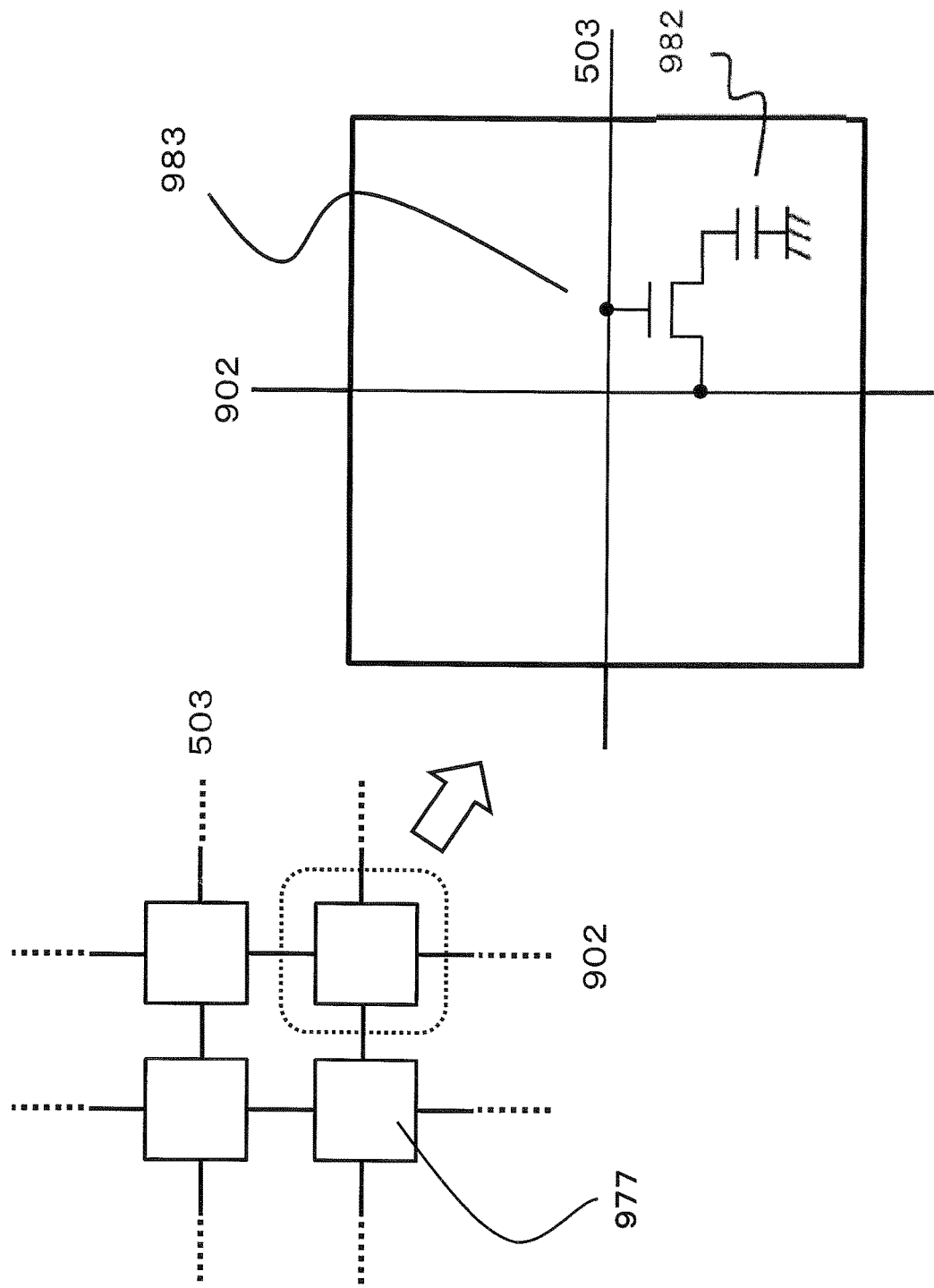
FIG. 44 is a diagrammatic view of the identification unit.
Figure 70:
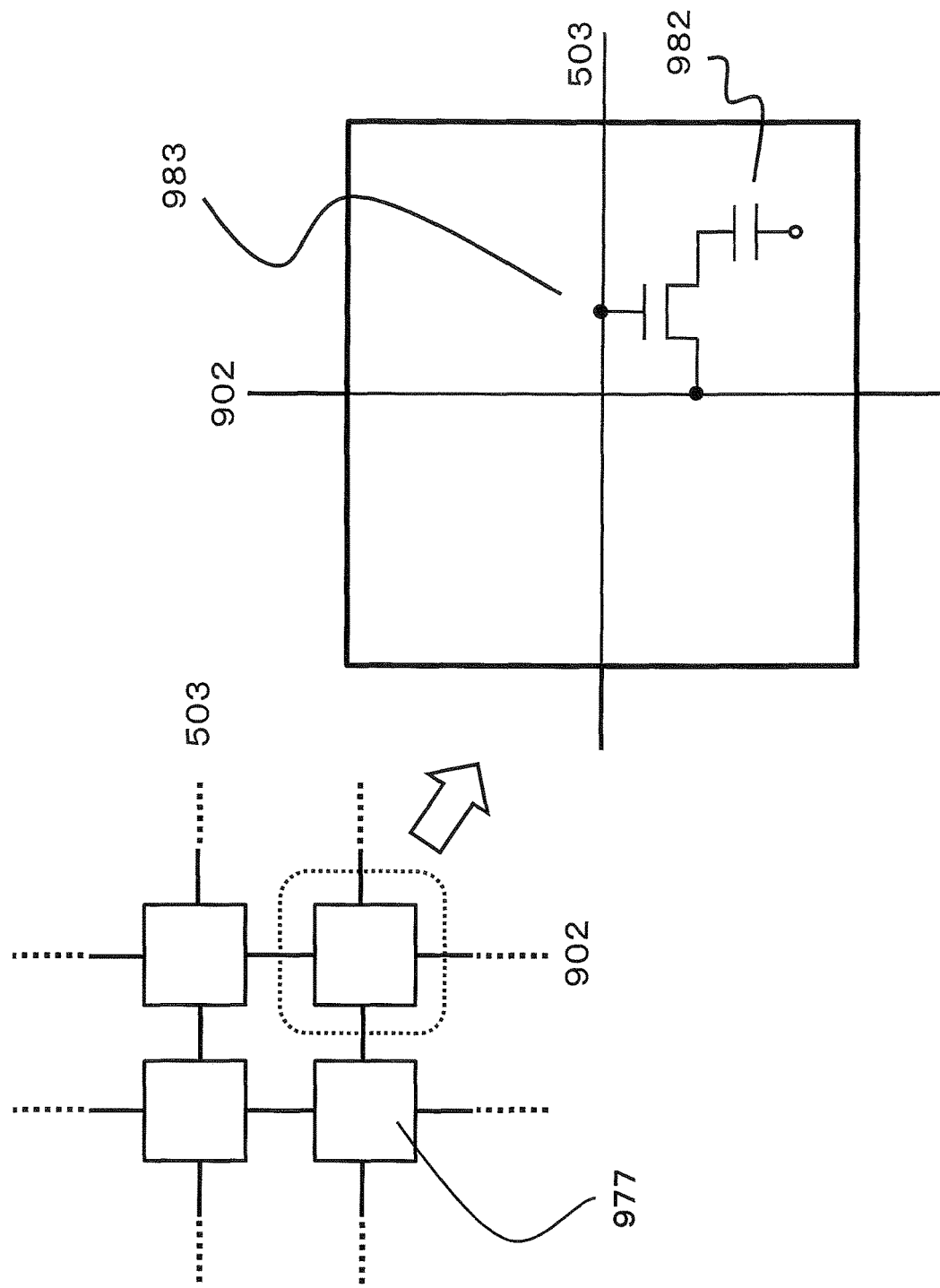
FIG. 70 is a diagrammatic view of the identification unit.

FIG. 44 shows the situation in which the identification cell 977 is a DRAM cell comprising the transistor 983 and the capacitor 982. It may be impractical to break the gate insulating film of the transistor 983, because the voltage of the capacitor 982 may drop. Thus, in this example, it may be performed by breaking the capacitor 982. More specifically, while a pass voltage may be applied between the word line and the bit line to turn the transistor 983 "ON", a high voltage stress may be applied to the bit line. The pulse shown in FIG. 40 may be an example of this high voltage stress. The read may be executed by reading the current flowing through the bit line 902 during the period of applying the pass voltage to the word line 503. The absolute value of the pass voltage may be larger than the absolute value of the voltage applied to the bit line, while the voltage difference may be the voltage needed to turn the transistor 983 "ON". As an example in FIG. 44, one electrode of the capacitor 982 may be connected to the transistor 983, and the other electrode of the capacitor 982 may be grounded. Moreover, in another example as shown in FIG. 70, one electrode of the capacitor 982 may be connected to the transistor 983, and the other electrode of the capacitor 982 may be connect to a different electrode. The different electrode may be connected to a source line or any other line in the chip. While the electric potential of the electrode is set to zero, the insulating breakdown may occur in the similar manner as mentioned above.

It is noted here that the identification cell 977 may adopt a common DRAM cell. Thus, if the chip identification device of the disclosure is added to the DRAM chip, it may be needed to simply assure the region of the identification device (cell array), while not increasing the manufacturing cost. The necessary bit capacity for the region of the identification device may be a very small amount compared to the bit capacity of common DRAM and other memory products not limited to DRAM.

For example, in the example shown in FIG. 30, the additional bit capacity of the chip identification device (N rows) and the scrambling device (K rows) may be evaluated as follows. The N is the number of columns, and then the number cases of the input codes may be the sum of 2 to the power of N and 2 to the power of (N+K). The number of the cases of the physical random numbers $\{d(i, j)\}$ of the scrambling device may be 2 to the power of NK. The number of the cases of the physical random numbers $\{d(i, j)\}$ of the chip identification device may be 2 to the power of $N^2$. The number of the cases of the output codes $\{c(i, j)\}$ may be 2 to the power of $N^2$.

Next, let us consider the requirement to determine (N, K). Firstly, the insulating film breakdown or the junction breakdown of the diode described above may be physically random, and may not depend on any algorithm. However, in the disclosure, in order to assure the property of input-output reliability, the physical randomness may be digitalized by generating the white and black (0/1) checker pattern as shown in FIG. 22, and the reduction of the quantity of the information may be conducted accordingly. Because the 0/1 checker pattern is disposed on the chip, if the number of the distributed cells is small, the number of cases of the pattern may also be small. Then, it may be regarded that the possibility of identical checker patterns to be generated may be increased. In order to eliminate such a defect, N and K may be set large enough so that the number of cases of the digitalized physical random number $\{d(i, j)\}$ may be practically infinity. On the other hand, nowadays, the input codes having been used in the conventional digital encryption line may be from 128 bits to 256 bits. The numbers of the bits are increasing gradually from year to year in order to match the encryption security. However, even so, it may be at most from 256 bits to 512 bits in the coming ten years. Thus, as an example, it may be assumed that N=K=512. Thus, the number of the input codes is the sum of 2 to the power of 512 and 2 to the power of 1024. In this event, the quantity of the information far exceeds the figure length of integer to be dealt with by the conventional computer. In deed the infinity may appear if a scientific calculator is used to compute this number. The number of the case of the physical random numbers $\{d(i, j)\}$ of the scrambling device, the number of the cases of the physical random numbers $\{d(i+N, j)\}$ of the chip identification device, and the number of the cases of the output codes $\{c(i, j)\}$ may be further larger, and may all be 2 to the power of $512^2$. Of course, it may be infinite in practical. Here, $512^2$=262,144. Thus, the bit capacity of the chip identification device may be well enough if it has 262 Kb including the scrambling device. This bit capacity is less by 4-figures compared to the bit capacity of the conventional DRAM product per silicon die (4 Gb), that is, far less approximately by $1/10,000$.

In the case that N=K=128, the number of the input codes may be the sum of 2 to the power of 128 and 2 to the power of 256, which may be approximately 10 to the power of 77. If IoT/IoE is really popularized, the number of communication nodes in the world may reach one trillion (10 to the power of 12). Thus, isn't 10 to the power of 77 infinite? It may be far larger than all of the nodes in the world. Thus, the possibility that two input codes may be accidentally identical may be 10 to the power of minus 65, which is so extremely small that it may be deemed as zero practically. The number of the cases of the physical random numbers $\{d(i, j)\}$ of the scrambling device, the number of the case of the physical random numbers $\{d(i+N, j)\}$ of the chip identification device, and the number of the case of the output codes $\{c(i, j)\}$ may all be 2 to the power of $128^2$, and of course, practically infinite. Here, $128^2$=16,384. Thus, 16 Kb may be good enough as the bit capacity of the chip identification device and the scrambling device. The bit capacity is less by 5-figures compared to the bit capacity of the conventional DRAM product per silicon die (4 Gb), which is far less approximately by $1/100,000$.

Currently, the price of 4 Gb DRAM is approximately 2.5 to 3 US dollars. Because DRAM cells may be used as the identification cell 977 as is, the price of the chip identification device and the scrambling device may be at most about 0.03 US cents per chip, even while a sufficient quantity of the information of the physical randomness is kept.

The Eighth Embodiment

Figure 45:
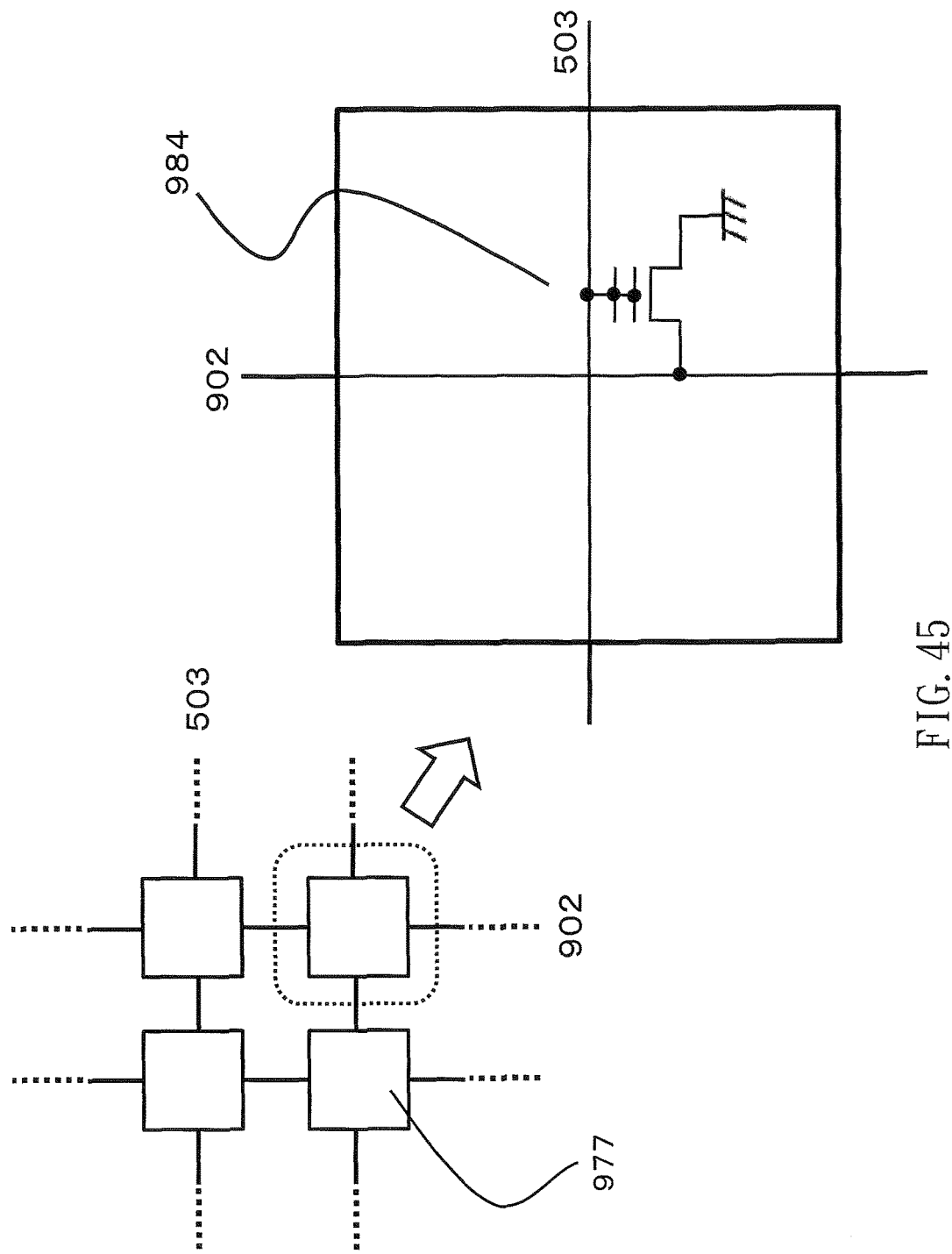
FIG. 45 is a diagrammatic view of the identification unit.
Figure 71:
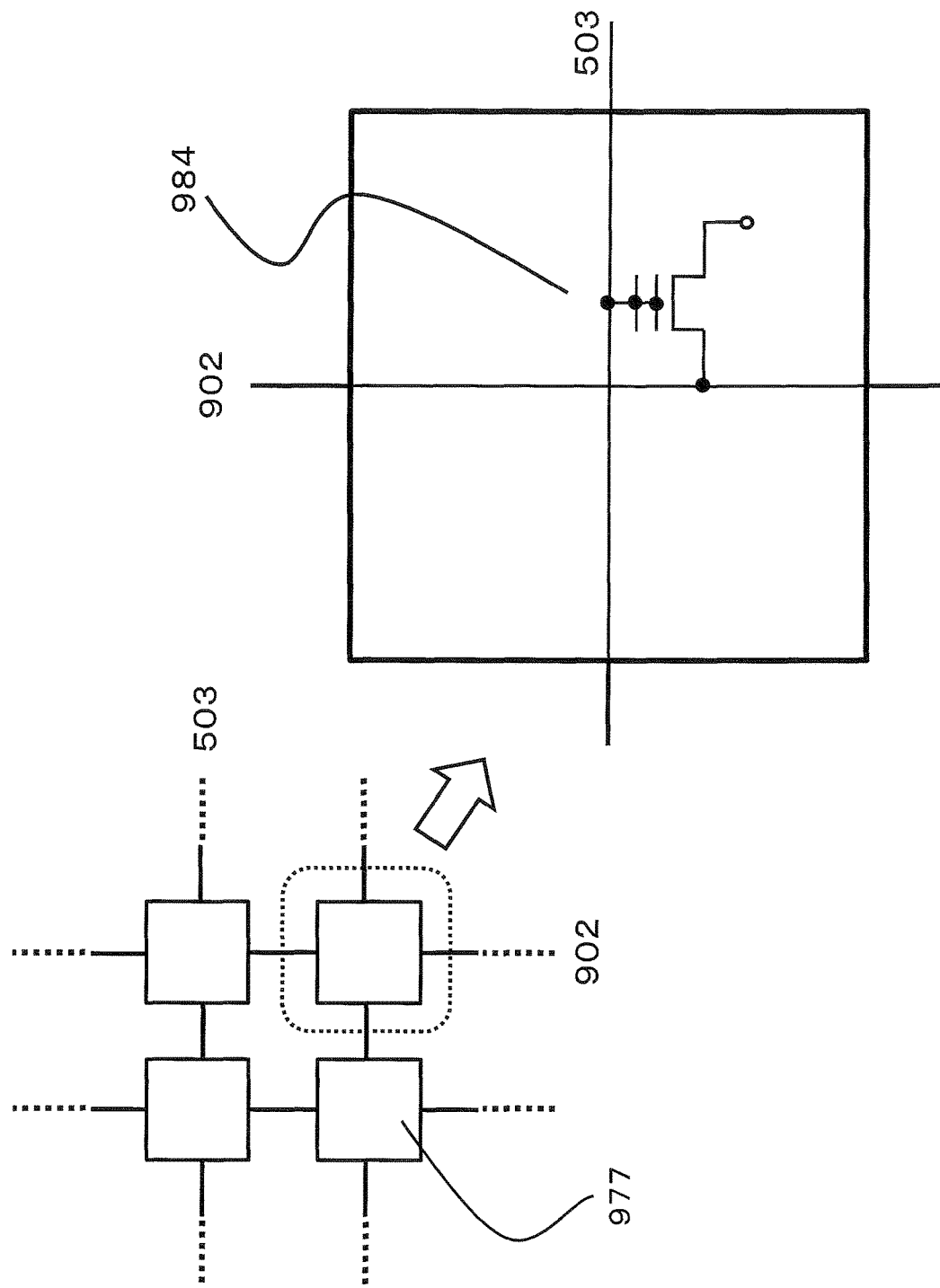
FIG. 71 is a diagrammatic view of the identification unit.

Referring to FIG. 45, it shows a diagrammatic view of the identification cell 977. A select transistor 984 for controlling the nonvolatile memory may be disposed at the intersection of the word line 503 and the bit line 902. The memory cell of the nonvolatile memory may have a layered structure of silicon, tunnel film, charge storage layer, interlayer dielectric film, and control gate that are layered on a first conduction type semiconductor substrate or a first conduction type well between two diffusion layers. The select transistor 984 may replace the interlayer dielectric film of the memory cell with an interlayer conducting layer in a part or in whole, otherwise, it may also use a conductive via (such as, a metal via) formed by filling a conductive material in a hole opened for penetrating the interlayer dielectric film. Anyway, by applying a high voltage to the word line 503 connected to the control gate, a high electric field stress may be applied to the tunnel film of the select transistor 984 disposed at the selected intersection. Here, the breakdown of the tunnel film or the read may be identical to the breakdown of the gate insulating film of the transistor 983. In other words, if we replace the gate insulating film in the sixth embodiment with the tunnel film, all of the illustration may be the same and thus omitted. As an example shown in FIG. 45, a diffusion layer of the select transistor 984 may be connected to the bit line 902, and the other diffusion layer may be grounded. Moreover, as another example as shown in FIG. 71, a diffusion layer of the select transistor 984 may be connected to the bit line 902, and the other diffusion layer may be connected to a different electrode. The different electrode may be connected to a source line or any other line in the chip. While the electric potential of the electrode set to zero, the breakdown of the tunnel film may occur in the similar manner as mentioned above. Otherwise, if the different electrode remains floating, the breakdown of the tunnel film may only occur on the bit line side.

The Ninth Embodiment

Figure 46:
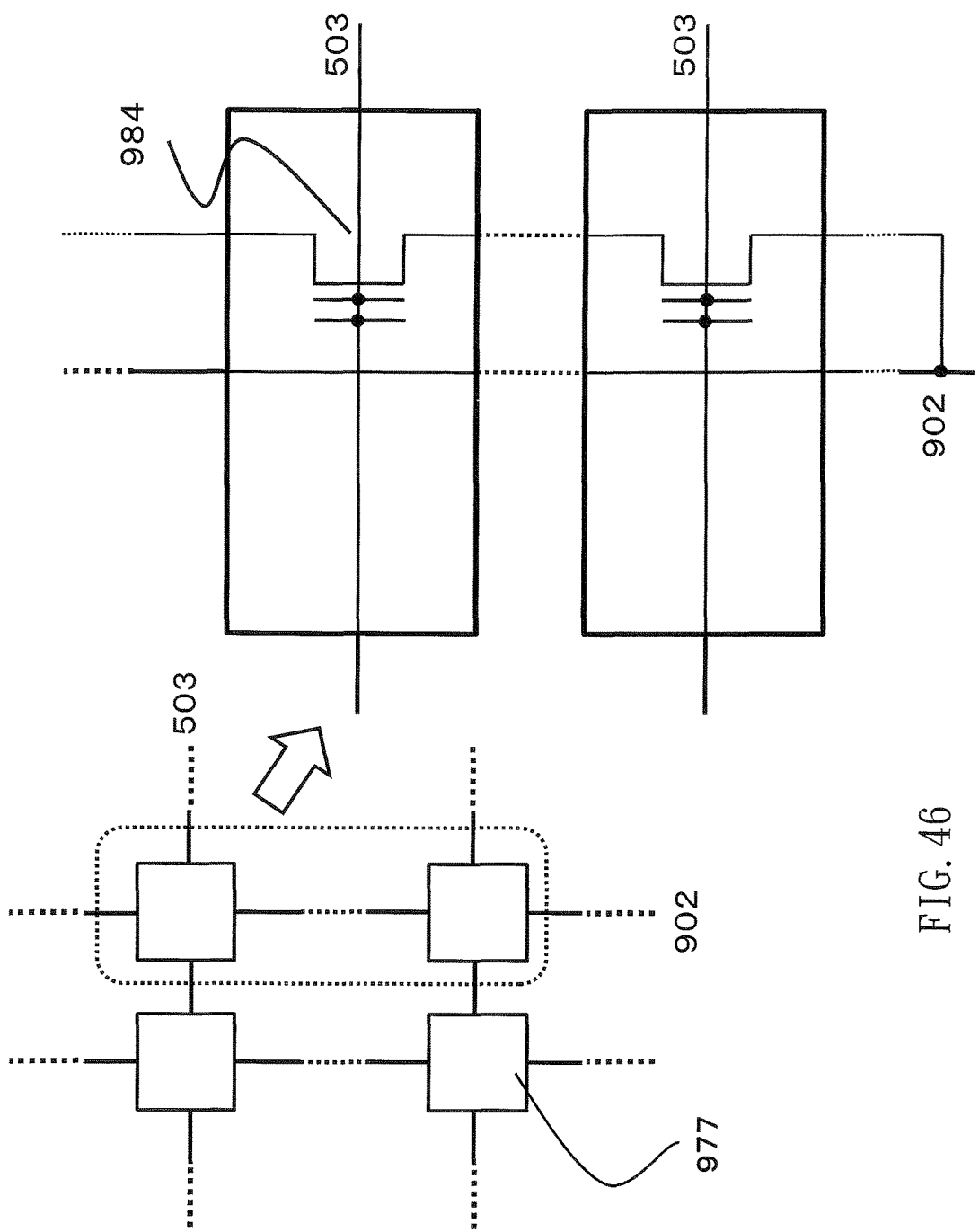
FIG. 46 is a diagrammatic view of the identification unit.

Referring to FIG. 46, it provides an example in which two diffusion layers of adjacent select transistors 984 along the direction of the bit lines are connected. This circuit structure is called NAND-type arrangement. Since the operation mechanism may be complicated, the detailed illustration based on drawings is provided below.

Figure 47:
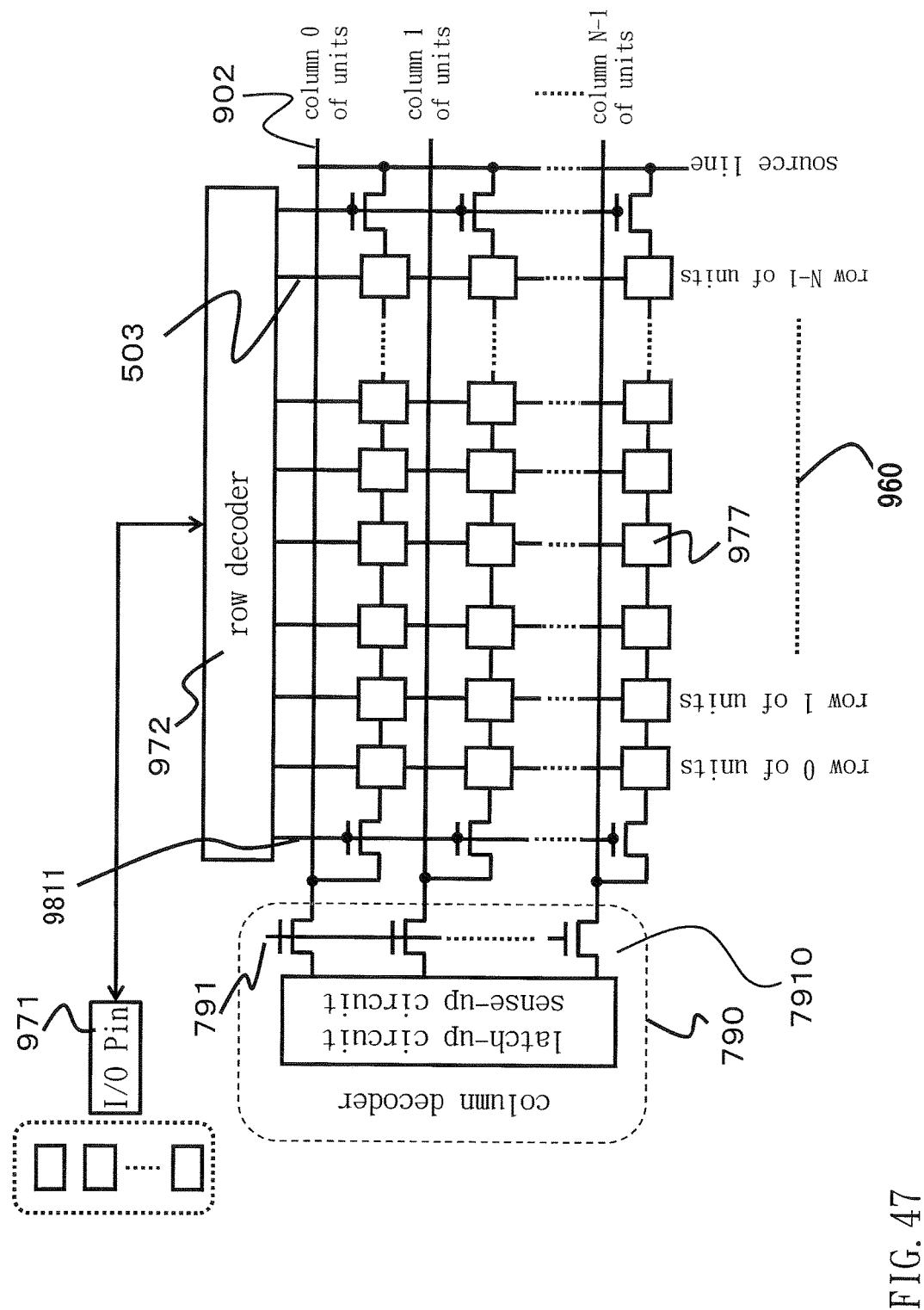
FIG. 47 is a diagrammatic view of the arrangement of units of the identification unit comprising a part of a peripheral circuit.

FIG. 47 presents an example of the identification cell array 960 of the disclosure. A page buffer 790 may also be shared by NAND-type nonvolatile memory cell array. A bit line connecting gate 791 may be disposed to control the ON/OFF state of the connection to the bit line 902. The page buffer 790 may comprise a circuit controlling sense-up or latch-up effect.

In the embodiment, the memory cell to be embedded may be NAND-type, but not limited to this. The volatile memories such as DRAM, or the nonvolatile memories such as NOR-Flash, and emerging memories, i.e., magnetoresistive random access memory, phase change random access memory, and resistive random access memory. In other words, any type of memory cells may be able to be embedded with the chip identification device cell array 611 of the disclosure to a chip, as long as at least either of one of bit lines or one of word lines is shared with the chip identification device cell array 611 of the disclosure.

The following provides an example showing how to apply the voltage pulse to the identification cell 977. Firstly, a positive potential may be applied to the select gate on the bit line side, and then the select transistor on the bit line side may be turned "ON". Similarly, if there are one or more word lines between the word line to be broken and the select transistors on the sides of the bit line, a positive potential may be also applied to those one or more word lines not to be broken to turn each of the corresponding nonvolatile memory transistors "ON". Here, the electric potential of the bit line to which the breaking pulse is applied is set to be 0V. Next, the word line to which the breaking pulse is applied is selected, and then the breaking pulse is applied thereon. The method shown in FIG. 40 may act as an example of the method to apply the breaking pulse. Furthermore, if a plurality of chip identification codes is used on a chip, a plenty of chip identification blocks may be needed for a plenty of chip identification code, respectively, on the chip. In this event, the number of the breaking pulses may be determined by performing the method shown in FIG. 40 to one of those chip identification devices. The number may be recorded in the memory region (or buffer) of the chip, and then the same number of the breaking pulses may be applied to the other identification regions of the same chip. By doing so, the inspections of the breakdown rate between the pulses may be omitted.

Figure 48:
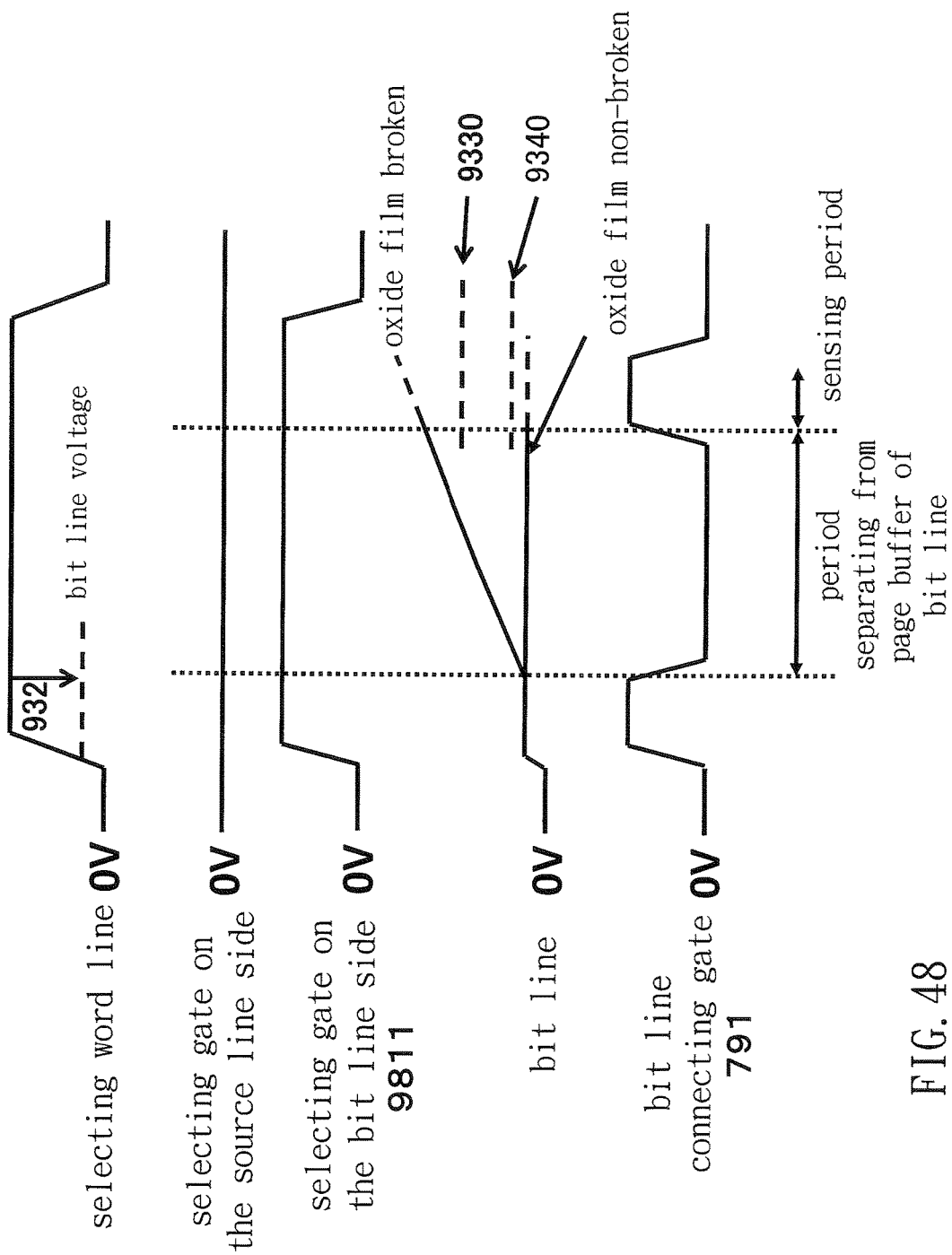
FIG. 48 is a diagrammatic view of a method of reading the data of the identification unit.

FIG. 48 shows a waveform of the voltage pulse to conduct the breakdown inspection in the embodiment. Firstly, a word line related to the capacitor to be read may be selected, and then a predetermined electric potential larger than 0 V may be applied thereto. If there are other word lines between the selected word line and the selecting gate in the side of the bit line, a positive potential may be applied to those unselected word lines to turn the corresponding transistors "ON". An electric potential in the range from 0V to the predetermined one which is lower than applied to the selected word line may be applied to the selected word line. The electric potential difference between the selected word line and the bit line may be about the breakdown determining voltage 932 as shown in FIG. 38, for example. At the same time, a positive potential may be applied to the selecting gate 9811 on the drain side to turn on a drain selecting transistor (SGD). Next, the voltage of the bit line connecting gate 791 may be reduced to 0V. At this moment, a bit line connecting transistor 7910 may be turned "OFF", and the bit line may be disconnected from an inspection circuit of the page buffer 790. If the selected identification cell 977 is conductive, the electric potential of the bit line may rise. In contrast, if the selected identification cell 977 is not conductive, the electric potential of the bit line may remain unchanged. Next, a positive potential may be applied to the bit line connecting gate 791 again to turn the bit line connecting transistor 7910 "ON". Subsequently the change of the electric potential of the bit line may be examined in the page buffer 790. The electric potential difference of the bit line of the identification cell 977, which may be attributable to the difference resulting from the conductive and non-conductive states, may be amplified in the page buffer 790, and then the amplified potential difference may be stored in the latch circuit as high and low data. In other words, if the electric potential of the bit line is higher than the predetermined electric potential (such as, a breakdown determining voltage value 9330), the selected identification cell 977 may be deemed broken. If the electric potential of the bit line is lower than the predetermined electric potential (such as, a non-breakdown determining voltage value 9340), the selected identification cell 977 may be deemed non-broken. Here, the breakdown determining voltage value 9330 and the non-breakdown determining voltage value 9340 may correspond to the breakdown determining current value 933 and the non-breakdown determining current value 934 shown in FIG. 38, respectively. In this example, the breakdown may correspond to the conductive state, and the non-broken may correspond to the non-conducting condition.

Figure 49:
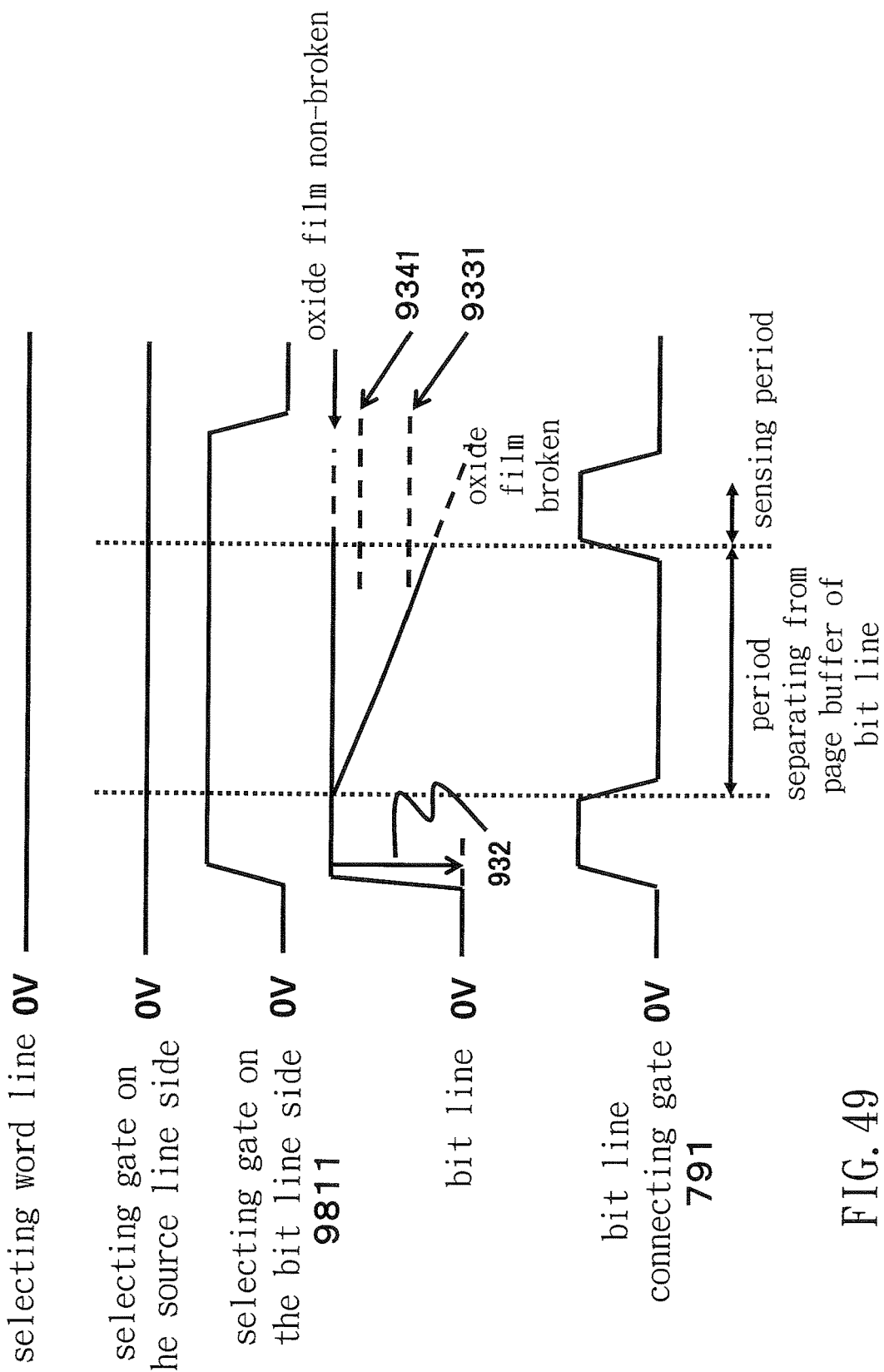
FIG. 49 is a diagrammatic view of a method of reading the data of the identification unit.

FIG. 49 presents another example showing the waveform of voltage pulse to conduct the breakdown inspection in the embodiment. Firstly, a word line related to the capacitor to be read may be selected, and 0V may be applied thereto. Similarly, if there are other word lines between the selected word line and the selecting gate in the side of the bit line, a positive potential may be applied to those word lines to turn the corresponding transistors "ON". A predetermined positive potential may be applied to the bit line. The electric potential difference between the selected word line and the bit line may be about the breakdown determining voltage 932 as shown in FIG. 38, for example. At the same time, regarding the selecting gate 9811 for the bit lines, a positive potential may be applied to the selecting gate 9811 to turn on the drain selecting transistor (SGD) for the bit lines. Next, the voltage of the bit line connecting gate 791 may be reduced to 0V. Thus, the bit line connecting transistor 7910 may be turned "OFF", and then the bit line may be disconnected from the inspection circuit of the page buffer 790. If the selected identification cell 977 is conductive, the electric potential of the bit line may decrease. In contrast, if the selected identification cell 977 is not conductive, the electric potential may remain unchanged. Next, a positive potential may be applied to the bit line connecting gate 791 again to turn the bit line connecting transistor 7910 "ON". Subsequently, the change of the electric potential of the bit line may be examined in the page buffer 790. The electric potential difference of the bit line of the identification cell 977, which may be attributable to the difference resulting from the conductive and non-conductive states, may be amplified in the page buffer 790. The amplified potential difference may be then stored in the latch circuit as high and low data. In other words, if the electric potential of the bit line is lower than the predetermined electric potential (such as, a breakdown determining voltage value 9331), the selected identification cell 977 may be deemed broken. If the electric potential of the bit line is higher than the predetermined electric potential (such as, a non-breakdown determining voltage value 9341), the selected identification cell 977 may be deemed non-broken. Here, the breakdown determining voltage value 9331 and the non-breakdown determining voltage value 9341 may correspond to the breakdown determining current value 933 and the non-breakdown determining current value 934 shown in FIG. 38, respectively. In this example, the broken may correspond to the conducting state, and the non-broken may correspond to the non-conducting condition.

A space of a block which is large enough to encompass the chip identification device may be assigned adjacent to a plurality of blocks in a nonvolatile memory. For example, the layouts shown in FIG. 35 and FIG. 36 may be adopted. As a result, though the chip identification device and the nonvolatile memory may be different, the area of the chip may be reduced by sharing the bit lines 902 or the word lines 503.

The Tenth Embodiment

Figure 50:
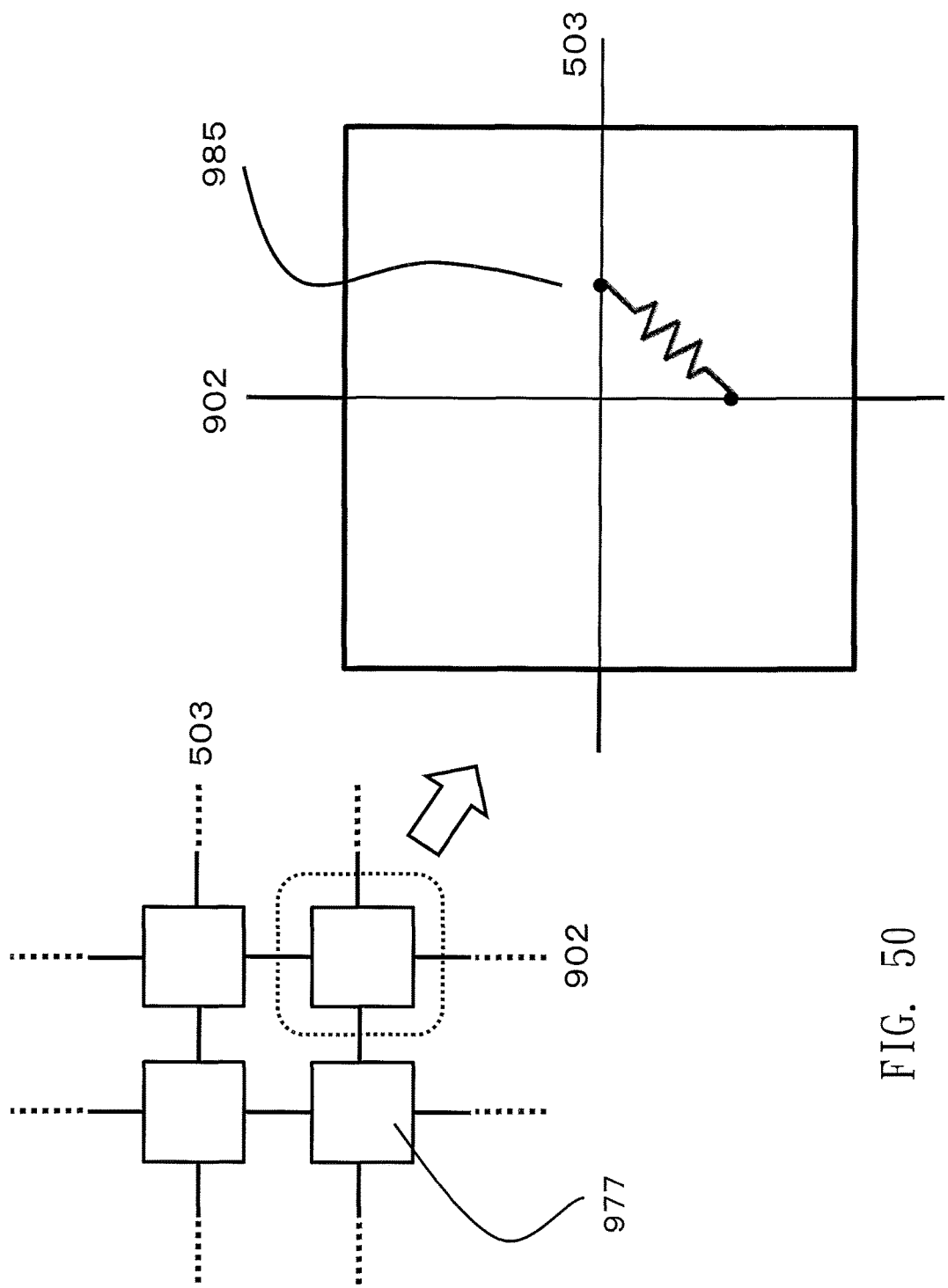
FIG. 50 is a diagrammatic view of the identification unit.

Referring to FIG. 50, it shows a diagrammatic view of the identification cell 977. A fuse resistor 985 may be disposed at the intersection of the word line 503 and the bit line 902. By applying a high voltage between the word line 503 and the bit line 902, an electric field stress may be applied to the fuse resistor 985 at the selected intersection.

Generally speaking, a fuse resistor may be a conductive material with high resistance being sandwiched by two terminals. A high electric field applied to the fuse may probabilistically case a short circuit at the intersection of the word line 503 and the bit line 902; and then this intersection may be in the non-conductive state. If the selected fuse may not be short circuit (non-shorted), the corresponding intersection of the word line 503 and the bit line 902 may be in the conductive state. At which address the fuse is shorted or non-shorted may be determined by the physical randomness. Thus, the random checker pattern as shown in FIG. 22 may be generated.

Whether the fuse is broken or not may be determined by applying a read voltage to the fuse resistor 985. In a shorted cell, it may be hard for the current to flow even if the read voltage is applied, which may correspond to the "0" in terms of the semiconductor memory. In a non-shorted cell, the current may easily flow even if the read voltage is very low, which may correspond to the "1" in terms of the semiconductor memory. Thus, the short circuit of the fuse may correspond to the disruption of the conductors, and for example, such a disruption may be attributable to electromigration. That is, the electromigration may probabilistically occur, and the cell at which the electromigration occurred may correspond to the "0" in terms of the semiconductor memory, while the cell at which the electromigration occurred may correspond to the "1" in terms of the semiconductor memory.

Figure 51:
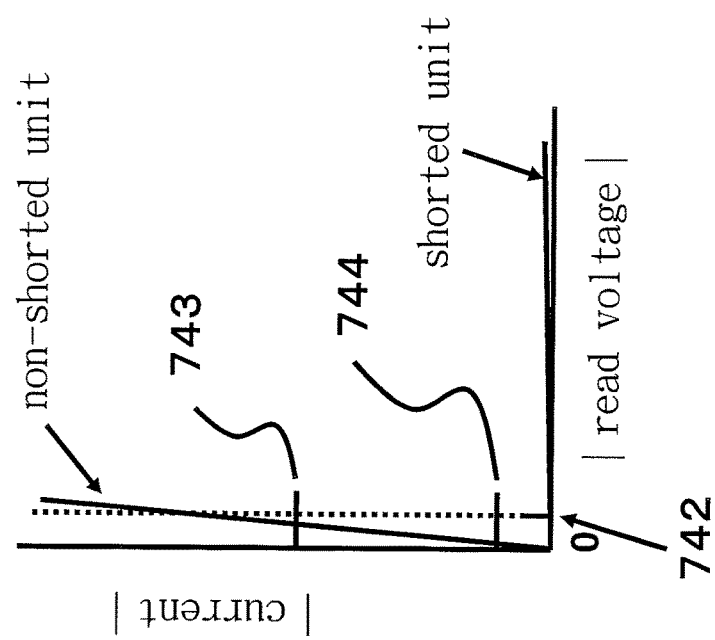
FIG. 51 is a diagrammatic view of a method of reading the identification unit.

FIG. 51 shows a voltage-current diagram for determining the short circuit. The horizontal axis may be the absolute value of the read voltage to be applied to the fuse resistor 985, and the vertical axis may be the absolute value of the current flowing through the fuse resistor 985 with regard to the read voltage. In a non-shorted cell, a huge current may flow even at lower voltage. In contrast, in a shorted cell, almost no current may flow even at high voltage. To distinguish short and non-short states, a non-shorted determining current value 743 and a shorted determining current value 744 may be introduced with regard to a shorted determining voltage 742. The read voltage having the same absolute value with the shorted determining voltage 742 to the fuse resistor 985 may be applied. Then, if the absolute value of the current flowing through the fuse resistor 985 is larger than the non-shorted determining current value 743, it may be determined as non-shorted. If the absolute value of the current flowing through the fuse resistor 985 is smaller than the shorted determining current value 744, it may be determined as shorted.

In the determining method provided in FIG. 51, there may be a certain gap between the non-shorted determining current value 743 and the shorted determining current value 744. Thus, if the absolute value of the read current through a cell falls in the gap, the corresponding cell may be determined as neither shorted nor non-shorted. The cell like this may correspond to neither "0" nor "1" in terms of the semiconductor memory, and thus may be marked as "X". In this event, the address (number) of the cell on the cell array and the corresponded data of the cell may be similar to FIG. 39, in which the identification cell 977 is the capacitor 982. For example, the sequence may be "1", "1", "0", "1", "X", "0", "0", "1", . . . , "0" from the left. Accordingly, the data of the fifth cell from the left is "X". Here, the method of removing "X" to obtain the checker pattern comprising only black and white as shown in FIG. 22 may be same as the method of the capacitor 982. The illustration is thus omitted.

To practically read, the address of the cell to be read may have to be selected first of all. As shown in FIG. 23, to select the address, the row decoder 972 may be used to select the row number of the cell to be read, and the column decoder 973 may be used to select the column number of the cell to be read. The row decoder 972 and the column decoder 973 are connected to PIN 971. The combination of the row number and the column number may be the address of the cell to be read. In the example shown in FIG. 39, the addresses may be represented in binary. Thus, the read voltage may be applied to the intersection between the word line 503 and the bit line 902, which correspond to the address of the selected cell, by using the method illustrated in FIG. 51, in order to read the data ("1" or "0") at the corresponding address. After reading, the address of the cell to be selected may be changed, and then the process may be repeated until the data of all of the cells in the cell array shown in FIG. 23 has been read.

Figure 52:
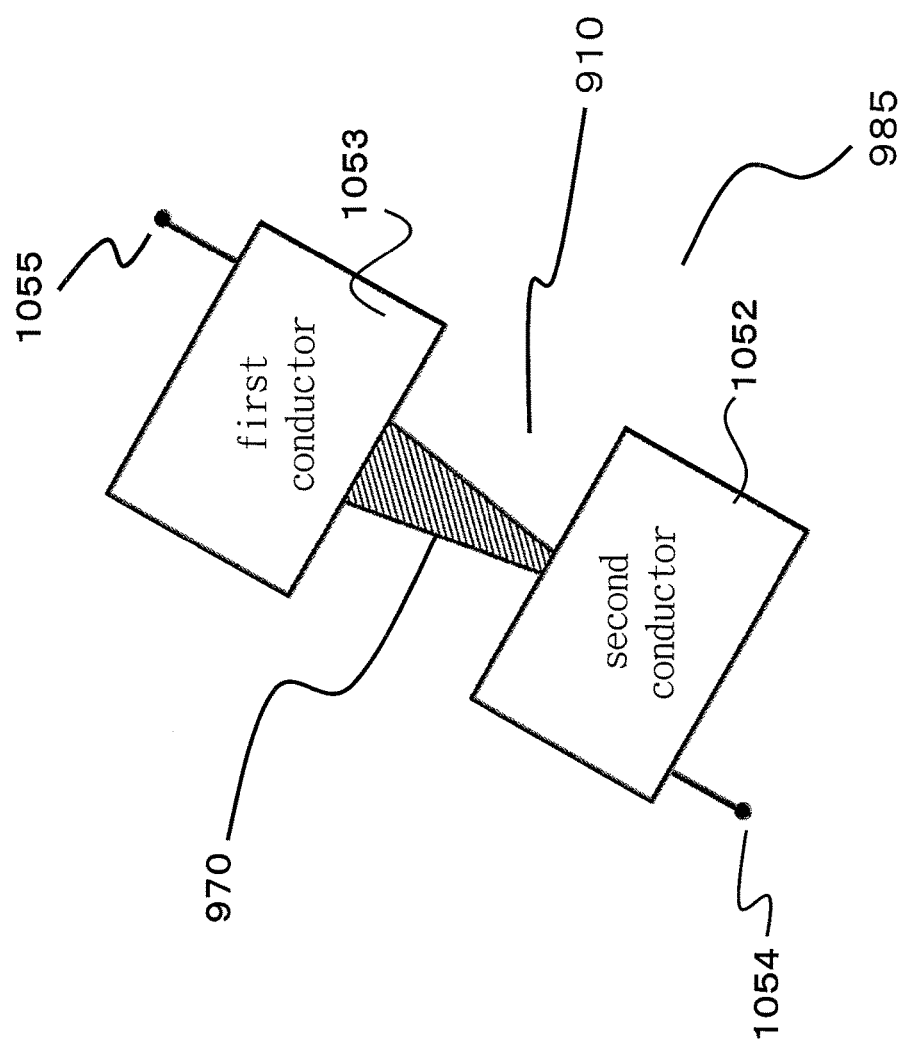
FIG. 52 is a diagrammatic view of the structure of the identification unit.

FIG. 52 provides an example of the fuse resistor 985. The device has a structure comprising the first conductor 1053, the second conductor 1052, the insulating film 910, and a conductor engaging portion 970. The first conductor 1053 may be connected to the first electrode 1055, and the second conductor 1052 may be connected to the second electrode 1054. Either the word line 503 or the bit line 902 may be connected to the first electrode 1055 and the other may be connected to the second electrode 1054. The manufacturing variance may be shown in the thickness of the conductor engaging portion 970. Thus, the resistance and the possibility of causing short circuit may also vary. Accordingly, it may be preferred to apply the voltage stress repeatedly to adjust both of the shorted rate and the non-shorted rate to approximately 50%.

Generally speaking, the electric stress may generate heat at the portion of the conductor engaging portion 970 with high resistance, and thus may cause the electromigration. If the electromigration occurs, the conductor engaging portion 970 may be broken at the portion to be heated. Moreover, because high temperature may cause oxidation, it will enter a part of the insulating film 910 as is transited from FIG. 51 to FIG. 41. As a result, the fuse resistor 985 may be transited from the non-shorted state to the shorted state.

Furthermore, if the electric stress has been repeatedly applied, the insulating breakdown may occur on the broken part of the insulating film 910 (see FIG. 41). As a result, the fuse resistor 985 may be transited from the shorted state to the non-shorted state. At this time, it transits from FIG. 41 back to FIG. 52.

It may be difficult to artificially make either the transition from the non-shorted state to the shorted state or the transition from the shorted state to the non-shorted state prevail. The intermediate state may be "X". Thus, during the period of the repeatedly applying electric stress, the ratio of the intermediate state labelled "X" may be smaller than a predetermined value, while it may also be larger than the predetermined value. However, if the number of the cells in the intermediate state is more than the predetermined value, the randomness of the pattern may not be enough due to the reduction of the data information. Thus, it may be required to repeat the voltage pulse in order to apply the electric stress to the cells. For example, the breakdown inspection may be executed as illustrated in FIG. 51 after applying the first break pulse voltage. Here, if the ratio of "X" is larger than a predetermined value, the second break pulse voltage may be applied and then the breakdown inspection may be executed as illustrated in FIG. 51 again. If the ratio of "X" remains high, the third breakdown pulse voltage may be applied and then the breakdown inspection may be executed as illustrated in FIG. 51 again. This process may be repeated until the ratio of "X" is smaller than the predetermined value. An upper limit of the times for the process to be repeated may have to be set in advance. If the ratio of "X" is still not smaller than the predetermined value after the times of the process having been repeated reach the upper limit, the chip identification device may be deemed failed in the inspection. If passing the inspection, the address of the cell labelled "X" may be recorded in the buffer, and the data corresponding to the cell may be eliminated. If failing in the inspection, the chip may be discarded. However, as long as the quantity of the cells is huge, the physical randomness may still be ensured even though the ratio of the cells in the intermediate state is slightly high. In this event, the process of inspecting the ratio of "X" may be omitted.

On the other hand, in order to optimize the use of the physical randomness, the ratios of "0"s and "1"s may preferably be at approximately 50% respectively. The cells labelled "X" may be transited to "0" by chance during the period in which the pulse voltages are repeatedly applied. Thus, as shown in FIG. 40, it may be preferred to fix the period to apply a pulse voltage, while the wave the pulse height may be incremented by a certain voltage at each pulse. Thus, for example, even if the amount of "1"s is large at the first pulse, the ratio of "0"s may rise while a plurality of pulses are applied. Accordingly, by optimizing the times to apply pulses, the period to apply each pulse, and the incremental method of the wave height, the ratio of the data to be eliminated ("X"s) may be reduced as much as possible and the ratios of "0"s and "1"s may be made close to 50%, respectively. If this optimization in a chip fails, the chip may be deemed as failing in the inspection and then be discarded as a defective product. Thus, only quality items having sufficient physical randomness and comprising stable data of "0"s and "1"s may be produced as products.

The Eleventh Embodiment

Figure 53:
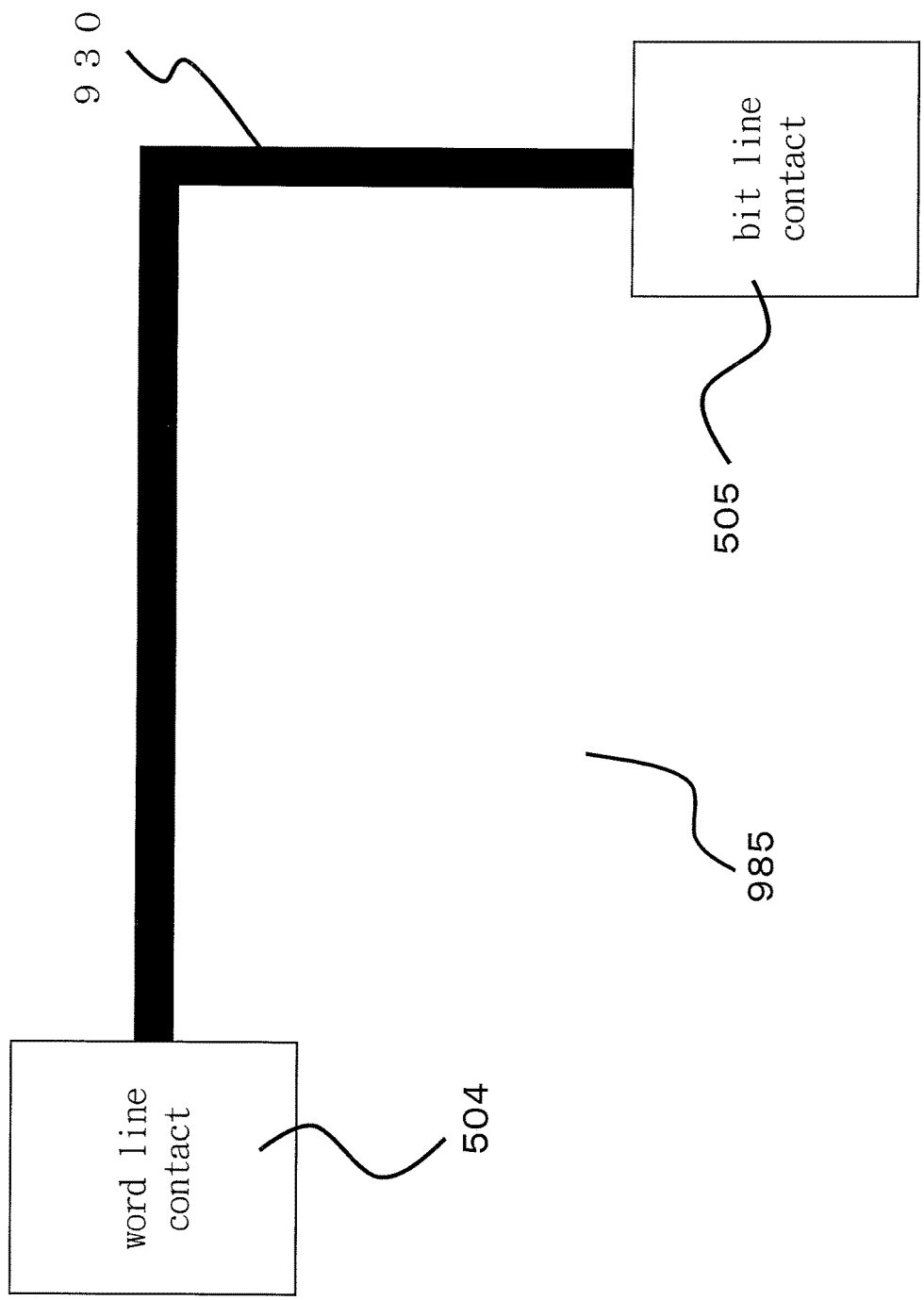
FIG. 53 is a diagrammatic view of the structure of the identification unit.
Figure 54:
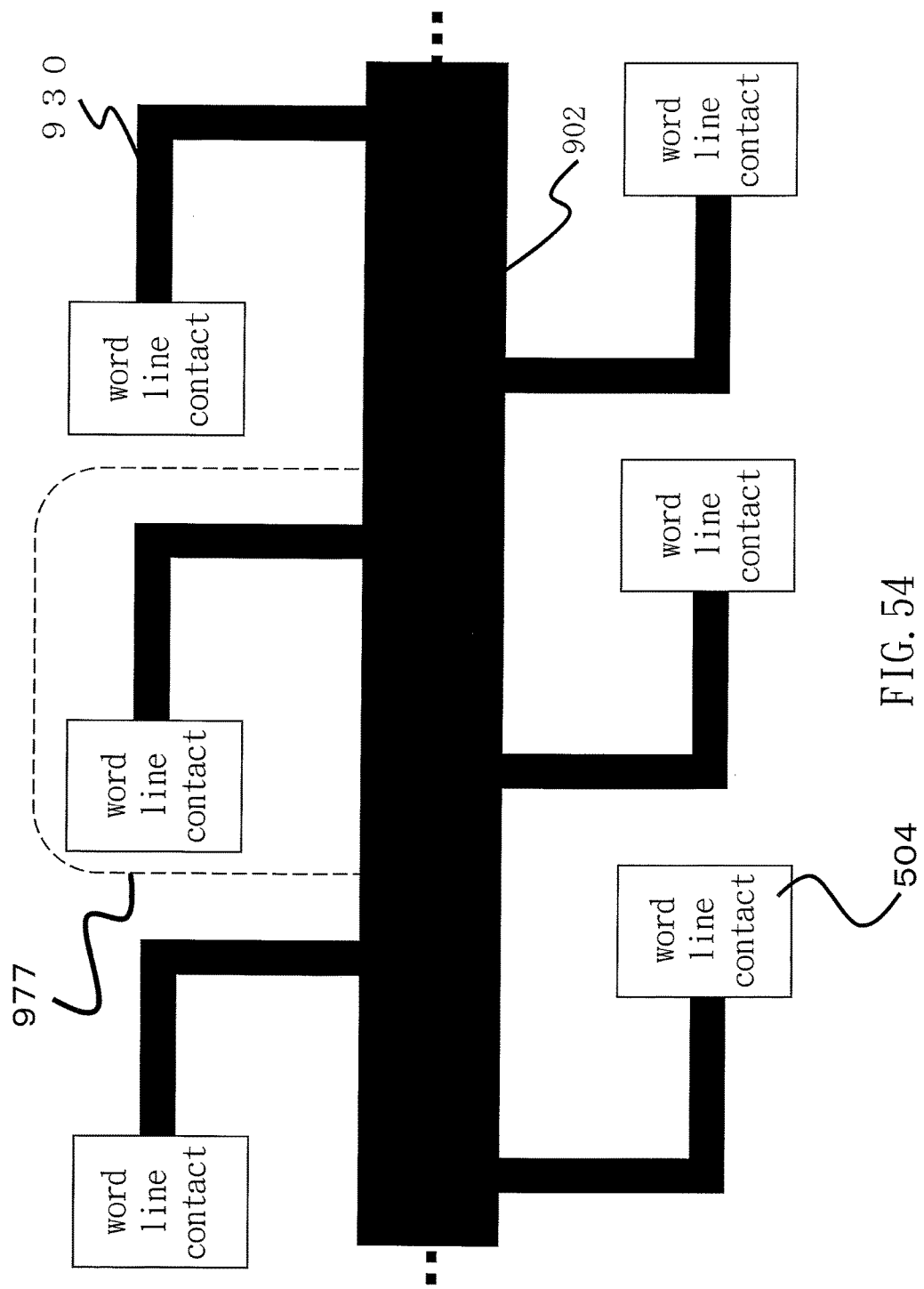
FIG. 54 is a diagrammatic view of the arrangement of the identification units.

FIG. 53 provides another example of the fuse resistor 985 adopted in FIG. 50. It may be fabricated simultaneously when forming a wiring pattern. Accordingly, it may be preferable that a conductor 930 may be the same material with the material of common metal wiring. The outline of the pattern may preferably be bended to be rectangular in at least a portion. The bended portion may be easily heated, and thus may easily cause the electromigration which leads to the disconnection. The word line contact 504 may be connected to the word line 503, while the bit line contact 505 may be connected to the bit line 902. FIG. 54 provides an example of the layout of the identification cells 977 provided in FIG. 53.

Figure 55:
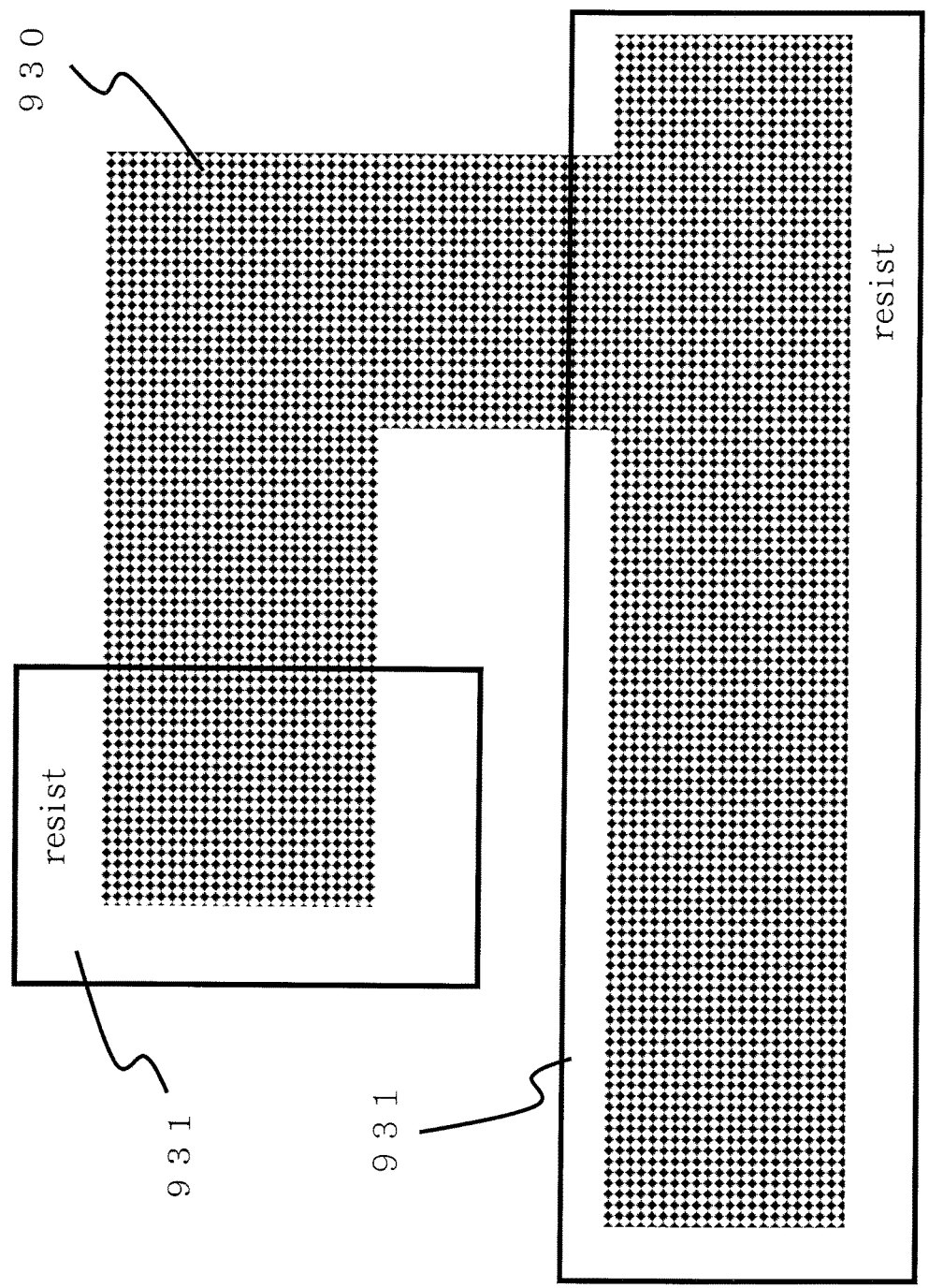
FIG. 55 is a diagrammatic view of the method of manufacturing the identification unit.
Figure 56:
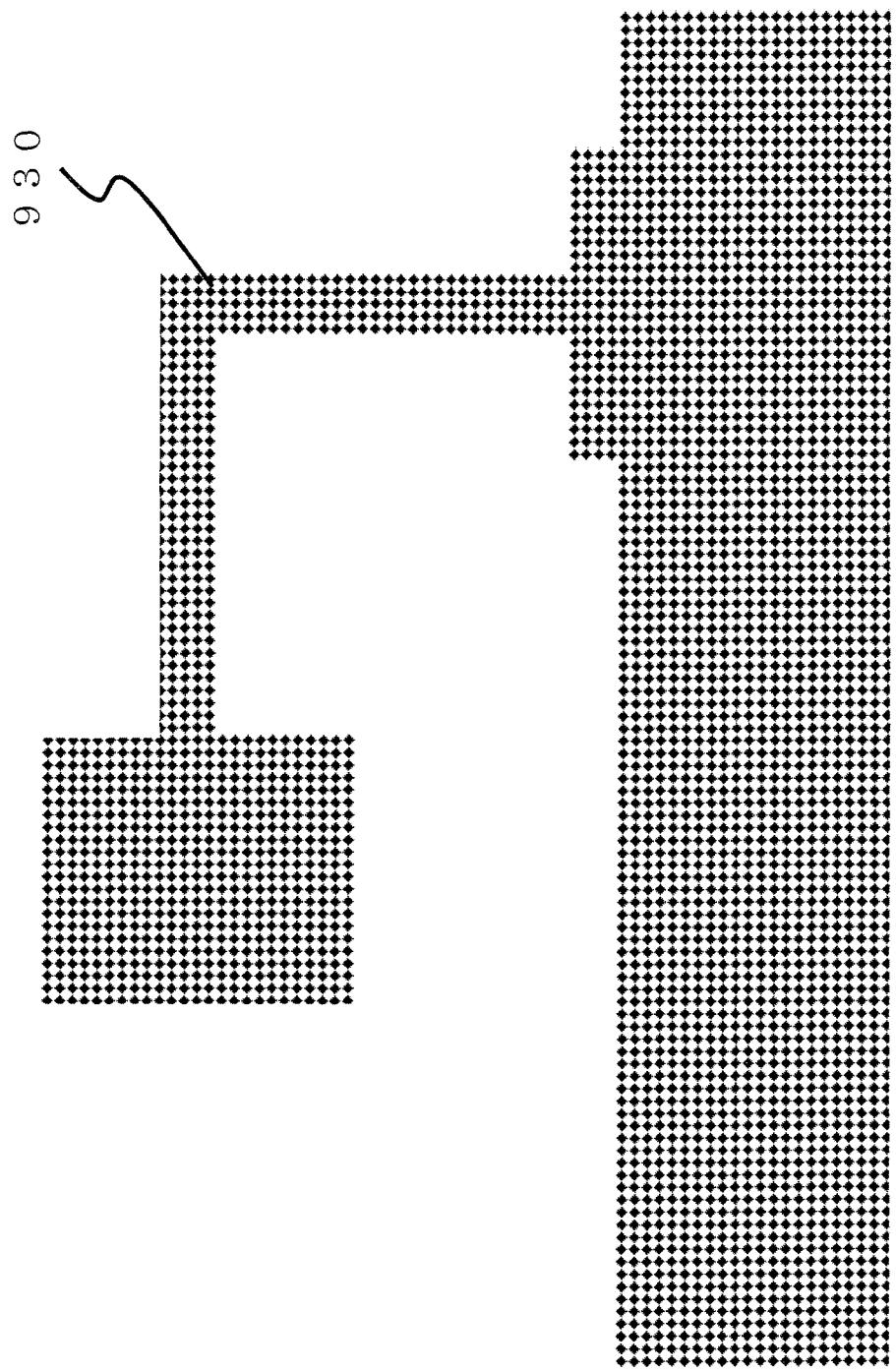
FIG. 56 is a diagrammatic view of the method of manufacturing the identification unit.

Furthermore, it may be preferable that the bended rectangular portion in FIG. 53 are made slimmer than the common metal wiring. For example, as shown in FIG. 55, the cell may be masked with resist 931 except for the rectangular portion, and then the structure may be formed by the slimming with the oxidation process. FIG. 56 shows an example of the result.

The Twelfth Embodiment

Figure 57:
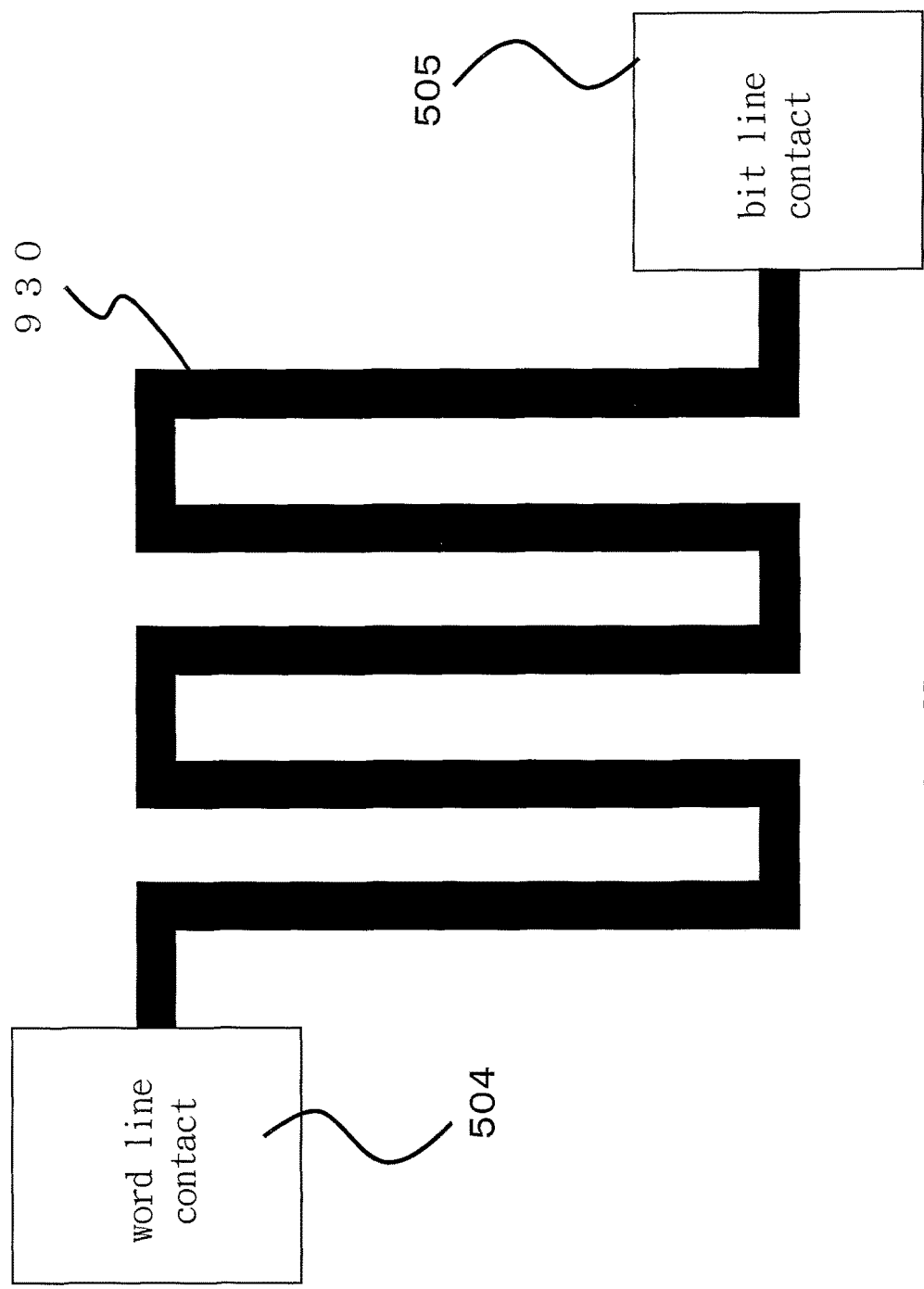
FIG. 57 is a diagrammatic view of the structure of the identification unit.
Figure 58:
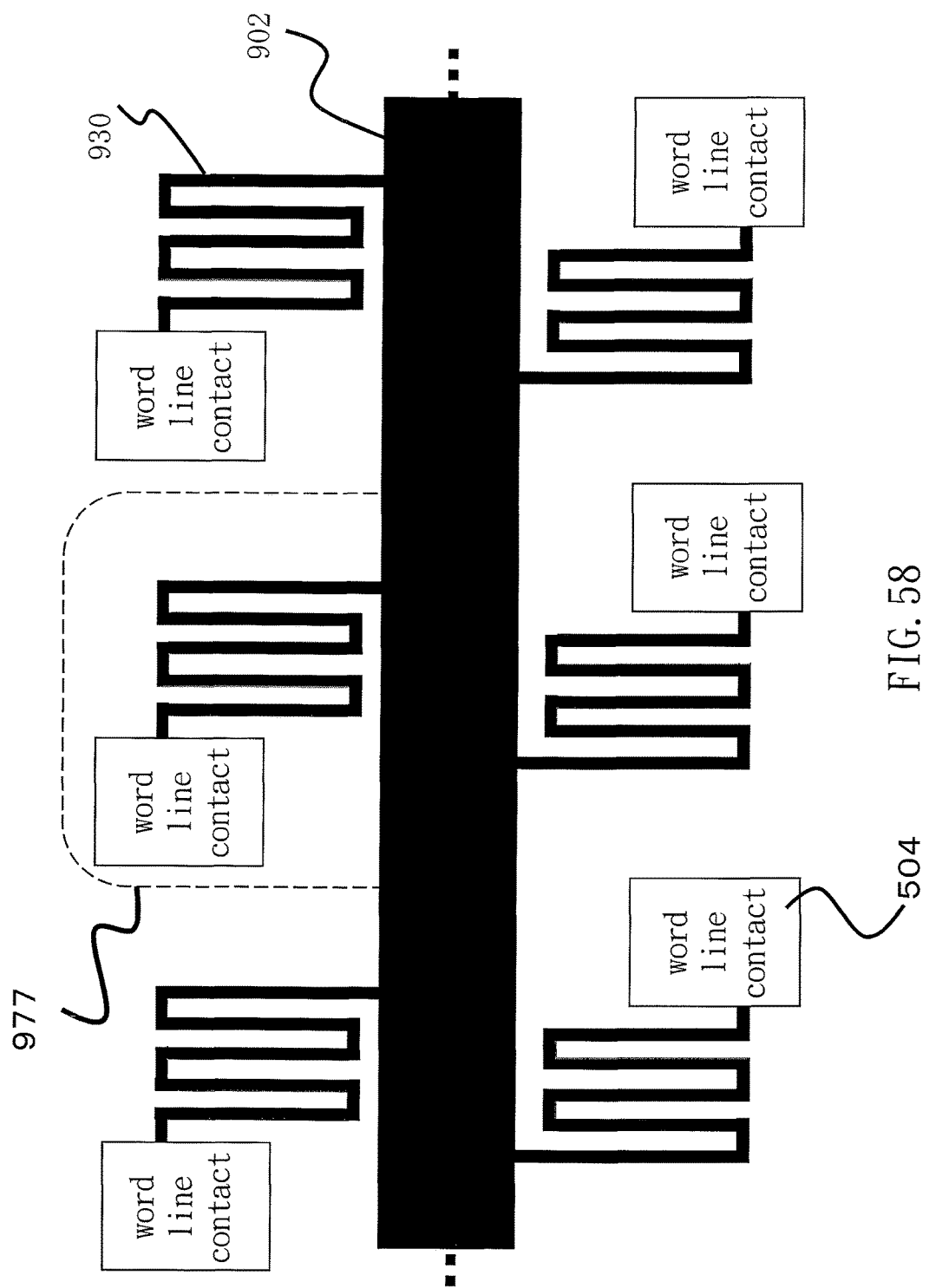
FIG. 58 is a diagrammatic view of the arrangement of the identification units.

The conductor 930 may be bended to be rectangular for multiple times. FIG. 57 provides an example in which the conductor 930 has 9 bends. FIG. 58 provides an example of layout using such pattern. As a result, the possibility of short circuit to happen may be adjusted through layout patterning.

The Thirteenth Embodiment

Figure 60:
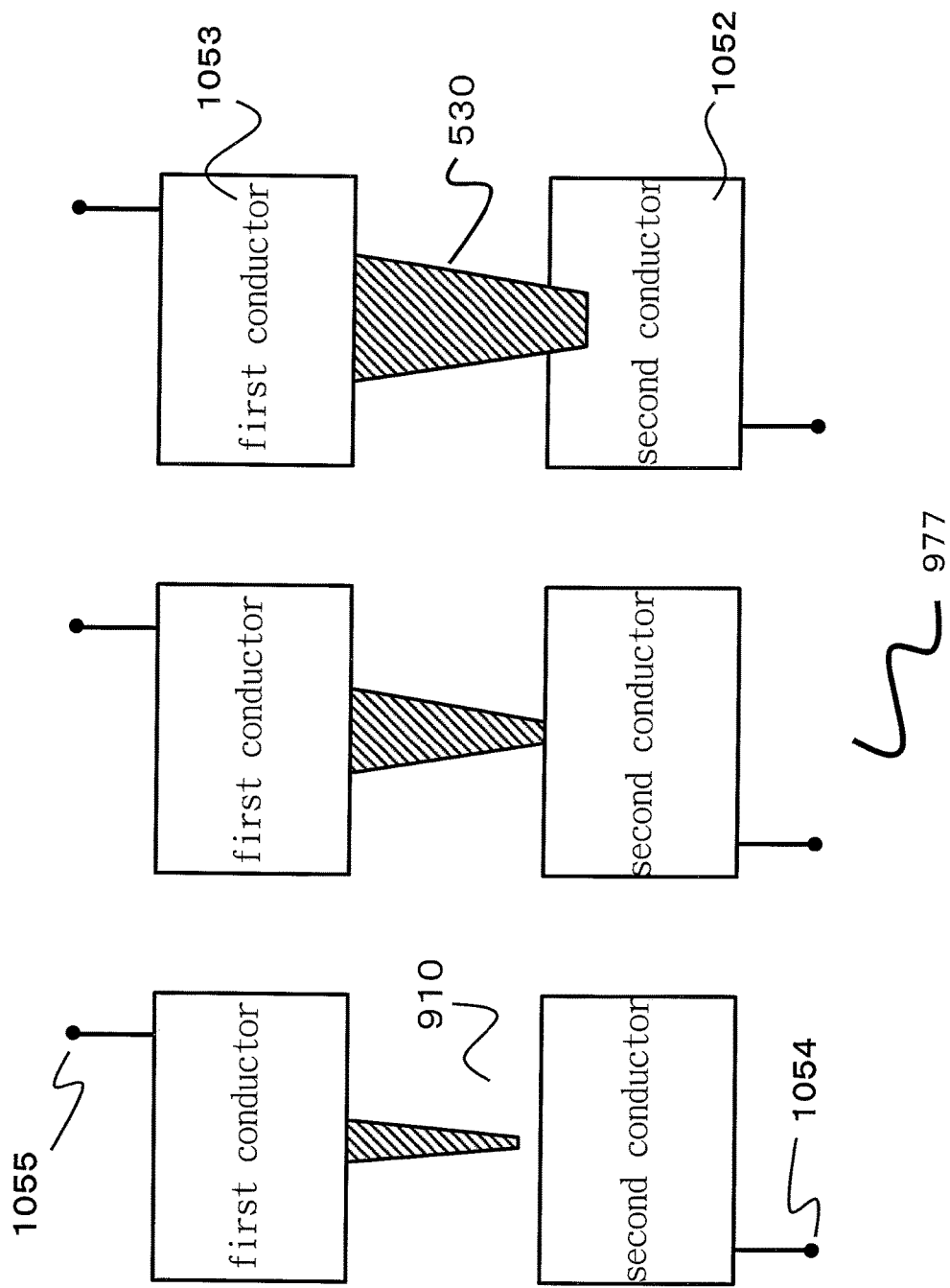
FIG. 60 is a diagrammatic view of a source of physical randomness.

The structure shown in FIG. 52 may be formed, for example, by opening a via from the first conductor 1053 through the insulating film 910, and then filling the via with a conductive material. As an example here, let us consider the situation that via manufacturing process is adjusted to make the target depth of via equal to the distance between the first conductor 1053 and the second conductor 1052. The cell in the middle of FIG. 60 shows that the via may perfectly fit between the first conductor 1053 and the second conductor 1052 if the depth of via is matched to the target depth by chance.

Figure 61:
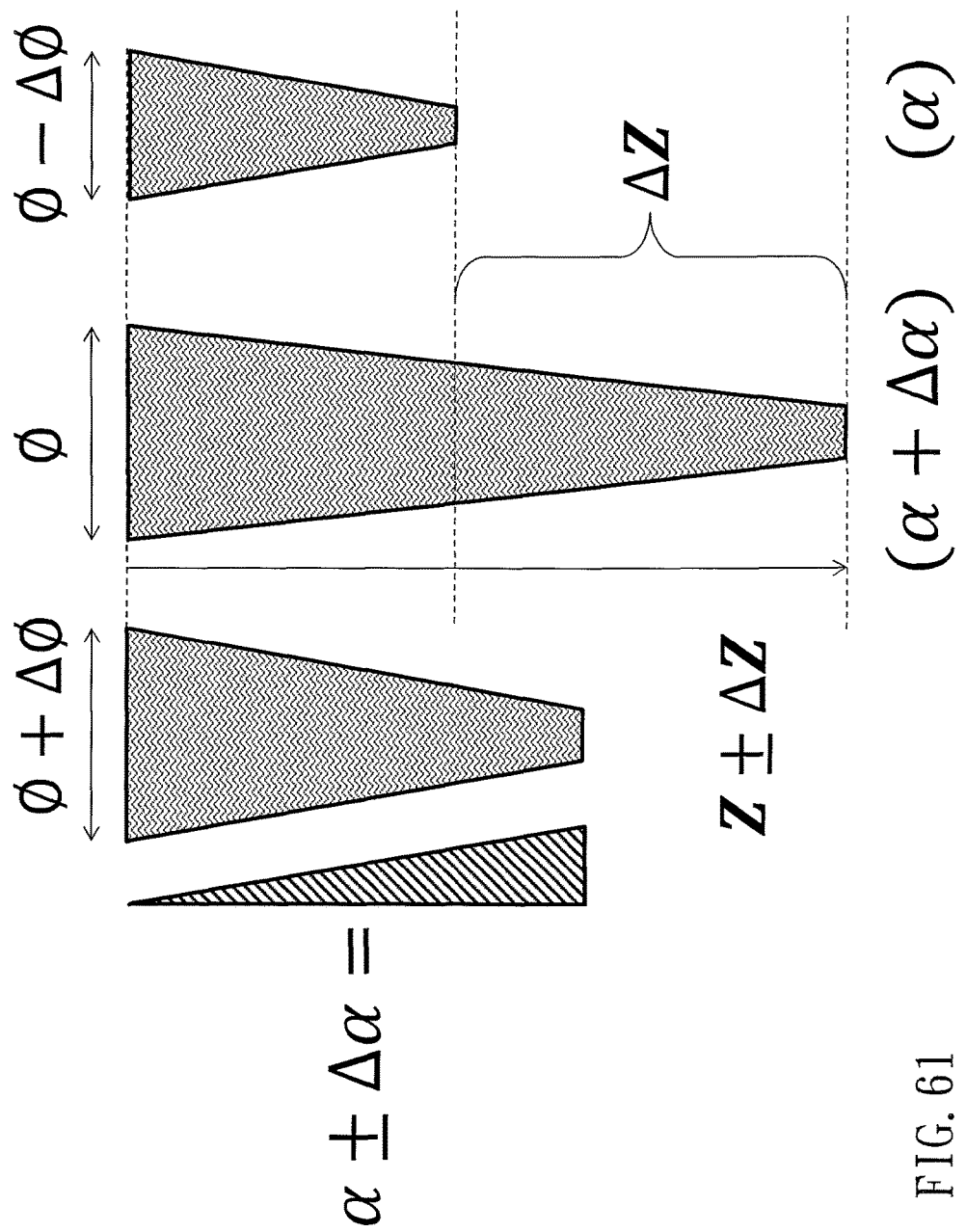
FIG. 61 is a diagrammatic view of the source of the physical randomness.

However, generally speaking, since the aspect ratio or the diameter of the via may vary in manufacturing, the depth of the via may also vary, as shown in FIG. 61. Thus, a via may be shorted (disconnected) in a cell, and another may be connected. For example, the examples in FIG. 60 may be shorted, connected, and connected, from the left.

In the case that the via of the identification cell 977 selected by the word line 503 and the bit line 902 is shorted, no current may flow through the via, which may correspond to the "0" state in terms of the semiconductor memory cell. In contrast, the current may flow if not shorted, which may correspond to the "1" state in terms of the semiconductor memory. Regarding "0" as white and "1" as black, the random white and black pattern as shown in FIG. 22 may be obtained.

Here, the fluctuation of via depth may result from the manufacturing variance of mass production process, and may thus have no relation with any algorithm. Accordingly, it may be viewed as physical fluctuation. Moreover, applying the electric stress may not be required in order to obtain the white and black random checker pattern as shown in FIG. 22.

However, after the metal vias are manufactured, the ratios of shorted and non-shorted states may be measured, and then the ratios may be recovered by applying the electric stress if they differ greatly from the desired value. For example, if the cell is shorted (such as the cell on the left in FIG. 60), the insulating film between the bottom of the via and the second conductor 1052 (a portion of the insulating film 910) may be broken while the electric stresses are repeatedly applied. As a result, the cell may be transited from shorted state to non-shorted state. In contrast, if the cell is non-shorted, (such as the cell in the middle of FIG. 60), the electromigration may occur while the electric stresses are repeatedly applied. As a result, the cell may be transited from non-shorted state to shorted state.

However, it may be difficult to artificially make either the insulating breakdown or the electromigration prevail. Thus, if data of "1" is the majority, only cells of "1" may be selected and stress may be applied thereto. In contrast, if data of "0" is the majority, only cells of "0" may be selected and stress may be applied thereto. Accordingly, it may be preferred to inspect the ratios of "1"s and "0"s and then repeatedly apply stress, until the ratios of "1"s and "0"s reach the desired value. Here, stress pulses may be repeatedly applied to each selected cell groups as shown in FIG. 40.

To practically read, the address of the cell to be read may have to be selected first. As shown in FIG. 23, the row of the cell to be read may be selected by the row decoder 972, and the column of the cell to be read may be selected by the column decoder 973. The row decoder 972 and the column decoder 973 are connected to PIN 971. The combination of the row number of the selected cell and the column number of the selected cell may be the address. In the example shown in FIG. 39, the addresses may be represented in binary. Thus, the read voltage may be applied between the word line 503 and the bit line 902 which connect to the cell corresponding to the selected address, by using the method illustrated in FIG. 51. Thus, the data ("1" or "0") at the corresponding address may be read. After reading, the address of the cell to be selected may be changed, and then the process may be repeated until the data of all of the cells in the cell array shown in FIG. 23 has been read.

The Fourteenth Embodiment

Figure 62:
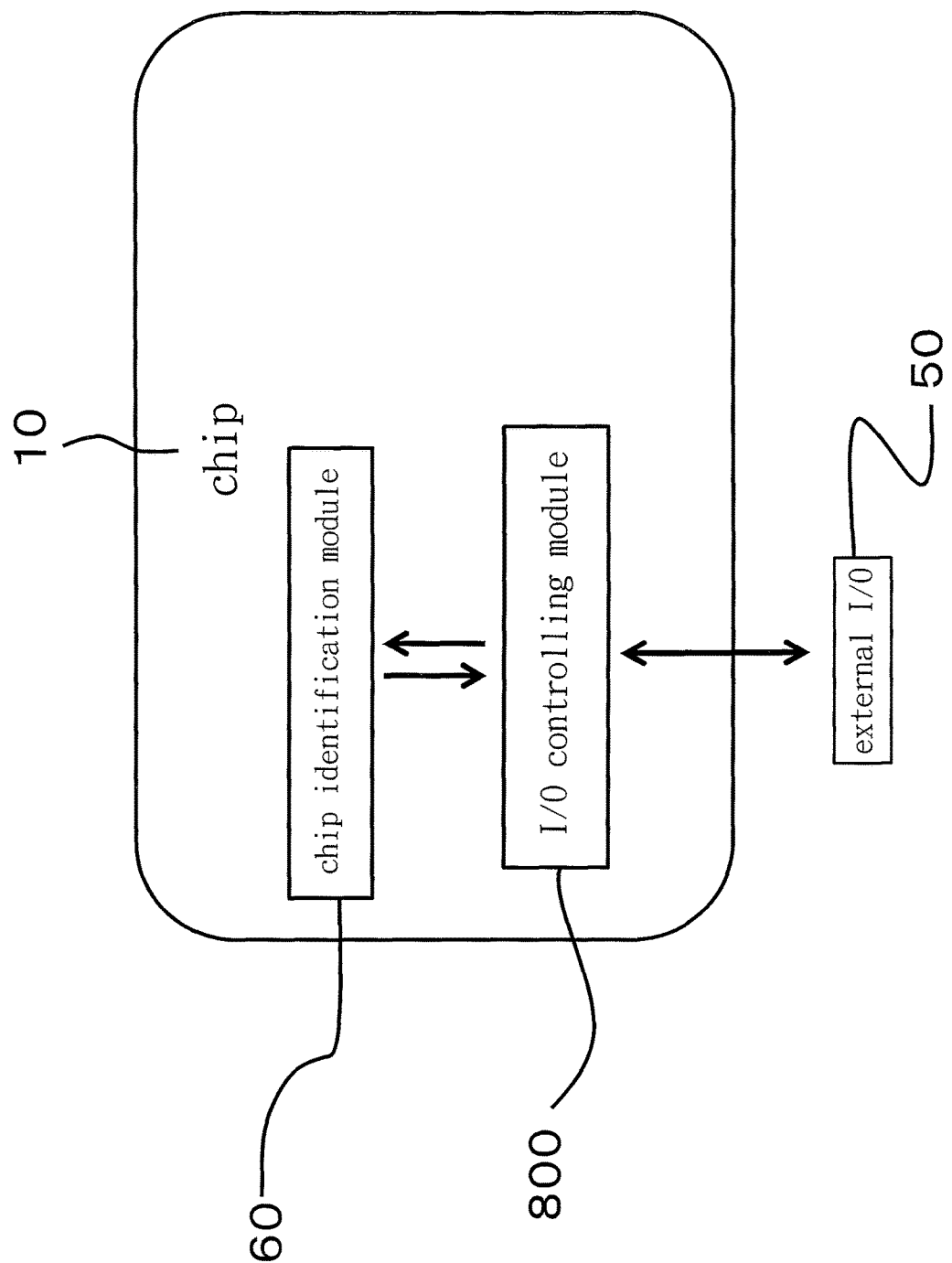
FIG. 62 is a diagrammatic view of a semiconductor chip comprising the chip identification device.

FIG. 62 shows an example of the chip identification device of the disclosure. The chip 10 may be equipped with at least the chip identification module 60 and an I/O controlling module 800. The I/O controlling module 800 may comprise an I/O controlling circuit, a word line controlling circuit, a bit line controlling circuit, a data I/O buffer, etc.

The Fifteenth Embodiment

Figure 63:
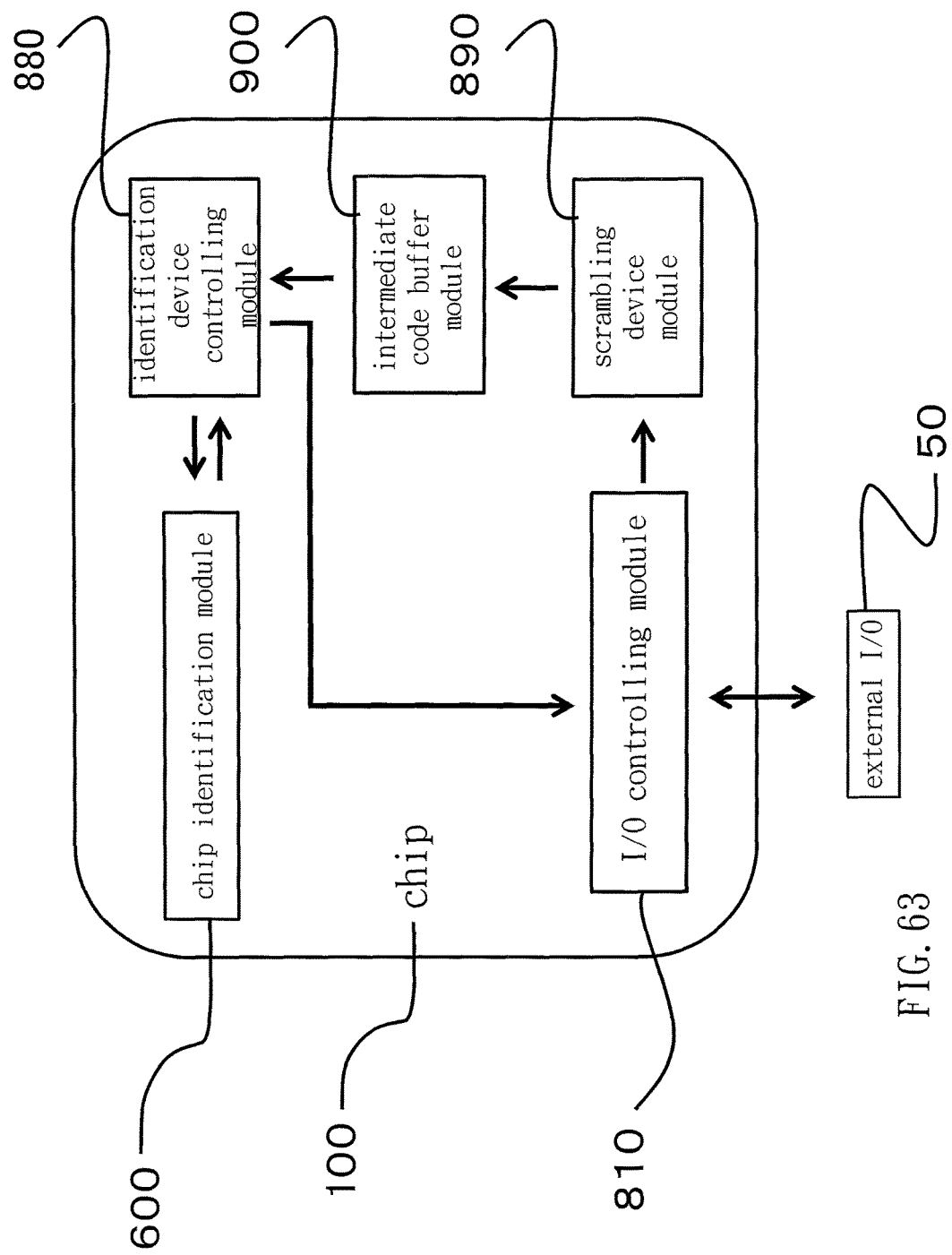
FIG. 63 is a diagrammatic view of a semiconductor chip comprising the scrambling device and the chip identification device.

FIG. 63 shows an example of the chip identification device of the disclosure. A chip 100 may be equipped with at least the chip identification module 600, an identification device controlling module 880, an I/O controlling module 810, a scrambling device module 890, and an intermediate code buffer module 900. The I/O controlling module 810 may comprise an I/O controlling circuit and a data I/O buffer. However, the I/O controlling module 810 may be different from the I/O controlling module 800 in the fourteenth embodiment because it does not have the word line controlling circuit and the bit line controlling circuit. The scrambling device module 890 may comprise the scrambling device 604 in FIG. 28. The intermediate codes generated by the scrambling device 604 may be stored in the intermediate code buffer module 900, which may be independent from the I/O controlling module 810. The data may not be output to the external of the chip 100, even though it is requested from the external. The purpose is to hide the intermediate codes in the chip. The identification device controlling module 880 may comprise the word line controlling circuit, the bit line controlling circuit, and the data buffer.

If the input codes $\{a(i), b(j)\}$ is input from the external I/O device 50, the I/O controlling module 810 may transfer the input codes $\{a(i), b(j)\}$ to the scrambling device module 890. Here, the intermediate codes $\{a(i), f(j)\}$ generated based on Formula 2, or the intermediate output codes $\{f(j)\}$ may be temporarily stored in the intermediate code buffer module 900, and may then be transferred to the identification device controlling module 880. The identification device controlling module 880 may use the internal word line controlling circuit, the bit line controlling circuit, and the data buffer to read the output codes $\{c(i, j)\}$ from the chip identification module 600, based on Formula 3 with regard to the intermediate codes $\{a(i), f(j)\}$ and may then store the output codes $\{c(i, j)\}$ in the inner data buffer temporarily. The identification device controlling module 880 may retrieve the output codes $\{c(i, j)\}$ from the inner data buffer, and then transfer the output codes $\{c(i, j)\}$ to the I/O controlling module 810. The I/O controlling module 810 may output the output codes $\{c(i, j)\}$ to the external of the chip 400 via the external I/O device 50. Thus, the intermediate output codes $\{f(j)\}$ may be hidden in the chip.

The Sixteenth Embodiment

Generally speaking, the chip constituting an electronic appliances may be more than one. It may be regarded that the first, the second, . . . , and the fifth peripheral devices composing an example of a network as shown in FIG. 14 may also comprise at least one chip. For example, in FIG. 64, a peripheral device 140 may comprise a first chip 110, a second chip 120, . . . , and a Nth chip 130. Among them, it may not be necessary that all of the chips have to be equipped with the chip identification device. In the example shown in FIG. 64, only the first chip 110 may be equipped with the chip identification module 60 and the modules related to the chip identification as illustrated in FIG. 62 and FIG. 63.

The Seventeenth Embodiment

As described above, the ratios of "0"s and "1"s may preferably be at approximately 50%, respectively. This may be required in order to maximize the entropy of the physical randomness according to the consideration of Shannon's entropy.

The adjustment of the ratios of "0"s and "1"s may be made, to some amount, by applying the electric stress. For example, the error may be preferred to be within a 10% range with the target being 50%. However, the disclosure may also be applicable even though the error cannot be reduced to less than 10%. In this event, in order to increase the entropy of the physical randomness, the number of the elements may be increased. That is, the number of the identification cells composing the chip identification device may be increased. The target ratio of 50% (±10% error) may be required to reduce the area of the chip identification device, whereas it may not be a necessary condition. As described above, N=K=128 may be big enough.

According to the method described above, the entropy of the physical randomness may be maximized in silicon die unit, in wafer unit, in lot unit, in production line unit, and in factory unit.

In the case of maximizing the entropy in the silicon die unit, the data of the plurality of identification cells in the chip identification device may be read, and then the ratios of "0"s and "1" may be tuned to be about 50% by applying the electric stress as described above. It is noted here that it may not be required to inspect all of the identification cells.

In the case of maximizing the entropy in the wafer unit, the data of the plurality of identification cells across the plurality of chips in the wafer may be read, and then the ratios of "0"s and "1" may be tuned to be about 50% by applying the electric stress as described above. It is noted here that it may not be required to inspect all of the identification cells.

In the case of maximizing the entropy in the lot unit, the data of the plurality of identification cells across the plurality of wafers and the plurality of chips in the lot may be read, and then the ratios of "0"s and "1" may be tuned to be about 50% by applying the electric stress as described above. It is noted here that it may not be required to inspect all of the identification cells.

In the case of maximizing the entropy in the production line unit, the data of the plurality of identification cells across the plurality of lots, the plurality of wafers, and the plurality of chips in the production line may be read, and then the ratios of "0"s and "1" may be tuned to be about 50% by applying the electric stress as described above. It is noted here that it may not be required to inspect all of the identification cells.

In the case of maximizing the entropy in the factory unit, the data of the plurality of identification units across the plurality of production lines, the plurality of lots, the plurality of wafers, and the plurality of chips in the factory may be read, and then the ratios of "0"s and "1" may be tuned to be about 50% by applying the electric stress as described above. It is noted here that it may not be required to inspect all of the identification cells.

As described above, the sampling units of the identification cells may be coordinated through the production management with the chip, the wafer, the lot, the production line, and the factory, in order to expand the sampling easily. The expansion may be executed by segmenting the manufacturing period of a specific production line, or by segmenting the manufacturing period of a specific factory. It is noted here that it may not be required to inspect all of the identification cells.

The Eighteenth Embodiment

The physical randomness may come from a plurality of sources. However, the sources in a single identification cell may be connected in series each other, whereas the sources across different identification cells may be connected in parallel each other.

Accordingly, if there are two sources in a single identification cell, the identification cell may be non-conductive while at least one of those sources is non-conductive. Otherwise (both of the sources are conductive), the identification cell may be conductive. That is, from the point of view of logic circuit, the sources involved in an identification cell may satisfy the requirement of logic NOR.

The Nineteenth Embodiment

Figure 65:
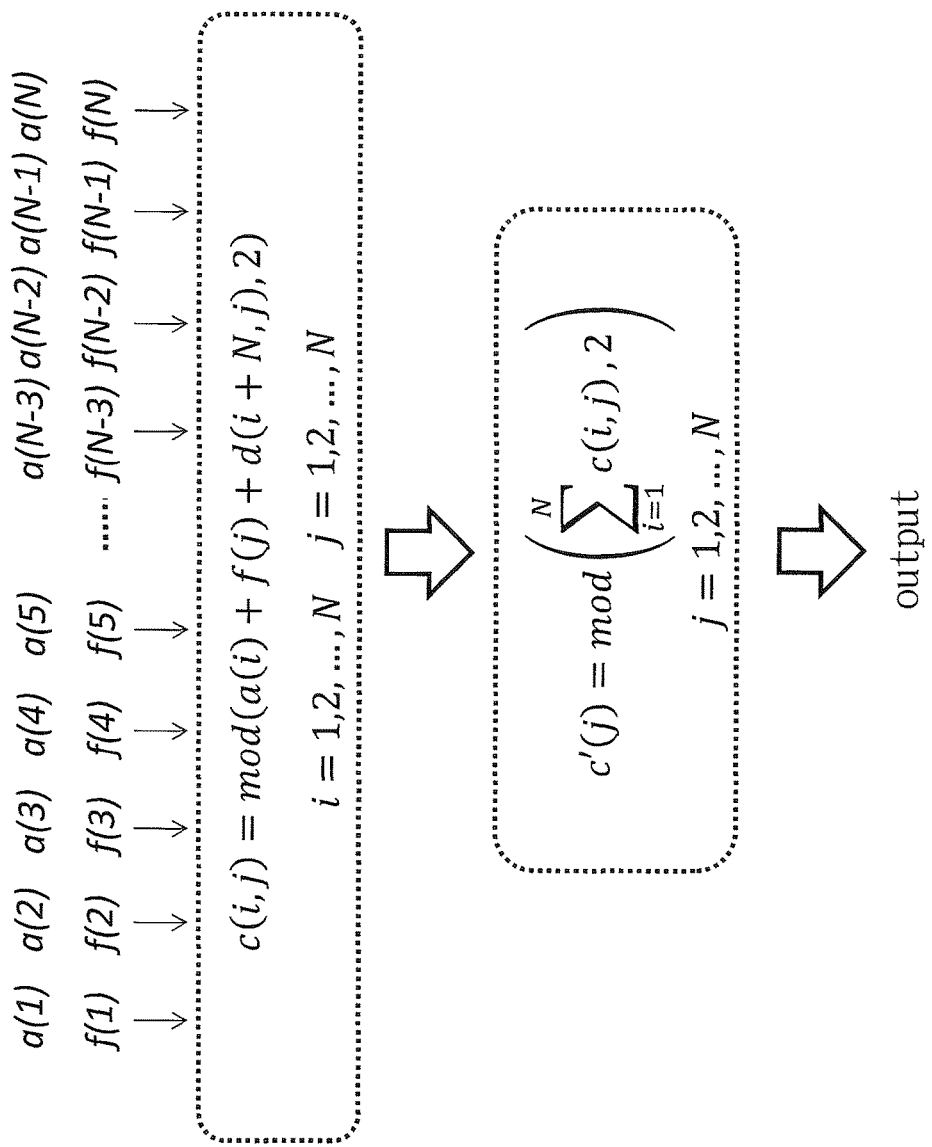
FIG. 65 is a diagrammatic view of processing the output codes.

In the example shown in FIG. 34, the input codes have N figures, and the corresponding output codes have N square figures. It may be easy to make the figures of the input codes and the output codes the same. For example, the output {c(i, j)} may be converted to a new output {c'(j)} using Formula 4 below.

$$c'(j) = \mod(\Sigma_{i=1}^{N} c(i,j), 2)$$  Formula 4

Where j is a natural number from 1 to N. FIG. 65 shows the new output {c'(j)} converted according to Formula 4. This procedure may be omitted in the cases that the figures of the input codes and the output codes are not required to be the same.

The Twentieth Embodiment

The conductive thin wires in FIG. 53, FIG. 54, FIG. 56, and FIG. 57 may have already been short or may have abnormally high resistance before the procedure to break those thin wires by the electrical pulse, due to the conditions of the manufacturing and the processing. The state of short or abnormally high resistance may be deemed as the "0" state in terms of the semiconductor memory. It may happen by chance according to the conditions of the manufacturing and the processing, and may reflect the physical randomness. In this event, it may be unnecessary to apply electric pulse to obtain the physical randomness. Moreover, FIG. 53 merely provides an example of the embodiment, and the conductor 930 may not be required to be bent into rectangular.

In the series of the embodiments provided above, the designation of the address of the identification cell 977 may be conducted by connecting the word line 503 and the bit line 902 to the two terminals of the identification cell, respectively. The voltage applied to the identification cell 977 may be applied between the selected word line 503 and the bit line 902. The current flowing through the identification cell 977 may flow through the selected word line 503 and the bit line 902, respectively.

The Twenty-First Embodiment

Figure 66:
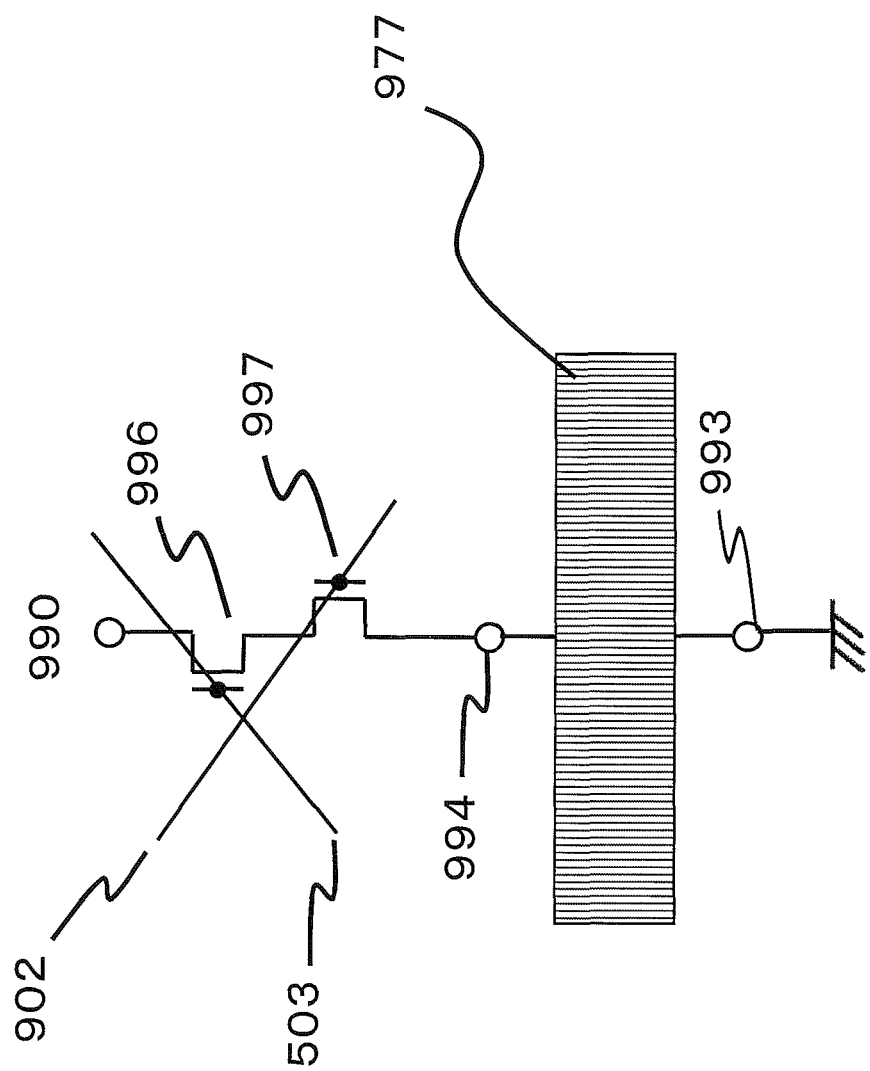
FIG. 66 is a diagrammatic view of the wiring for designating the identification unit.

As another example of the address, FIG. 66 shows that the identification cell 977 may comprise at least a first terminal 994 and a second terminal 993. The first terminal 994 may be connected to a control gate 990 through a second control gate 997 of the bit line 902 and a first control gate 996 of the word line 503. The designation of the address may be executed by selecting the bit line 902 and the word line 503. The second terminal 993 may be grounded. The read voltage or the stress voltage for breaking the cell may be applied to the control gate 990. Accordingly, the read voltage and the stress voltage for breaking cells may be applied to only the cells at the selected addresses. As an example of the stress voltage, FIG. 40 shows that the current may flow through the control gate 990, which is selected by the word line 503 and the bit line 902, if the corresponding cell is in the conductive state.

The Twenty-Second Embodiment

In recent years, the inappropriate disposal of waste electronic home appliances has become a global issue. (For example, Non-Patent Literature 3: http://www6.nhk.or.jp/wdoc/backnumber/detail/?pid=150624). According to the report, even in Europe, where the recycling system is administered regularly, two-thirds of the waste electronic home appliances have been illegally processed in Asia or Africa through inappropriate routes. Especially in China, IC chips forcibly torn off from circuit boards are sold in the market again as cheap brand new products after the labels on the packaging are replaced. Those chips are shipped and exported to advanced countries in which those chips were disposed illegally. The IC chips damaged physically and thermally when they are torn off from the boards may become malfunctioned. This may cause the malfunctions or the failures of a plenty of the electronic appliances. The application of a portion of the IC chips may not be limited to electronic home appliances. Specifically, such as DRAMs or flash memories, the products of general purpose ICs may have various uses. If a counterfeit chip is used as a component in, such as, the control system of a high speed train or an aircraft, it may cause a disaster and thus must be paid attention to.

Figure 67:
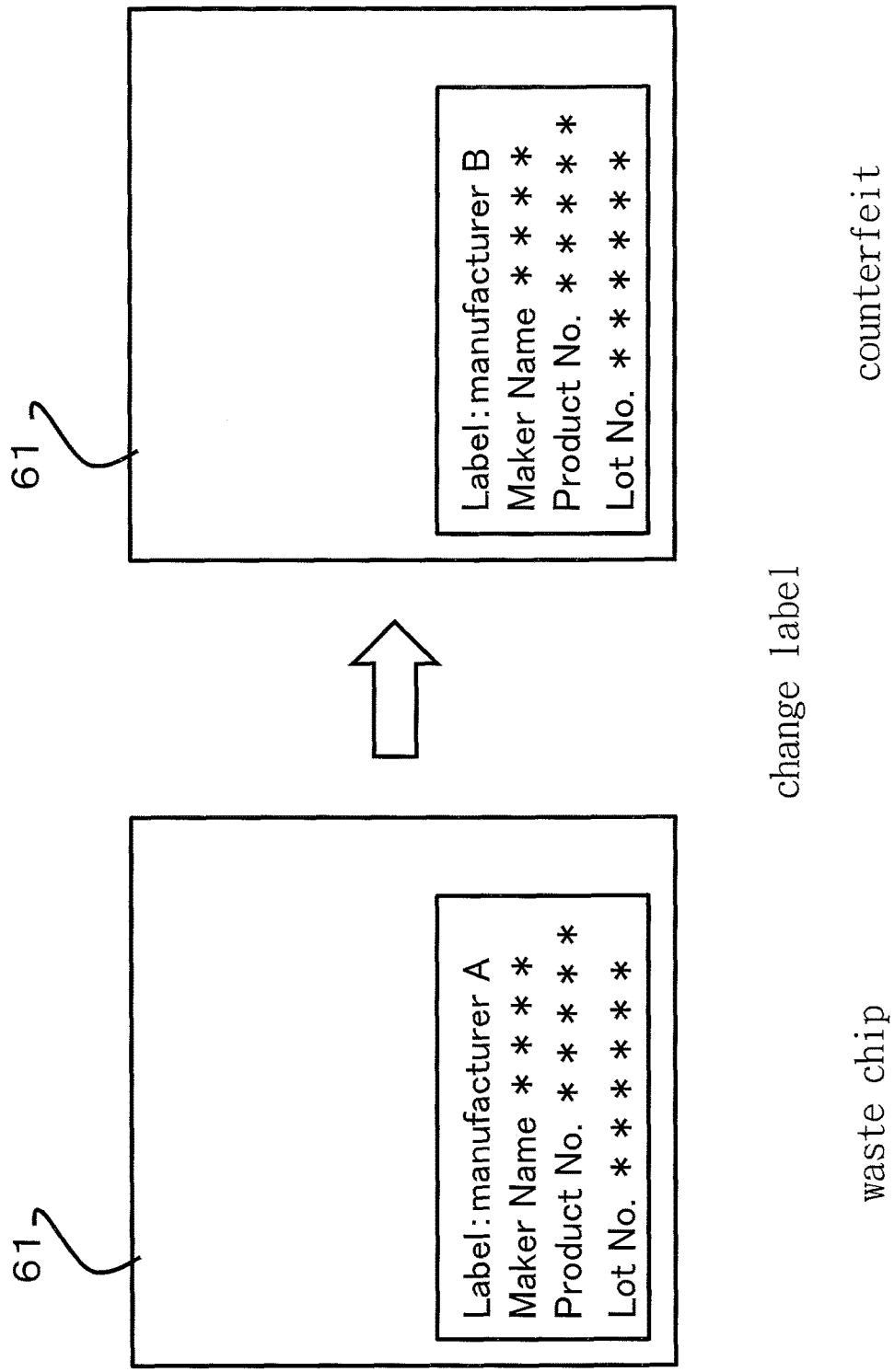
FIG. 67 is a diagrammatic view of the method of producing a counterfeit chip.

FIG. 67 is a schematic drawing to show the trick of producing a counterfeit chip. For example, the circuit board of the waste electronic home appliance may comprise the general purpose memory chip of the manufacturer A. The chip may be forcibly torn off from the board; and then may be labeled with a label of the manufacturer B; and then may be sold or exported as a brand new chip of the manufacturer B at a low price. Of course, this is a counterfeit. It is a pity that there is no way to eliminate such a kind of illegal recycling immediately. An effective measure may be a quick inspection on-site at an assembly plant to determine whether or not the purchased IC chip product is counterfeit. Fortunately, the chip identification device of the disclosure may attach the identification to the IC circuit in the chip.

Figure 68:
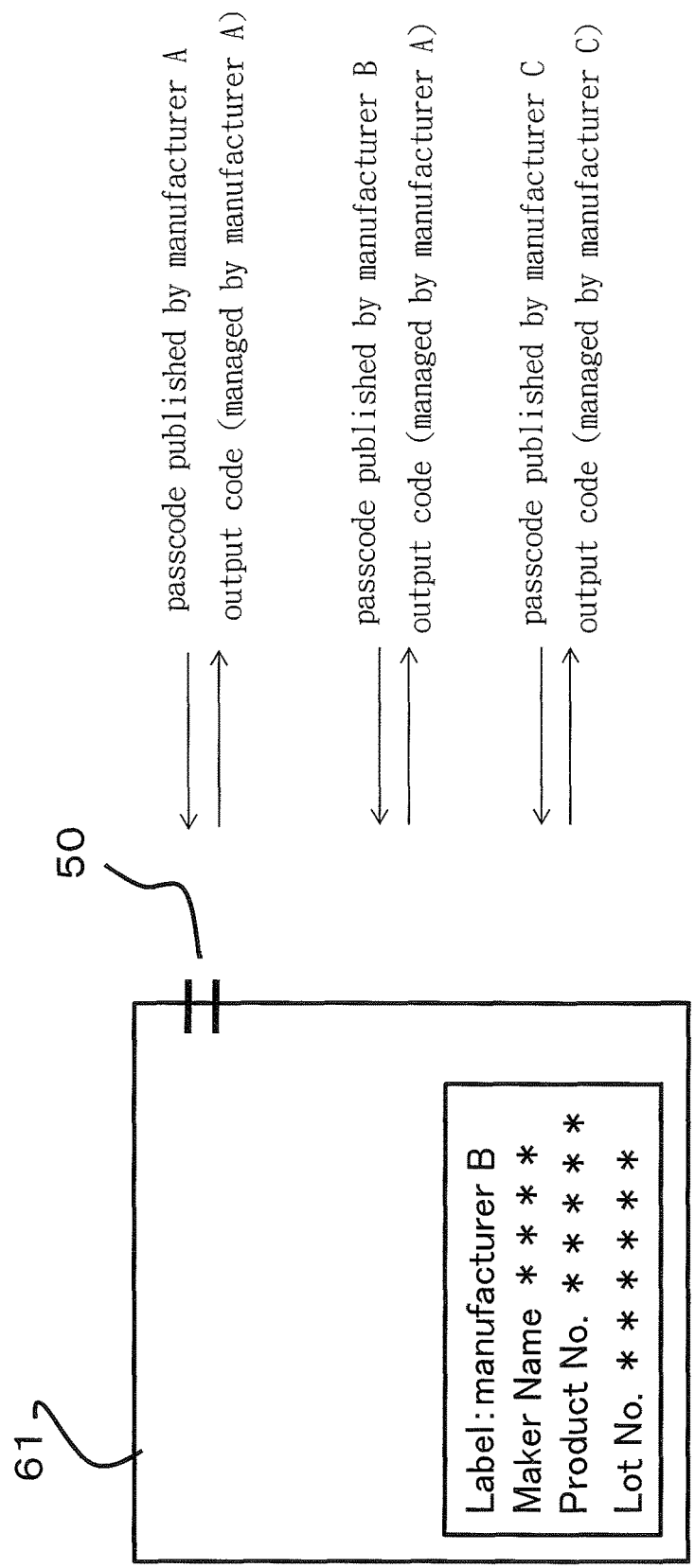
FIG. 68 is a diagrammatic view of the method of preventing chip counterfeiting.

FIG. 68 illustrates the method of counterfeit inspection. Here, each manufacturer may publish a passcode for determining counterfeit. A purchasing manager of the assembly plant may input the published passcodes of each chip manufacturer to the purchased chips; read the output codes of each chip; and then ask the chip manufacturers whether the output codes are correct. To simplify the illustration here, it may be assumed that all of the manufactures reply to the inquiry. If the inspected chip is a counterfeit chip, as shown in FIG. 67, the manufacturer A and the manufacture B may both reply that the chip is their product. Accordingly, two or more manufacturers tell the inspected chip to be their products, the inspected chip may be determined as a counterfeit chip. Moreover, if the manufacturer A tells the inspected chip is its product even while the inspected chip is labeled with the label of the manufacturer B, the inspected chip may be determined as a counterfeit chip. A chip claimed by the manufacturer C to be its product may also be determined as a counterfeit chip if the chip is labelled with the label of the manufacturer B. In any case, the purchasing manager of the assembly plant may find that the manufacturer B is the one selling counterfeit chips. In the case that only the manufacturer B claims the inspected chip to be its product, the inspected chip may be the product of the manufacture B and not the counterfeit chip, as shown in FIG. 67.

Besides the name of the manufacturer, other information such as product number and lot number may also be shown on the label. Even though the name of the manufacturer shown on the label matches with the name of the manufacturer determined by the output code, the product number or the lot number on the label may be mismatched. This may imply the internal inappropriate counterfeiting of the manufacturer or the careless product management of the manufacturer.

Let us summarize the conditions of the counterfeit determination as mentioned above. The chip may be determined as a counterfeit chip if the name of the manufacturer shown on the label and the name of the manufacturer determined by the output code do not match. In the case that the name of the manufacturer shown on the label and the name of the manufacturer determined by the output code match, further compare other information shown on the label (such as, product number, lot number, manufacturing date, etc.) with regard to the corresponding output code. The chip may be determined as non-counterfeit if the results match here. If the results do not match, it may be determined that the manufacturer has conducted internal counterfeiting or the manufacturer has carelessly managed the products.

In the above embodiments, the MOSFET used for the illustration may be a MOS-type transistor. As an example, it may comprise two spatially separated second conduction type diffusion layers formed on a first conduction type semiconductor substrate, a gate insulating film on the first conduction type semiconductor substrate, a gate terminal connected to a gate electrode on the gate insulating film, a source terminal connected to one of the second conduction type diffusion layers, and a drain terminal connected to another one of the second conduction type diffusion layers. Moreover, the first conduction type semiconductor, the gate insulating film, and the gate electrode may compose a MOS capacitor.

In the above embodiments, the nonvolatile memory transistor used for the illustration may, for example, comprise two spatially separated second conduction type diffusion layers formed on a first conduction type semiconductor substrate, a tunnel film on the first conduction type semiconductor substrate, an electric charge storage layer on the tunnel film, an interlayer insulating film on the electric charge storage layer, and a control gate on the interlayer insulating film. In the NOR-type array of the cell transistors, either of the two second conduction type diffusion layers may be connected to the bit lines at each cell. On the other hand, in the NAND-type array of the cell transistors, each of the two second conduction type diffusion layers may be shared with an adjacent cell transistor, and may form the connection in series on the substrate. Either of the diffusion layers left on the two sides of the plurality of the cell transistors in series may be connected to a bit line via a selecting gate on the drain side. The other of the diffusion layers left on the two sides of the plurality of the cell transistors in series may be connected to a source line via a selecting gate on the source side. Moreover, in the NAND-type array of the cell transistors, the second conduction type diffusion layers disposed between the adjacent cell transistors may be replaced with dilute first conduction type diffusion layers, or may be omitted.

In the above embodiments, the PN junction used for the illustration may be formed by contacting a first conduction type semiconductor to a second conduction type semiconductor. For example, after forming a second conduction type diffusion layer on the surface of a first conduction type semiconductor substrate, the PN junction may be formed spontaneously on the interface between the second conduction type diffusion layer and the first conduction type semiconductor substrate. Accordingly, the PN junction may be spontaneously formed in the MOS transistor or the nonvolatile memory transistor.

In the above embodiments, the Schottky junction used for the illustration may be formed by contacting a semiconductor to a conductor. Both of PN junction and Schottky junction may belong to diode junction.

As mentioned above, the first conduction type semiconductor substrate used for illustrating the MOS transistor, the nonvolatile memory transistor, and the PN junction of may be replaced with a first conduction type diffusion layer (generally speaking, well) formed in a wide area of the first and the second conduction type semiconductor substrates.

The identification cells may be the semiconductor cells manufactured in chips which are mass-produced in the front-end-process of the semiconductor manufacturing.

According to the present disclosure, a network of electronic appliances may be decomposed into peripheral devices and stem servers managing the registration status of the peripheral devices. The stem servers may be under central control, whereas the peripheral devices out of central control may be equipped with semiconductor chips comprising physical chip identification devices formed in chips produced in the front-end-process of the semiconductor manufacturing. This may enforce the security of the entire system, so as to efficiently prevent the peripheral devices from being remote-attacked. Here, the network may be formed between any electronic appliances to be connected through the identification communication described above, regardless of being inside or outside of a certain system. Furthermore, the measure to the counterfeit chip problem may also be realized by the chip identification device of the same identification cells.

By utilizing chip identification generated based on physical randomness, the identification among network nodes in networks involving numberless peripheral devices out of central control may be securely realized in the chip level.

Furthermore, the technical field of the present disclosure is not limited to the above mentioned embodiments. Although the disclosure has been described in detail with reference to its presently preferable embodiments, it will be understood by one of ordinary skill in the art that various modifications can be made without departing from the spirit and the scope of the disclosure, as set forth in the appended claims. In particular, it may be effective to the business model like utilizing SIM cards of cell phones as peripheral devices in IoT/IoE.

What is claimed is:

1. A network unit of electronic appliances comprising:
a stem server;
a plurality of peripheral devices connected to the stem server;
wherein the stem server comprises at least one passcode and at least one list of a plurality of registration codes, wherein each list is associated to a respective one of the at least one passcode, wherein each of the plurality of registration codes of one list associating to one passcode corresponds to a respective one of the plurality of peripheral devices connecting to the stem server, wherein the stem server sends the at least one passcode to each of the plurality of peripheral devices;
wherein each of the plurality of peripheral devices sends a respective output code thereof to the stem server in response to the at least one passcode sent by the stem server, wherein each of the plurality of peripheral devices comprises a plurality of components including at least one chip comprising a chip identification device, wherein the chip identification devices of the plurality of peripheral devices are different from each other;
wherein the passcode is converted to an input code in each of the plurality of peripheral devices;
wherein the input code is built in the at least one chip of the chip identification device and is a data aggregate of electrical signals assigned by a plurality of word lines and a plurality of bit lines;
wherein an address assigned on the chip is defined by one or more groups of a plurality of word lines and one or more groups of a plurality of bit lines, wherein each group of the plurality of word lines is assigned with a number different from each other, and each group of the plurality of bit lines is assigned with a number different from each other, wherein a row number of the address is defined by the number of either one of the one or more groups of the plurality of word lines or the one or more groups of the plurality of bit lines disposed in a wiring layout on the chip, and a column number of the address is defined by the number of the other one of the one or more groups of the plurality of word lines and the one or more groups of the plurality of bit lines disposed in the wiring layout on the chip;
wherein the chip identification device comprises a plurality of identification cells disposed in a cell region comprising the one or more groups of the plurality of word lines and the one or more groups of the plurality of bit lines, wherein the cell region comprises a first random number generator comprising a portion of the plurality of identification cells disposed at the addresses defined by a first group of rows and a first group of columns;
wherein the plurality of identification cells is semiconductor cells made simultaneously within the at least one chip in a same manufacturing process;
wherein each of the plurality of identification cells electrically outputs at least a first value and a second value in response to an electrical input applied to the one or more groups of the plurality of word lines and the one or more groups of the plurality of bit lines disposed in the wiring layout on the chip;
wherein the first random number generator generates a first random code which is an aggregate of electronic data electrically output by the portion of the plurality of identification cells disposed at the addresses defined by the first group of rows and the first group of columns;
wherein the output code is an aggregate of electronic signals output generated by combining the input code with the first random code in a specified manner;
wherein the plurality of registration codes is electronic data stored in the stem server by registering the plurality of output codes in advance; and
wherein the stem server compares each of the plurality of output codes with a respective one of the at least one list of the plurality of registration codes, and evaluates the validity of a respective one of the plurality of peripheral devices.

2. The network unit of electronic appliances as claimed in claim 1, wherein the at least one passcode is expanded into elements in binary, and the elements are divided into a first input arrangement and a second input arrangement, wherein each of the elements of the first input arrangement is assigned to a corresponding row of the first random number generator, and each of the elements of the second input arrangement is assigned to a corresponding column of the first random number generator, wherein a sum of a number of rows and a number of columns of the first random number generator is larger than or equal to a sum of a number of the elements of the first input arrangement and a number of the elements of the second input arrangement.

3. The network unit of electronic appliances as claimed in claim 1, wherein the chip identification device comprises a second random number generator, and the second random number generator generates a second random code which is an aggregate of electronic data electrically output by a plurality of identification cells disposed at the addresses defined by a second group of rows and the first group of columns.

4. The network unit of electronic appliances as claimed in claim 3, wherein the second random number generator further comprises a scrambling device, wherein the scrambling device adds up the electrically output data of the identification cells along a direction of a selected row, and divides the added-up data by two to obtain a first remainder, wherein the elements of the first input arrangement and the second input arrangement, which have numbers corresponding to a number of the selected column, are also added-up and divided by two to obtain a second remainder, wherein the first and second remainders are added, wherein a sum of the first and second remainders is arranged in response to the number of the column, and is output as an intermediate output.

5. The network unit of electronic appliances as claimed in claim 4, wherein each of the plurality of peripheral devices further comprises an intermediate code buffer module, wherein the intermediate code buffer module temporarily stores the intermediate output during an identification process of each of the plurality of peripheral devices.

6. The network unit of electronic appliances as claimed in claim 4, wherein each of the plurality of peripheral devices further comprises a first code generator, wherein the first code generator either adds up the elements of the first input arrangement and the second input arrangement to acquire a sum, or adds up elements of the intermediate output and elements of the first random code at each of addresses designated by each of a plurality of selected bit lines selected from the plurality of bit lines and each of a plurality of selected word lines selected from the plurality of word lines to acquire the sum, wherein the sum is divided by two to a obtain a third remainder, and wherein the third remainder is output at each of the addresses to generate the output code.

7. The network unit of electronic appliances as claimed in claim 1, wherein each of the plurality of identification cells comprises at least two terminals, and is probabilistically broken by applying a pulse voltage at least one time between the at least two terminals, wherein if an electric current flowing between the at least two terminals in response to a predetermined read voltage input between the at least two terminals has an absolute value larger than a value of a first threshold current, then the first value is regarded as being output, or if the electric current has an absolute value smaller than a value of a second threshold current, then the second value is regarded as being output, wherein the value of the first threshold current is larger than the value of the second threshold current, wherein if the electric current has a value larger than the value of the second threshold value and smaller than the value of the first threshold value, then a third value is regarded as being output, wherein the chip identification device comprises the plurality of identification cells outputting the first and the second values.

8. The network unit of electronic appliances as claimed in claim 7, wherein if a ratio of the plurality of identification cells in a first state outputting the first value is smaller than a ratio of the plurality of identification cells in a second state outputting the second value, then a part of or all of the plurality of identification cells in the second state is selected and applied with an electrical stress.

9. The network unit of electronic appliances as claimed in claim 7, wherein if the ratio of the plurality of identification cells in the first state is higher than the ratio of the plurality of identification cells in the second state, then a part of or all of the plurality of identification cells in the first state is selected and applied with an electrical stress.

10. The network unit of electronic appliances as claimed in claim 7, wherein the identification cell comprises a capacitor made simultaneously within the chip in a same manufacturing process, wherein the capacitor comprises a first terminal, a second terminal, and an insulating or dielectric film sandwiched between the first and second terminals, wherein the first terminal connects to one of the one or more groups of the plurality of word lines, and the second terminal connects to one of the one or more groups of the plurality of bit lines, wherein the insulating or dielectric film is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

11. The network unit of electronic appliances as claimed in claim 7, wherein the identification cell comprises a diode junction made simultaneously within the chip in a same manufacturing process, wherein the diode junction comprises a first end and a second end, wherein the first end connects to one of the one or more groups of the plurality of word lines, and the second end connects to one of the one or more groups of the plurality of bit lines, wherein the diode is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

12. The network unit of electronic appliances as claimed in claim 7, wherein the identification cell comprises a MOS transistor made simultaneously within the chip in a same manufacturing process, wherein the MOS transistor comprises at least a first terminal, a second terminal and a third terminal, wherein the first terminal connects to one of the one or more groups of the plurality of word lines, and the second terminal connects to one of the one or more groups of the plurality of bit lines, wherein the second and third terminals respectively connect to two spatially separated second conduction type diffusion layers formed on a surface of a first conduction type semiconductor substrate or on a surface of a first conduction type well, and the first terminal is disposed on a surface of a gate insulating film on surface of the first conduction type semiconductor substrate or the first conduction type well, wherein the gate insulating film is probabilistically broken by applying the pulse voltage to the word line, wherein the read voltage is applied to the word line, and then an electric current flowing through the word line or the bit line in response to the read voltage is compared with the values of the first and second threshold currents.

13. The network unit of electronic appliances as claimed in claim 7, wherein the identification cell comprises a MOS transistor and a capacitor made simultaneously within the chip in a same manufacturing process, wherein the capacitor comprises a first terminal, a second terminal and an insulating film sandwiched between the first and second terminals, wherein the MOS transistor comprises at least a third terminal, a fourth terminal, and a fifth terminal, wherein the third terminal connects to one of the one or more groups of the plurality of word lines, the fourth terminal connects to one of the one or more groups of the plurality of bit lines, and the fifth terminal connects to the first terminal, wherein the fourth and fifth terminals respectively connect to two spatially separated second conduction type diffusion layers formed on a surface of a first conduction type semiconductor substrate or on a surface of a first conduction type well, and the first terminal is disposed on a surface of a gate insulating film on the first conduction type semiconductor substrate or the first conduction type well, wherein the insulating film of the capacitor is probabilistically broken by applying the pulse voltage to the bit line during a period applying a pass voltage between the word line and the bit line to turn on the MOS transistor, wherein the read voltage is applied to the bit line during the period applying the pass voltage, and then an electric current flowing through the bit line in response to the read voltage is compared with the values of the first and second threshold currents.

14. The network unit of electronic appliances as claimed in claim 7, wherein the identification cell comprises a control transistor of a nonvolatile memory made simultaneously within the chip in a same manufacturing process, wherein the control transistor comprises at least a first terminal, a second terminal and a third terminal, wherein the first terminal connects to one of the one or more groups of the plurality of word lines, and the second terminal connects to one of the one or more groups of the plurality of bit lines, wherein the second and third terminals respectively connect to two spatially separated second conduction type diffusion layers formed on a surface of a first conduction type semiconductor substrate or on a surface of a first conduction type well, wherein a tunnel film, a charge storage layer, an interlayer insulating film and a control gate are laminated in order on the first conduction type semiconductor substrate or the first conduction type well, wherein the first terminal connects to the control gate, wherein the interlayer insulating film is partially or fully replaced with an interlayer conducting layer, wherein the tunnel film is probabilistically broken by applying the pulse voltage to the word line, wherein the read voltage is applied to the word line, and then an electric current flowing through the word line or the bit line in response to the read voltage is compared with the values of the first and second threshold currents.

15. The network unit of electronic appliances as claimed in claim 7, wherein the identification unit comprises a plurality of selecting transistors disposed on a chip having a plurality of nonvolatile memories, wherein the plurality of selecting transistors are made simultaneously with the chip in a same manufacturing process, wherein the plurality of selecting transistors is connected in series on a semiconductor substrate, and comprises at least a plurality of gate terminals and a bit line terminal, wherein each of the plurality of gate terminals connects to a respective one of the one or more groups of the plurality of word lines, and the bit line terminal connects to one of the one or more groups of the plurality of bit lines, wherein the selecting transistor comprises a tunnel film, a charge storage layer, an interlayer insulating film, and a control gate laminated in order on the semiconductor substrate, wherein the gate terminal is disposed on the control gate, wherein the interlayer insulating film is partially or fully replaced with an interlayer conducting layer, wherein the tunnel film is probabilistically broken by applying the pulse voltage to the word line, wherein the read voltage is applied to the word line, and then an electric current flowing through the word line or the bit line in response to the read voltage is compared with the values of the first and second threshold currents.

16. The network unit of electronic appliances as claimed in claim 7, wherein the identification cell comprises a fuse resistor made simultaneously within the chip in a same manufacturing process, wherein the fuse resistor comprises a first terminal, a second terminal, and a resistive material sandwiched between the first and second terminals, wherein the first terminal connects to one of the one or more groups of the plurality of word lines, and the second terminal connects to one of the one or more groups of the plurality of bit lines, wherein the resistive material is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

17. The network unit of electronic appliances as claimed in claim 7, wherein the identification cell comprises a first conductor region, a second conductor region, an insulating film sandwiched between the first and second conductor regions, and a conductor via formed by a hole forming step and a conductive material filling step, wherein the hole forming step comprises forming a hole penetrating the insulating film from the first conductor region to the second conductor region, and the conductive material filling step comprises filling the hole with a conductive material, wherein at least one of the first and second conductor regions connects to one of the one or more groups of the plurality of word lines and one of the one or more groups of the plurality of bit lines defining an address of the identification cell, wherein a manufacturing target value of a length of the conductor via is equal to a distance between the first and second conductor regions, wherein the length of the conductor via formed by the hole forming step and the conductive material filling step is probabilistically larger or smaller than the distance between the first and second conductor regions, then an electric property of the identification cell forming the chip identification device is physically random accordingly.

18. The network unit of electronic appliances as claimed in claim 7, wherein the identification cell comprises a first conductor region, a second conductor region, a conductive thin wire bridging the first and second conductor regions, and an insulating film sandwiched between the first and second conductor regions and covering the conductive thin wire, wherein at least one of the first and second conductor regions connects to one of the one or more groups of the plurality of word lines and one of the one or more groups of the plurality of bit lines, which defines an address of the identification cell, wherein the conductive thin wire is probabilistically broken in response to a manufacturing variance that comes from a manufacturing process of the conductive thin wire or from a manufacturing process of the insulating film which covers the conductive thin wire, in order to cause an electric property of the identification cells composing the chip identification device to be physically random.

19. A network of electronic appliances comprising:
a plurality of network units of electronic appliances comprising a first network unit and a plurality of second network units, wherein the first network unit is connected to at least one of the plurality of second network units in a topology;
wherein each of the plurality of network units comprises a stem server and a plurality of peripheral devices connected to the stem server;
wherein, in the first network unit, the stem server comprises at least one passcode and at least one list of a plurality of registration codes, wherein each list is associated to a respective one of the at least one passcode, wherein each of the plurality of registration codes of one list associating to one passcode corresponds to a respective one of the plurality of peripheral devices connecting to the stem server, wherein the stem server sends the at least one passcode to each of the plurality of peripheral devices;
wherein, in the first network unit, each of the plurality of peripheral devices sends a respective output code thereof to the stem server in response to the at least one passcode sent by the stem server, wherein each of the plurality of peripheral devices comprises a plurality of components including at least one chip comprising a chip identification device, wherein the chip identification devices of the plurality of peripheral devices are different from each other;
wherein, in the first network unit, the passcode is converted to an input code in each of the plurality of peripheral devices;
wherein, in the first network unit, the input code is built in the chip of the chip identification device and is a data aggregate of electrical signals assigned by a plurality of word lines and a plurality of bit lines;
wherein, in the first network unit, an address assigned on the chip is defined by one or more groups of a plurality of word lines and one or more groups of a plurality of bit lines, wherein each group of the plurality of word lines is assigned with a number different from each other, and each group of the plurality of bit lines is assigned with a number different from each other, wherein a row number of the address is defined by the number of either one of the one or more groups of the plurality of word lines or the one or more groups of the plurality of bit lines disposed in a wiring layout on the chip, and a column number of the address is defined by the number of the other one of the one or more groups of the plurality of word lines and the one or more groups of the plurality of bit lines disposed in the wiring layout on the chip;

wherein, in the first network unit, the chip identification device comprises a plurality of identification cells disposed in a cell region comprising the one or more groups of the plurality of word lines and the one or more groups of the plurality of bit lines, wherein the cell region comprises a first random number generator comprising a portion of the plurality of identification cells disposed at the addresses defined by a first group of rows and a first group of columns;

wherein, in the first network unit, the plurality of identification cells is semiconductor cells made simultaneously within the at least one chip in a same manufacturing process;

wherein, in the first network unit, each of the plurality of identification cells electrically outputs at least a first value and a second value in response to an electrical input applied to the one or more groups of the plurality of word lines and the one or more groups of the plurality of bit lines disposed in the wiring layout on the chip;

wherein, in the first network unit, the first random number generator generates a first random code which is an aggregate of electronic data electrically output by the portion of the plurality of identification cells disposed at the addresses defined by the first group of rows and the first group of columns;

wherein, in the first network unit, the output code is an aggregate of electronic signals output generated by combining the input code with the first random code in a specified manner;

wherein, in the first network unit, the plurality of registration codes is electronic data stored in the stem server by registering the plurality of output codes in advance; and wherein, in the first network unit, the stem server compares each of the plurality of output codes with a respective one of the at least one list of the plurality of registration codes, and evaluates the validity of a respective one of the plurality of peripheral devices.

20. The network of electronic appliances as claimed in claim 19, wherein the topology comprises the stem server of the first network unit, wherein the stem server of the first network unit connects to one or more of the stem servers of the plurality of second network units.

21. The network of electronic appliances as claimed in claim 19, wherein the topology comprises at least one of the plurality of peripheral devices of the first network unit, wherein each of the at least one of the plurality of peripheral devices of the first network unit connects to one or more of the stem servers of the plurality of second network units.

22. The network of electronic appliances as claimed in claim 19, wherein the topology comprises the stem server of the first network unit and at least one of the plurality of peripheral devices of the first network unit, wherein the stem server of the first network unit connects to one or more of the stem servers of the plurality of second network units, and wherein each of the at least one of the plurality of peripheral devices of the first network unit connects to one or more of the stem servers of the plurality of second network units.

23. The network unit of electronic appliances as claimed in claim 19, wherein the at least one passcode is expanded into elements in binary, and the elements are divided into a first input arrangement and a second input arrangement, wherein each of the elements of the first input arrangement is assigned to a corresponding row of the first random number generator, and each of the elements of the second input arrangement is assigned to a corresponding column of the first random number generator, wherein a sum of a number of rows and a number of columns of the first random number generator is larger than or equal to a sum of a number of the elements of the first input arrangement and a number of the elements of the second input arrangement.

24. The network unit of electronic appliances as claimed in claim 19, wherein the chip identification device comprises a second random number generator, and the second random number generator generates a second random code which is an aggregate of electronic data electrically output by a plurality of identification cells disposed at the addresses defined by a second group of rows and the first group of columns.

25. The network unit of electronic appliances as claimed in claim 24, wherein the second random number generator further comprises a scrambling device, wherein the scrambling device adds up the electrically output data of the identification cells along a direction of a selected row, and divides the added-up data by two to obtain a first remainder, wherein the elements of the first input arrangement and the second input arrangement, which have numbers corresponding to a number of the selected column, are also added-up and divided by two to obtain a second remainder, wherein the first and second remainders are added, wherein a sum of the first and second remainders is arranged in response to the number of the column, and is output as an intermediate output.

26. The network unit of electronic appliances as claimed in claim 25, wherein each of the plurality of peripheral devices further comprises an intermediate code buffer module, wherein the intermediate code buffer module temporarily stores the intermediate output during an identification process of each of the plurality of peripheral devices.

27. The network unit of electronic appliances as claimed in claim 25, wherein each of the plurality of peripheral devices further comprises a first code generator, wherein the first code generator either adds up the elements of the first input arrangement and the second input arrangement to acquire a sum, or adds up elements of the intermediate output and elements of the first random code at each of addresses designated by each of a plurality of selected bit lines selected from the plurality of bit lines and each of a plurality of selected word lines selected from the plurality of word lines to acquire the sum, wherein the sum is divided by two to obtain a third remainder, and wherein the third remainder is output at each of the addresses to generate the output code.

28. The network unit of electronic appliances as claimed in claim 19, wherein each of the plurality of identification cells comprises at least two terminals, and is probabilistically broken by applying a pulse voltage at least one time between the at least two terminals, wherein if an electric current flowing between the at least two terminals in response to a predetermined read voltage input between the at least two terminals has an absolute value larger than a value of a first threshold current, then the first value is regarded as being output, or if the electric current has an absolute value smaller than a value of a second threshold current, then the second value is regarded as being output, wherein the value of the first threshold current is larger than the value of the second threshold current, wherein if the electric current has a value larger than the value of the second threshold value and smaller than the value of the first threshold value, then a third value is regarded as being output, wherein the chip identification device comprises the plurality of identification cells outputting the first and the second values.

29. The network unit of electronic appliances as claimed in claim 28, wherein if a ratio of the plurality of identification cells in a first state outputting the first value is smaller than a ratio of the plurality of identification cells in a second state outputting the second value, then a part of or all of the plurality of identification cells in the second state is selected and applied with an electrical stress.

30. The network unit of electronic appliances as claimed in claim 28, wherein if the ratio of the plurality of identification cells in the first state is higher than the ratio of the plurality of identification cells in the second state, then a part of or all of the plurality of identification cells in the first state is selected and applied with an electrical stress.

31. The network unit of electronic appliances as claimed in claim 28, wherein the identification cell comprises a capacitor made simultaneously within the chip in a same manufacturing process, wherein the capacitor comprises a first terminal, a second terminal, and an insulating or dielectric film sandwiched between the first and second terminals, wherein the first terminal connects to one of the one or more groups of the plurality of word lines, and the second terminal connects to one of the one or more groups of the plurality of bit lines, wherein the insulating or dielectric film is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

32. The network unit of electronic appliances as claimed in claim 28, wherein the identification cell comprises a diode junction made simultaneously within the chip in a same manufacturing process, wherein the diode junction comprises a first end and a second end, wherein the first end connects to one of the one or more groups of the plurality of word lines, and the second end connects to one of the one or more groups of the plurality of bit lines, wherein the diode is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

33. The network unit of electronic appliances as claimed in claim 28, wherein the identification cell comprises a MOS transistor made simultaneously within the chip in a same manufacturing process, wherein the MOS transistor comprises at least a first terminal, a second terminal and a third terminal, wherein the first terminal connects to one of the one or more groups of the plurality of word lines, and the second terminal connects to one of the one or more groups of the plurality of bit lines, wherein the second and third terminals respectively connect to two spatially separated second conduction type diffusion layers formed on a surface of a first conduction type semiconductor substrate or on a surface of a first conduction type well, and the first terminal is disposed on a surface of a gate insulating film on the first conduction type semiconductor substrate or the first conduction type well, wherein the gate insulating film is probabilistically broken by applying the pulse voltage to the word line, wherein the read voltage is applied to the word line, and then an electric current flowing through the word line or the bit line in response to the read voltage is compared with the values of the first and second threshold currents.

34. The network unit of electronic appliances as claimed in claim 28, wherein the identification cell comprises a MOS transistor and a capacitor made simultaneously within the chip in a same manufacturing process, wherein the capacitor comprises a first terminal, a second terminal, and an insulating film sandwiched between the first and second terminals, wherein the MOS transistor comprises at least a third terminal, a fourth terminal and a fifth terminal, wherein the third terminal connects to one of the one or more groups of the plurality of word lines, the fourth terminal connects to one of the one or more groups of the plurality of bit lines, and the fifth terminal connects to the first terminal, wherein the fourth and fifth terminals respectively connect to two spatially separated second conduction type diffusion layers formed on a surface of a first conduction type semiconductor substrate or on a surface of a first conduction type well, and the first terminal is disposed on a surface of a gate insulating film on the first conduction type semiconductor substrate or the first conduction type well, wherein the insulating film of the capacitor is probabilistically broken by applying the pulse voltage to the bit line during a period applying a pass voltage between the word line and the bit line to turn on the MOS transistor, wherein the read voltage is applied to the bit line during the period applying the pass voltage, and then an electric current flowing through the bit line in response to the read voltage is compared with the values of the first and second threshold currents.

35. The network unit of electronic appliances as claimed in claim 28, wherein the identification cell comprises a control transistor of a nonvolatile memory made simultaneously within the chip in a same manufacturing process, wherein the control transistor comprises at least a first terminal, a second terminal and a third terminal, wherein the first terminal connects to one of the one or more groups of the plurality of word lines, and the second terminal connects to one of the one or more groups of the plurality of bit lines, wherein the second and third terminals respectively connects to two spatially separated second conduction type diffusion layers formed on a surface of a first conduction type semiconductor substrate or on a surface of a first conduction type well, wherein a tunnel film, a charge storage layer, an interlayer insulating film and a control gate are laminated in order on the first conduction type semiconductor substrate or the first conduction type well, wherein the first terminal connects to the control gate, wherein the interlayer insulating film is partially or fully replaced with an interlayer conducting layer, wherein the tunnel film is probabilistically broken by applying the pulse voltage to the word line, wherein the read voltage is applied to the word line, and then an electric current flowing through the word line or the bit line in response to the read voltage is compared with the values of the first and second threshold currents.

36. The network unit of electronic appliances as claimed in claim 28, wherein the identification unit comprises a plurality of selecting transistors disposed on a chip having a plurality of nonvolatile memories, wherein the plurality of selecting transistors are made simultaneously within the chip in a same manufacturing process, wherein the plurality of selecting transistors is connected in series on a semiconductor substrate, and comprises at least a plurality of gate terminals and a bit line terminal, wherein each of the plurality of gate terminals connects to a respective one of the one or more groups of the plurality of word lines, and the bit line terminal connects to one of the one or more groups of the plurality of bit lines, wherein the selecting transistor comprises a tunnel film, a charge storage layer, an interlayer insulating film and a control gate laminated in order on the semiconductor substrate, wherein the gate terminal is disposed on the control gate, wherein the interlayer insulating film is partially or fully replaced with an interlayer conducting layer, wherein the tunnel film is probabilistically broken by applying the pulse voltage to the word line, wherein the read voltage is applied to the word line, and then an electric current flowing through the word line or the bit line in response to the read voltage is compared with the values of the first and second threshold currents.

37. The network unit of electronic appliances as claimed in claim 28, wherein the identification cell comprises a fuse resistor made simultaneously within the chip in a same manufacturing process, wherein the fuse resistor comprises a first terminal, a second terminal, and a resistive material sandwiched between the first and second terminals, wherein the first terminal connects to one of the one or more groups of the plurality of word lines, and the second terminal connects to one of the one or more groups of the plurality of bit lines, wherein the resistive material is probabilistically broken by applying the pulse voltage between the word line and the bit line, wherein the read voltage is applied between the word line and the bit line, and then an electric current flowing through the word line or the bit line in response to the read voltage is compared with the values of the first and second threshold currents.

38. The network unit of electronic appliances as claimed in claim 28, wherein the identification cell comprises a first conductor region, a second conductor region, an insulating film sandwiched between the first and second conductor regions, and a conductor via formed by a hole forming step and a conductive material filling step, wherein the hole forming step comprises forming a hole penetrating the insulating film from the first conductor region to the second conductor region, and the conductive material filling step comprises filling the hole with a conductive material, wherein at least one of the first and second conductor regions connects to one of the one or more groups of the plurality of word lines and one of the one or more groups of the plurality of bit lines defining an address of the identification unit, wherein a manufacturing target value of a length of the conductor via is equal to a distance between the first and second conductor regions, wherein the length of the conductor via formed by the hole forming step and the conductive material filling step is probabilistically larger or smaller than the distance between the first and second conductor regions, then an electric property of the identification cell forming the chip identification device is physically random accordingly.

39. The network unit of electronic appliances as claimed in claim 28, wherein the identification cell comprises a first conductor region, a second conductor region, a conductive thin wire bridging the first and second conductor regions, and an insulating film sandwiched between the first and second conductor regions and covering the conductive thin wire, wherein at least one of the first and second conductor regions connects to one of the one or more groups of the plurality of word lines and one of the one or more groups of the plurality of bit lines, which defines an address of the identification cell, wherein the conductive thin wire is probabilistically broken in response to a manufacturing variance that comes from a manufacturing process of the conductive thin wire or from a manufacturing process of the insulating film which covers the conductive thin wire, in order to cause an electric property of the identification unit forming the chip identification device to be physically random.

40. The network unit of electronic appliances as claimed in claim 19, wherein one or more of the stem servers which are connected to the plurality of peripheral devices monitor input signals that each of the plurality of peripheral devices receives from arbitrary media and controls the access of each of the plurality of peripheral devices and the media.

41. An inspection method performed by each of the stem servers of the plurality of network units as claimed in claim 19, comprising:
  reading an inner memory of each of the plurality of peripheral devices connecting to the stem server;
  comparing the read data with the at least one passcode stored in the stem server;
  determining whether the compared result is inconsistent;
  checking whether the read data is different from any of the plurality of registration codes in one of the lists stored in the stem server if the determined result is inconsistent, wherein the one of the list corresponds to the passcode, wherein the peripheral device is regarded as being certified if the check result is inconsistent; and
  removing the peripheral device from the network if the peripheral device is not regarded as being certified.

* * * * *